United States Patent
Nakano et al.

(10) Patent No.: US 7,603,742 B2
(45) Date of Patent: Oct. 20, 2009

(54) WIPER BLADE AND WIPER SYSTEM HAVING THE SAME

(75) Inventors: Hiroyuki Nakano, Kosai (JP); Naoki Torii, Toyohashi (JP); Toshihiro Saito, Toyohashi (JP); Atsushi Takagi, Toyohashi (JP); Motoyasu Yano, Toyohashi (JP); Hiroshi Matsumoto, Hamamatsu (JP); Yukio Kobayashi, Ama-gun (JP); Yoshito Hirota, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 760 days.

(21) Appl. No.: 11/022,893

(22) Filed: Dec. 28, 2004

(65) Prior Publication Data

US 2005/0166349 A1    Aug. 4, 2005

(30) Foreign Application Priority Data

| Jan. 30, 2004 | (JP) | ............................. 2004-024787 |
| Mar. 18, 2004 | (JP) | ............................. 2004-078948 |
| Mar. 23, 2004 | (JP) | ............................. 2004-085417 |
| May 27, 2004 | (JP) | ............................. 2004-158106 |
| Jul. 22, 2004 | (JP) | ............................. 2004-214769 |
| Aug. 19, 2004 | (JP) | ............................. 2004-239845 |
| Aug. 19, 2004 | (JP) | ............................. 2004-239848 |

(51) Int. Cl.
    *B60S 1/38* (2006.01)
(52) U.S. Cl. .............................. 15/250.201; 15/250.44
(58) Field of Classification Search ............ 15/250.201, 15/250.43, 250.44, 250.361
    See application file for complete search history.

(56) References Cited

U.S. PATENT DOCUMENTS 5,138,739 A * 8/1992 Maubray ............... 15/250.201

| 5,412,177 | A | 5/1995 | Clark |
| 5,946,764 | A | 9/1999 | Tworzydlo |
| 6,088,872 | A | 7/2000 | Schmid et al. |
| 6,499,179 | B1 * | 12/2002 | Fink et al. ................ 15/250.04 |
| 2003/0074763 | A1 | 4/2003 | Egner-Walter et al. |
| 2004/0187247 | A1 | 9/2004 | Torii et al. |
| 2005/0086759 | A1 | 4/2005 | Torii et al. |
| 2005/0166349 | A1 | 8/2005 | Nakano et al. |

FOREIGN PATENT DOCUMENTS

| DE | 41 16 968 A1 | 11/1992 |
| DE | 197 45 460 A1 | 4/1999 |
| DE | 199 38 662 A1 | 3/2001 |
| DE | 199 38 664 A1 | 3/2001 |
| EP | 0791514 | 8/1997 |
| FR | 2759961 | 8/1998 |
| JP | U-63-45356 | 3/1988 |

(Continued)

OTHER PUBLICATIONS

Office Communication from European Patent Office issued on Mar. 20, 2006 for the corresponding European patent application No. 04030904.9-2424 (a copy thereof).

(Continued)

*Primary Examiner*—Gary K Graham
(74) *Attorney, Agent, or Firm*—Posz Law Group, PLC

(57) ABSTRACT

A lever assembly holds a wiper strip, which directly wipes a wiping surface. The lever assembly includes a plurality of levers, which are connected together in tournament style. An axial length of the lever assembly is shorter than an axial length of the wiper strip. A cover member receives the lever assembly, and opposed ends of the cover member hold the wiper strip. The cover member includes a plurality of cover portions, which are formed separately from one another.

28 Claims, 32 Drawing Sheets

FOREIGN PATENT DOCUMENTS

| | | |
|---|---|---|
| JP | U-H04-108470 | 9/1992 |
| JP | U-7-26266 | 5/1995 |
| JP | U-7-28759 | 5/1995 |
| JP | A-8-133022 | 5/1996 |
| JP | A-11-198767 | 7/1999 |
| JP | A-11-514945 | 12/1999 |
| JP | A-2003-160028 | 6/2003 |
| WO | WO 99/19186 | 4/1999 |

OTHER PUBLICATIONS

Search Report issued from European Patent Office issued on Dec. 20, 2005 for the corresponding European patent application No. 05020593.9-2424 (a copy thereof).

Office Action dated Apr. 4, 2008 in corresponding Chinese Patent Application No. 200510003791.4 (and English translation).

European Office Communication dated Jun. 25, 2007 in the corresponding European Patent Application No. 04030904.9.

Office Action dated Jan. 20, 2009 in corresponding Japanese patent application No. 2006-249393 (and English translation).

Examination Report dated Feb. 12, 2009 in corresponding European patent application No. 04 030 904.9-2424 (and English translation).

Office Action dated Mar. 27, 2009 in corresponding Chinese patent application No. 200510003791.4 (and English translation).

Office Action dated Nov. 11, 2008 in corresponding Japanese patent application No. 2004-239848 (and English translation).

* cited by examiner

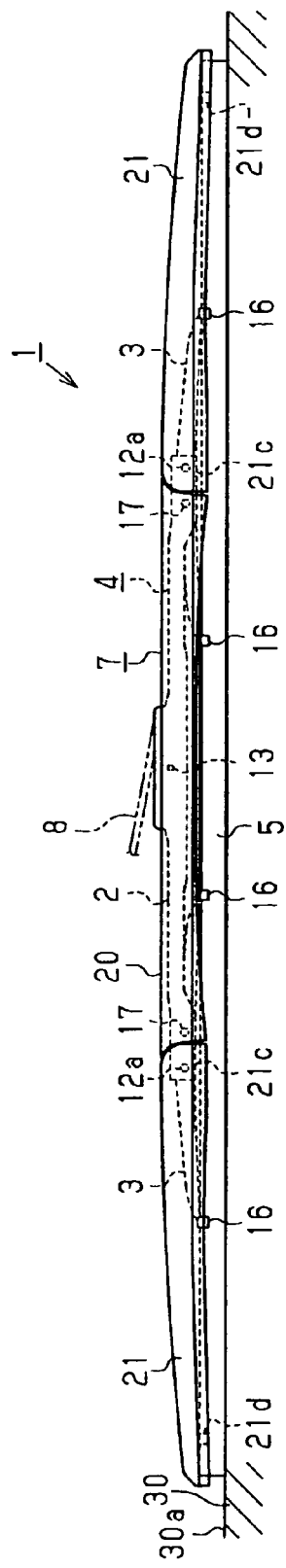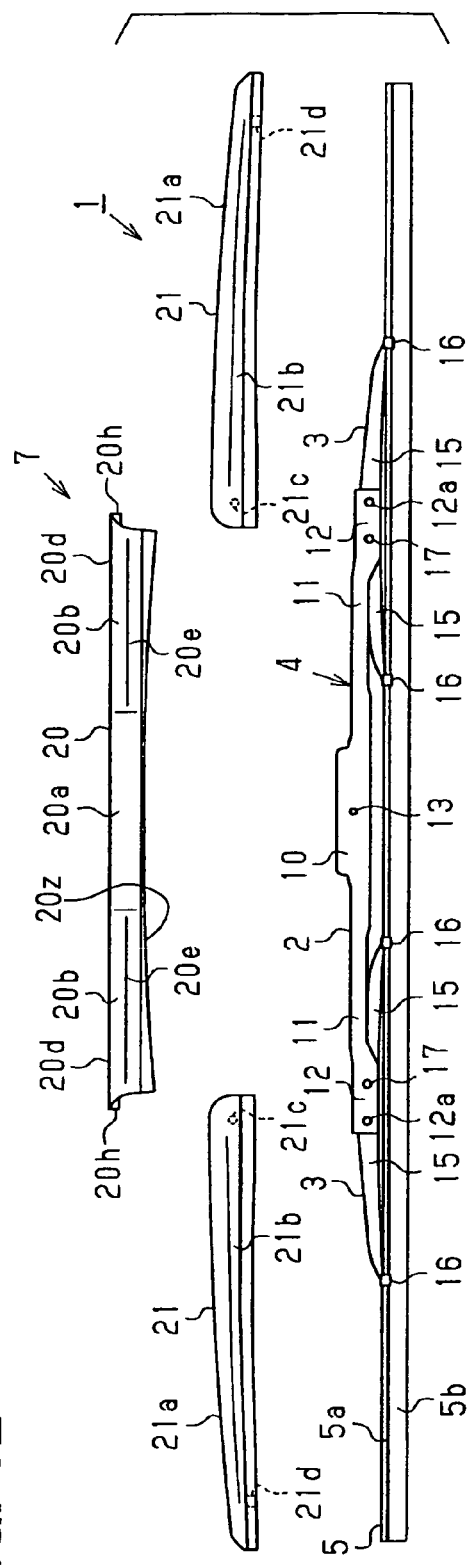

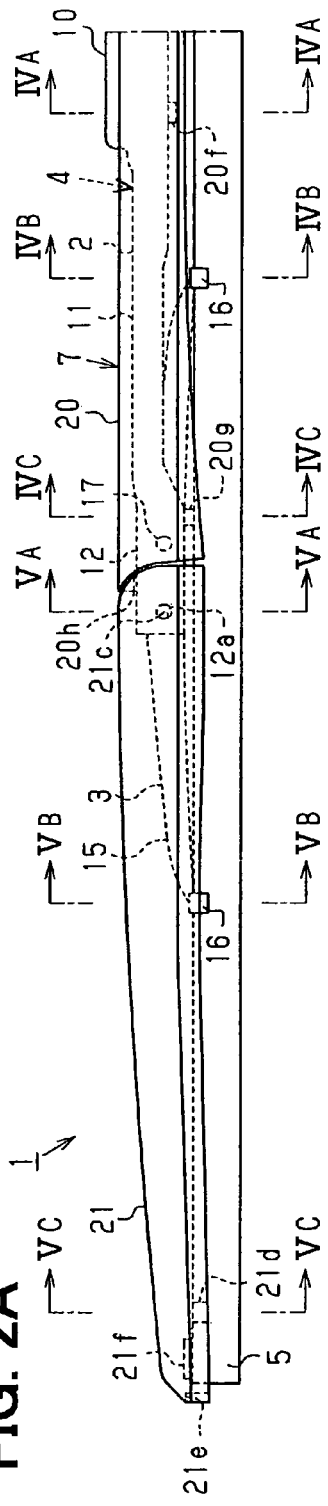
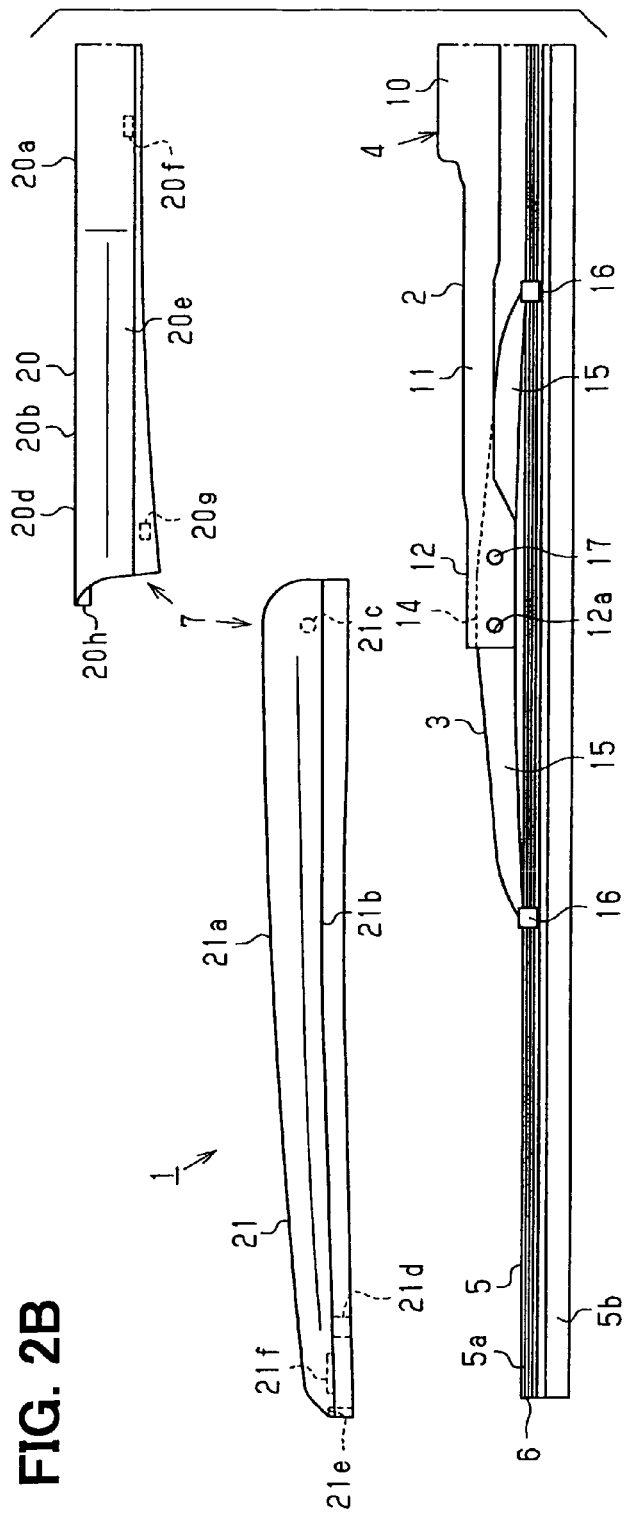
FIG. 2A
FIG. 2B

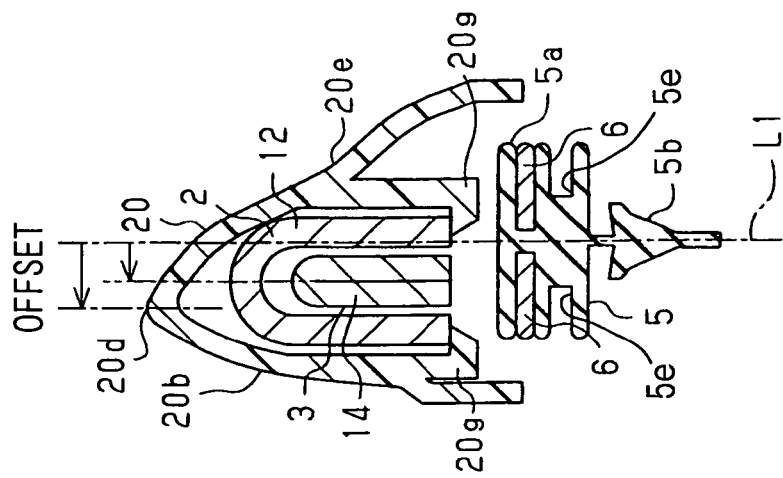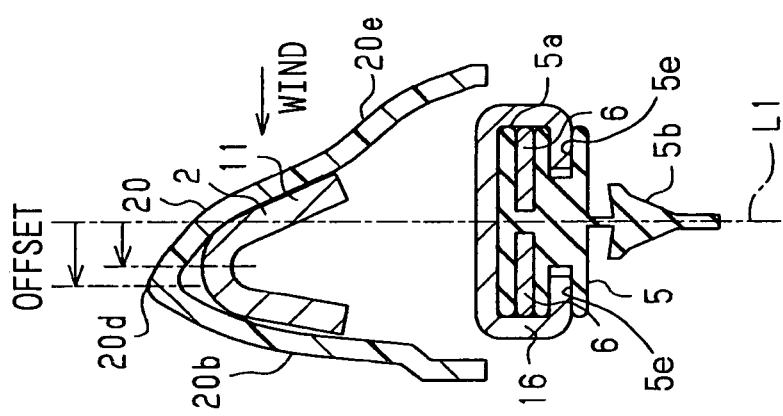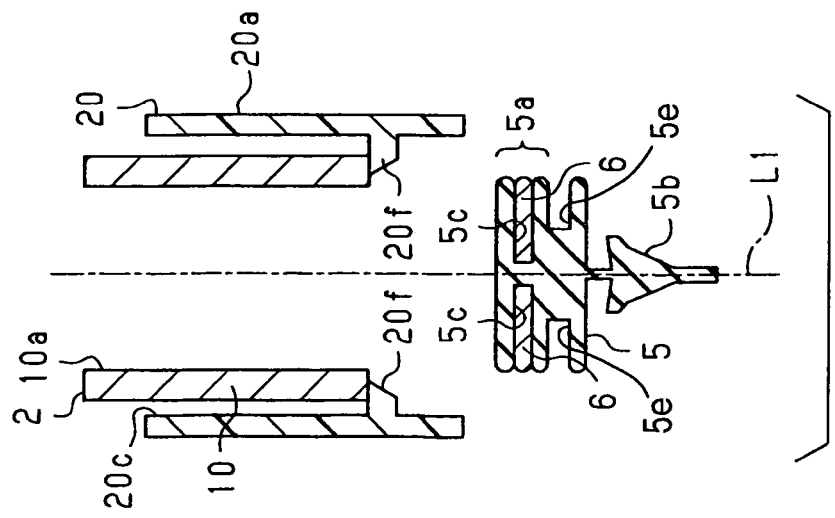

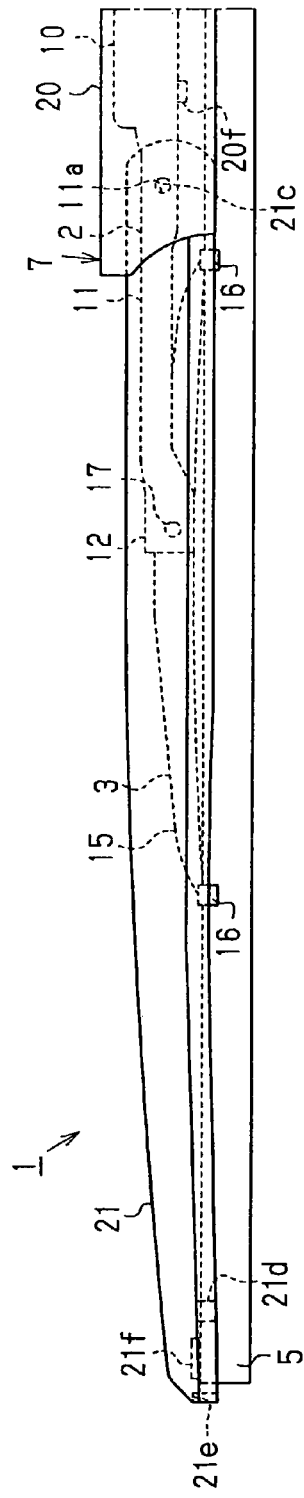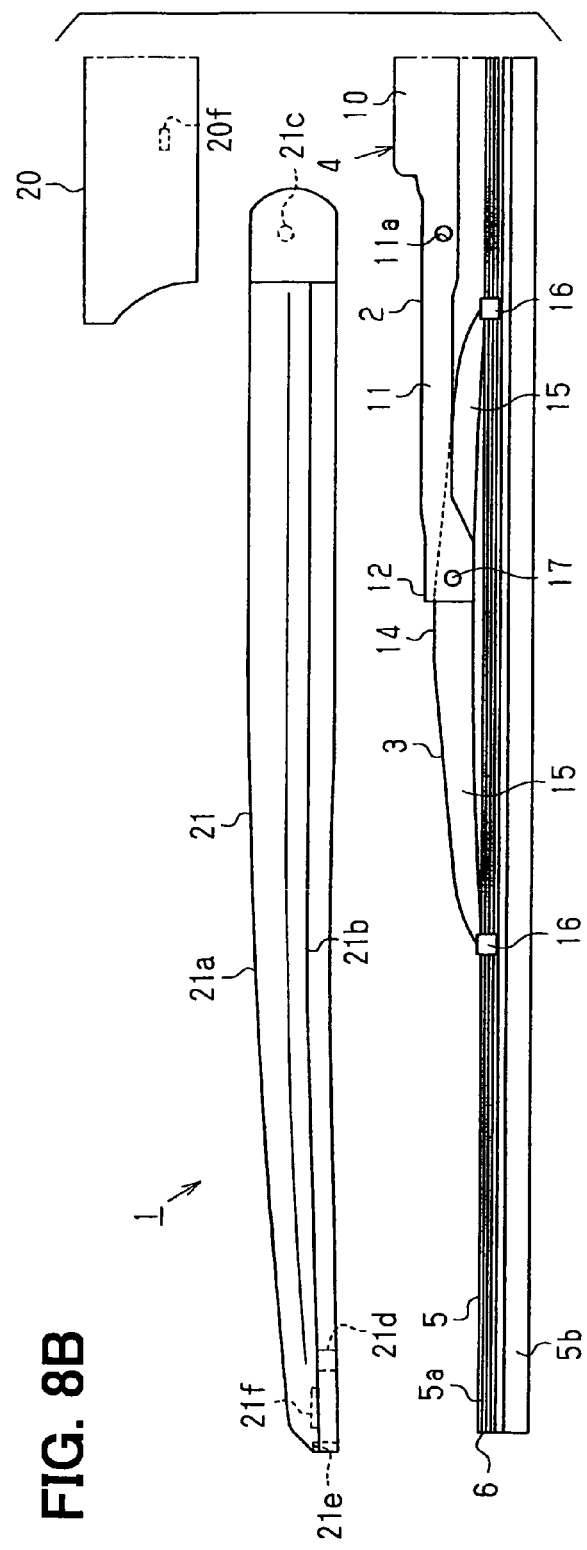
FIG. 8A
FIG. 8B

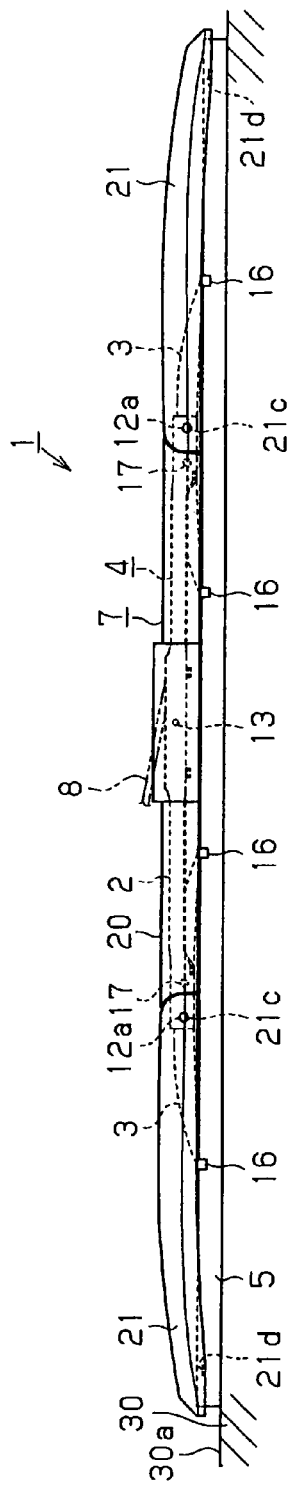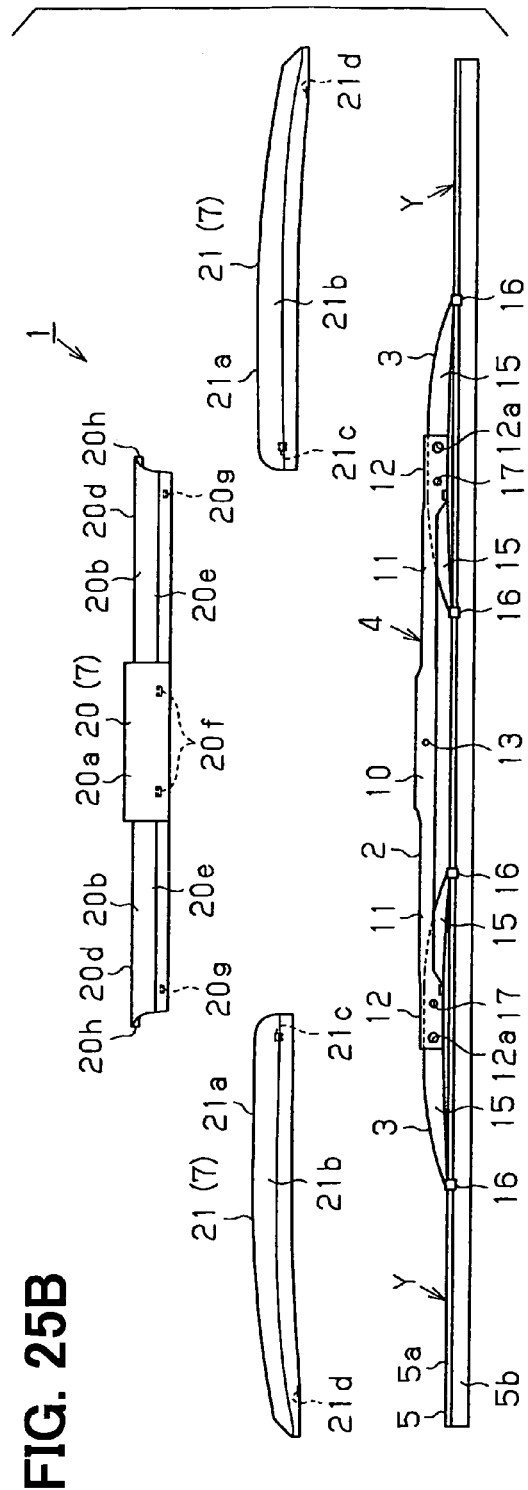

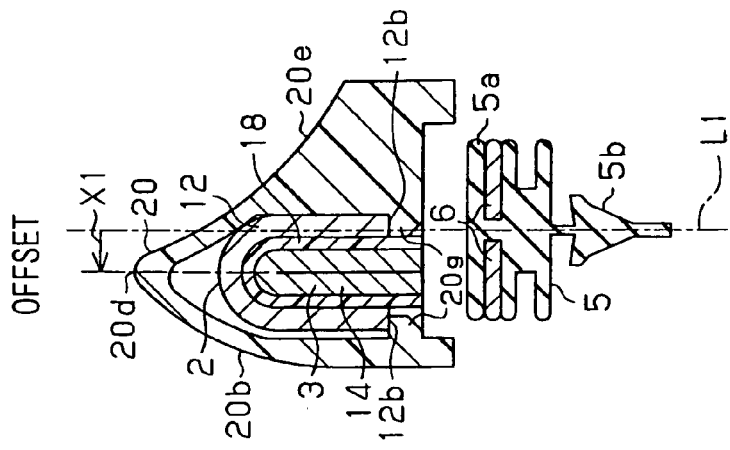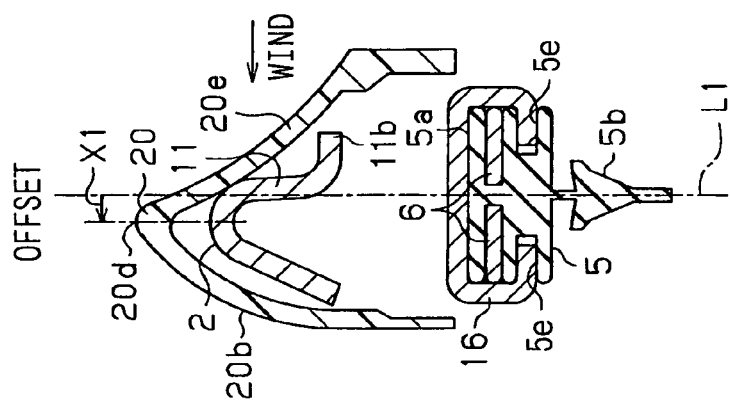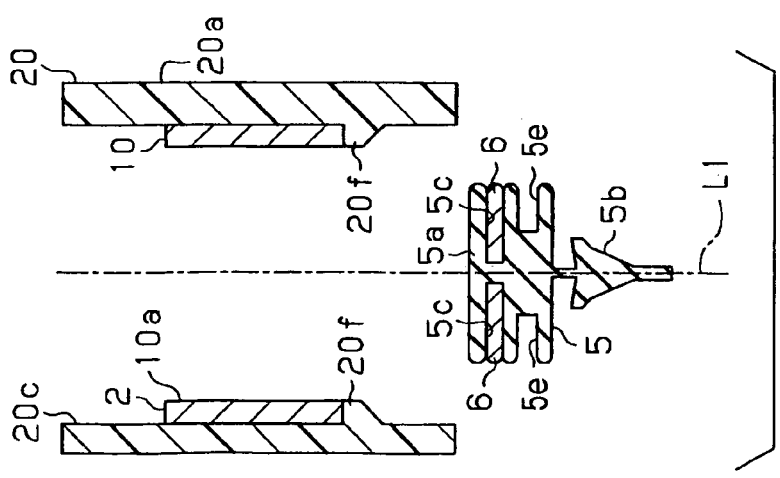

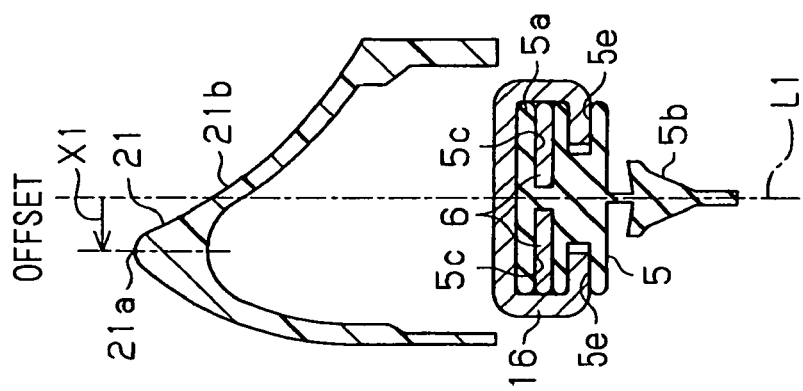
FIG. 29C
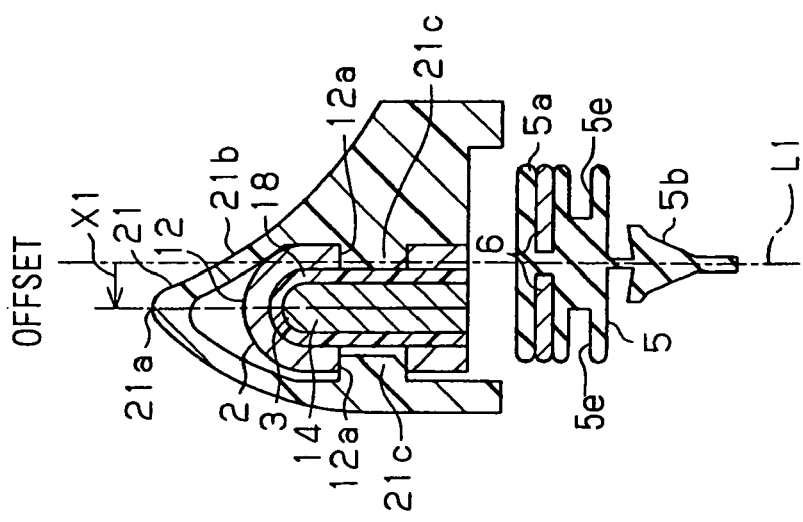
FIG. 29B
FIG. 29A

FIG. 33A
FIG. 33B
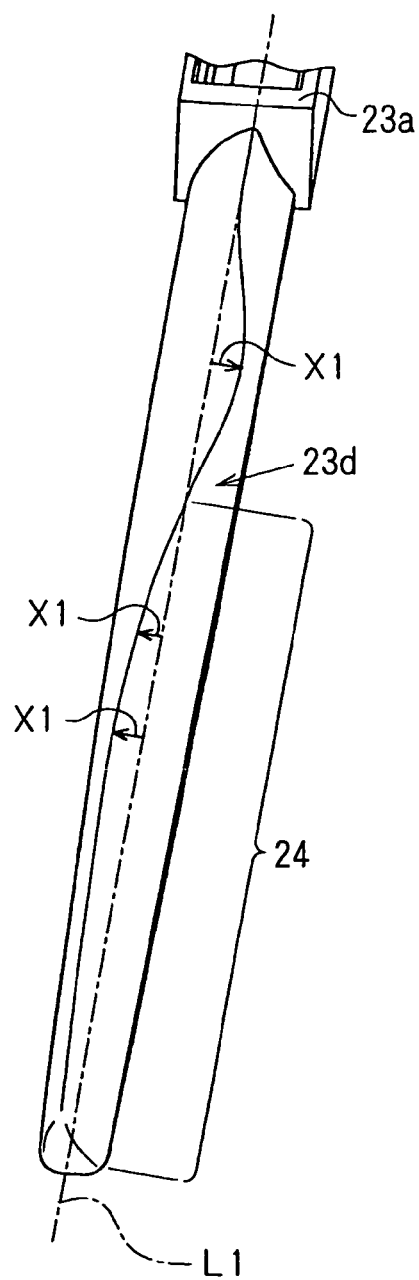
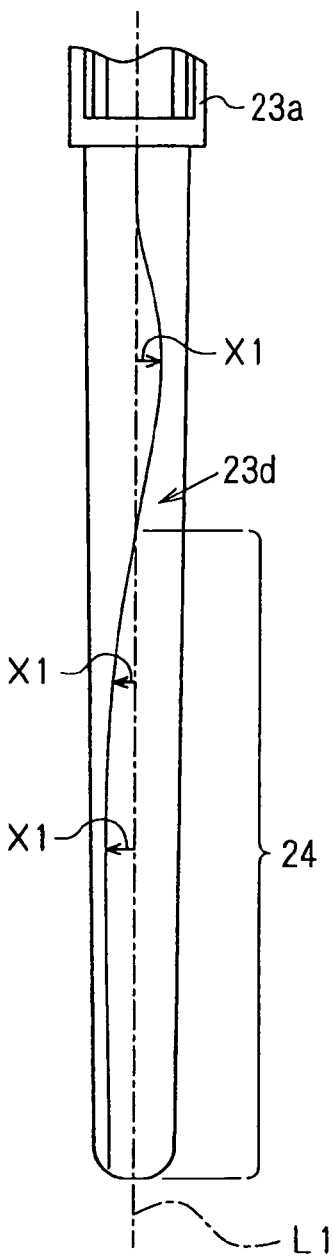

WIPER BLADE AND WIPER SYSTEM HAVING THE SAME

CROSS REFERENCE TO RELATED APPLICATION

This application is based on and incorporates herein by reference Japanese Patent Application No. 2004-24787 filed on Jan. 30, 2004, Japanese Patent Application No. 2004-78948 filed on Mar. 18, 2004, Japanese Patent Application No. 2004-85417 filed on Mar. 23, 2004, Japanese Patent Application No. 2004-158106 filed on May 27, 2004, Japanese Patent Application No. 2004-214769 filed on Jul. 22, 2004, Japanese Patent Application No. 2004-239845 filed on Aug. 19, 2004 and Japanese Patent Application No. 2004-239848 filed on Aug. 19, 2004.

BACKGROUND OF THE INVENTION

1. Field of the Invention

The present invention relates to a wiper blade, which includes a lever assembly made by connecting levers in tournament style, and more particularly to a wiper blade suitable for wiping a surface of a vehicle front glass (a windshield), which shows a large change in a curvature of the surface. The present invention further relates to a vehicle wiper system having such a wiper blade.

2. Description of Related Art

In general, a wiper blade for wiping a surface of a vehicle front glass (a windshield) includes a lever assembly, which is made by connecting metal levers in tournament style. The lever assembly holds a wiper strip, to which backing plates are installed. However, such a wiper blade generally does not have good appearance due to exposure of the lever assembly, which includes the metal levers.

To address the above disadvantages, for example, Japanese Unexamined Utility Model Publication No. H07-28759 or H07-26266 discloses a wiper blade, in which levers of a lever assembly are made of synthetic resin and are shaped to have integral appearance after assembly of the levers into the lever assembly to improve appearance of the wiper blade.

However, in the lever assembly disclosed in the above publication, each lever is made of the resin, so that a wall thickness of each lever needs to be disadvantageously increased to achieve a required strength and a required rigidity. This results in an increase in the size of each lever and also an increase in the size of the lever assembly. Thus, the wiper blade disadvantageously becomes larger than the wiper blade having the metal levers.

To address the above disadvantage, it is conceivable to provide a resin cover member to the lever assembly of the wiper blade, which has the metal levers, to improve the appearance. The resin cover receives the lever assembly and extends from one end to the other end of the wiper strip.

However, the ends of the wiper strip are significantly flexed during its wiping operation due to a change in the curvature of the wiping surface of the glass. Particularly, the front glass of the vehicle shows a large change in the curvature at the lateral sides of the front glass. Thus, the ends of the wiper strip, which wipes such a front glass surface, are largely flexed. Thus, when the cover member is simply installed to the lever assembly, a large space could be formed between the ends of the wiper strip and the cover member. Thus, there is still a need for improving the wiper blade.

Furthermore, a fin is integrally formed in each lever recited in Japanese Unexamined Utility Model Publication No. H07-28759 to limit lifting of the wiper blade from the glass surface during traveling of the vehicle. It has been also proposed to install a separately manufactured fin member to the lever assembly of the wiper blade, which includes the metal levers. However, in the fin member, which is formed separately from the lever assembly, legs are provided in a plate-like fin, which is elongated in a longitudinal direction of the wiper strip. The fin member is installed to the lever assembly through the legs. Thus, depending on the installation position of the fin member, the fin member may cause an increase in the size of the wiper blade in a transverse direction or in a vertical direction. Furthermore, the lever assembly is directly exposed and is not made integrally with the fin member. Thus, appearance of the wiper blade is not good.

Furthermore, the fin member, which is recited in Japanese Unexamined Utility Model Publication No. H07-28759, or the fin member, which is formed separately and is installed to the lever assembly, may have a top ridge, which shows a constant amount of offset relative to a center line of the wiper blade. Thus, the effect for limiting the lifting of the wiper blade from the glass surface is not significant.

SUMMARY OF THE INVENTION

The present invention addresses the above disadvantages. Thus, it is an objective of the present invention to provide a wiper blade, which includes a cover member that has a structure enabling flexing of a wiper strip. It is another objective of the preset invention to provide a wiper blade, which effectively limits lifting of the wiper blade from a wiping surface at time of traveling of a vehicle. It is another objective of the present invention to provide a vehicle wiper system, which includes one of the above wiper blades.

To achieve the objectives of the present invention, in accordance with one aspect of the present invention, there is provided a wiper blade, which includes a wiper strip, a lever assembly and a cover member. The wiper strip directly wipes a wiping surface. The lever assembly holds the wiper strip and includes a plurality of levers, which are connected together in tournament style. An axial length of the lever assembly is shorter than an axial length of the wiper strip. The cover member receives the lever assembly. Opposed ends of the cover member hold the wiper strip. The cover member includes a plurality of cover portions, which are formed separately from one another.

To achieve the objectives of the present invention, in accordance with another aspect of the present invention, there is provided a wiper blade, which includes a wiper strip, a lever assembly and a fin member. The wiper strip directly wipes a wiping surface. The lever assembly holds the wiper strip and includes a plurality of levers, which are connected together in tournament style. An axial length of the lever assembly is shorter than an axial length of the wiper strip. The fin member is installed to the lever assembly and has a fin arrangement. The fin arrangement exerts an urging force for urging the wiper strip against the wiping surface when the fin arrangement receives a head wind. Opposed ends of the fin member hold the wiper strip. The fin member includes a plurality of finned portions, which are formed separately from one another. Each of the plurality of finned portion has a fin section that forms a part of the fin arrangement.

To achieve the objectives of the present invention, in accordance with another aspect of the present invention, there is provided a wiper blade, which includes a wiper strip, a lever assembly and a fin member. The wiper strip directly wipes a wiping surface. The lever assembly holds the wiper strip and includes a plurality of levers, which are connected together in tournament style. A length of the lever assembly is shorter than an axial length of the wiper strip. The fin member is installed to the lever assembly and has a fin arrangement. The fin arrangement exerts an urging force for urging the wiper strip against the wiping surface when the fin arrangement receives a head wind. The fin member has a top ridge, which is offset from a center line of the wiper strip in a transverse direction of the wiper blade on a first side of the center line of the wiper strip. The fin arrangement of the fin member extends in the transverse direction of the wiper blade from the top ridge of the fin member into a second side of the center line of the wiper strip, which is opposite from the first side. An amount of offset of the top ridge of the fin member relative to the center line of the wiper strip is increased in an axial direction of the wiper blade toward at least one of ends of the fin member.

To achieve the objectives of the present invention, in accordance with another aspect of the present invention, there is provided a wiper system, which includes any one of the above wiper blades.

BRIEF DESCRIPTION OF THE DRAWINGS

The invention, together with additional objectives, features and advantages thereof, will be best understood from the following description, the appended claims and the accompanying drawings in which:

FIG. 1A is a side view of a wiper blade, to which a cover member of a first embodiment of the present invention is installed;

FIG. 1B is a side view of the wiper blade before the installation of the cover member of the first embodiment;

FIG. 2A is an enlarged partial view of FIG. 1A;

FIG. 2B is an enlarged partial view of FIG. 1B;

FIG. 4A is a cross sectional view along line IVA-IVA in FIG. 2A;

FIG. 4B is a cross sectional view along line IVB-IVB in FIG. 2A;

FIG. 4C is a cross sectional view along line IVC-IVC in FIG. 2A;

FIG. 8A is an enlarged partial view of FIG. 7A;

FIG. 8B is an enlarged partial view of FIG. 7B;

FIG. 25A is a side view of a wiper blade, to which a cover member of a fifth embodiment of the present invention is installed;

FIG. 25B is a side view of the wiper blade before the installation of the cover member of the fifth embodiment;

FIG. 28A is a cross sectional view along line XXVIIIA-XXVIIIA in FIG. 26A;

FIG. 28B is a cross sectional view along line XXVIIIB-XXVIIIB in FIG. 26A;

FIG. 28C is a cross sectional view along line XXVIIIC-XXVIIIC in FIG. 26A;

FIG. 29A is a cross sectional view along line XXIXA-XXIXA in FIG. 26A;

FIG. 29B is a cross sectional view along line XXIXB-XXIXB in FIG. 26A;

FIG. 29C is a cross sectional view along line XXIXC-XXIXC in FIG. 26A;

FIG. 33A is a perspective view showing one side of a cover member in another modification of the fifth embodiment;

FIG. 33B is a plan view of FIG. 33A;

DETAILED DESCRIPTION OF THE INVENTION

FIRST EMBODIMENT

Figure 3:
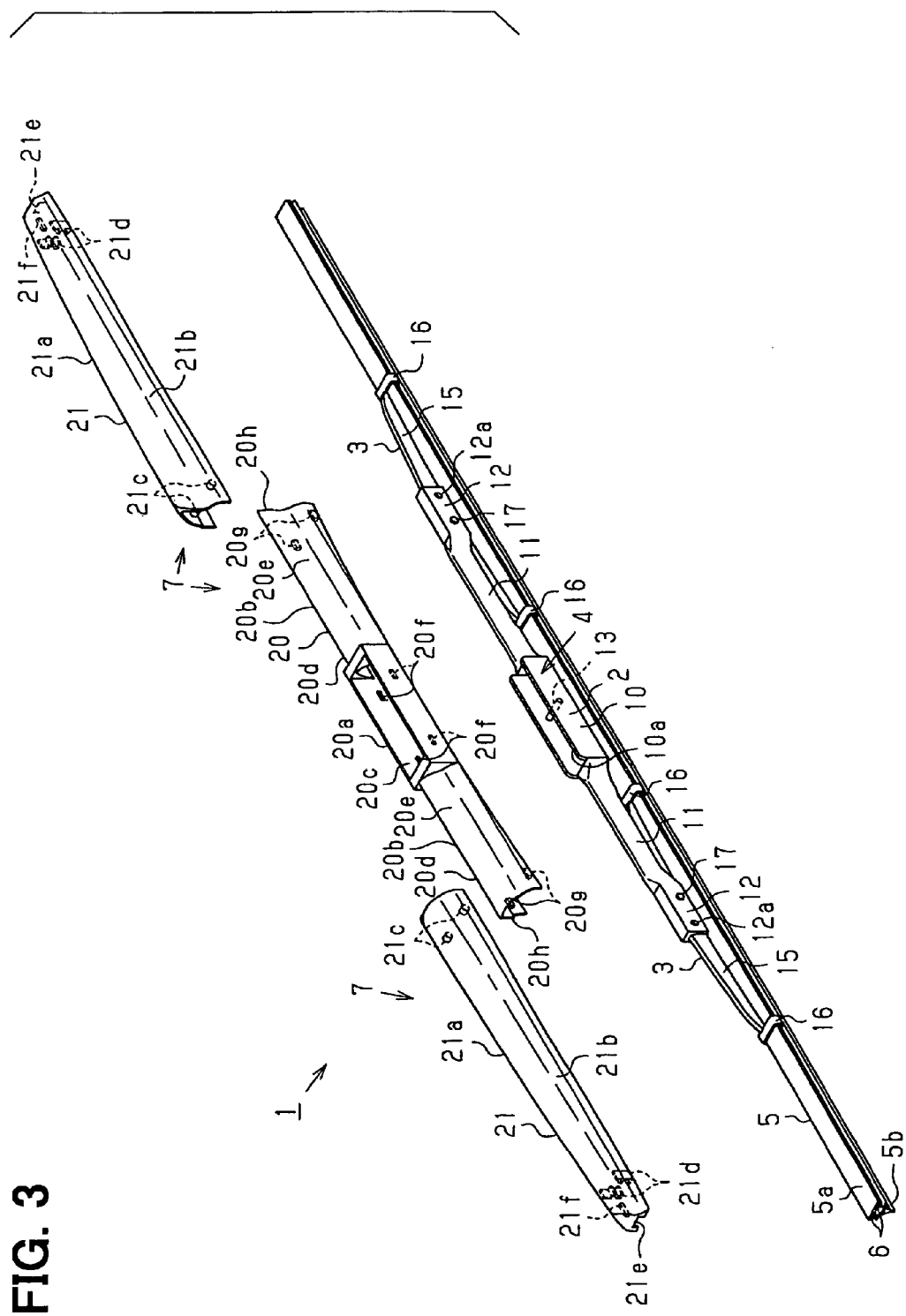
FIG. 3 is a perspective view of the wiper blade before the installation of the cover member of the first embodiment.

A first embodiment of the present invention will be described with reference to the accompanying drawings. In the following respective drawings, some lines on a lateral side surface of the wiper strip 5 are eliminated for the sake of clarity.

FIG. 1A shows a wiper blade 1 of a wiper system of the present embodiment, which is used to wipe a front glass (a windshield) 30 of a vehicle. The wiper blade 1 is connected to a distal end of a wiper arm 8 and receives an urging force from the wiper arm 8 against a glass surface 30a of the front glass 30. The wiper arm 8 is reciprocally rotated a predetermined angle by a wiper motor (not shown), so that the wiper blade 1 reciprocally wipes a predetermined angular range of the glass surface (a wiping surface) 30a of the front glass 30a. As shown in FIGS. 1A to 3, the wiper blade 1 includes a lever assembly 4, a wiper strip 5, two backing plates 6 and a cover member (a fin member) 7. The lever assembly 4 includes a primary lever 2 and two secondary levers 3, which are connected in tournament style.

In the lever assembly 4, the primary lever 2 is formed through a press working process of a metal plate material such that the primary lever 2 has a mountain fold, which includes a lower side (wiper strip 5 side) opening that extends in a longitudinal direction. The primary lever 2 includes a connecting arrangement 10, two arms 11 and two connections 12. The connecting arrangement 10 is provided in a longitudinal center of the primary lever 2. The arms 11 longitudinally extend from opposed ends of the connecting arrangement 10. The connections 12 are provided to distal ends of the arms 11, respectively, i.e., are provided to opposed ends, respectively, of the primary lever 2.

As shown in FIGS. 3 and 4A, the connecting arrangement 10 has a rectangular opening 10a for receiving the distal end of the wiper arm 8, and two lateral walls of the connecting arrangement 10 are bent to extend parallel to each other. A transverse center of the connecting arrangement 10 coincides with a center line L1 of the wiper blade 1 (the wiper strip 5). A connecting pin 13 is provided to the connecting arrangement 10 to rotatably connect with the distal end of the wiper arm 8 through a connecting clip (not shown).

As shown in FIG. 4B, each arm 11 is formed to have a generally V-shaped cross section, which has an opening on the lower side thereof (the wiper strip 5 side) and diverges toward the opening. A transverse center of the arm 11 is offset a predetermined distance from the center line L1 of the wiper blade 1 on one transverse side (on a first side) of the center line L1.

As shown in FIG. 4C, each connection 12 is bent to have a generally U-shaped cross section, which has an opening on the lower side thereof (the wiper strip 5 side). A center of the corresponding secondary lever 3 is rotatably connected to the connection 12 through a connecting pin 17.

Two connecting holes 12a penetrate through distal end side lateral walls, respectively, of the connection 12, which are located distally of the connecting pin 17. Each connecting hole 12a extends along a straight line, which is parallel to an axis of the connecting pin 17. The connecting holes 12a receive connecting projections 21c, respectively, which are provided in the cover member 7.

Each secondary lever 3 is formed to have a mountain fold, which extends in the longitudinal direction, through a press working process of a metal plate material. The secondary lever 3 includes a connection 14, two arms 15 and two holding parts 16. The connection 14 is provided in a longitudinal center of the secondary lever 3. The arms 15 longitudinally extend from opposed ends of the connection 14. The holding parts 16 are provided to distal ends of the arms 15, respectively, i.e., are provided to opposed ends, respectively, of the secondary lever 3.

Figure 5C:
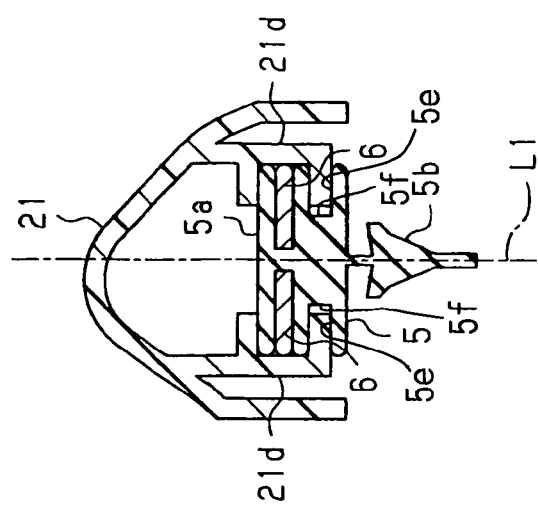
FIG. 5C is a cross sectional view along line VC-VC in FIG. 2A.
Figure 5B:
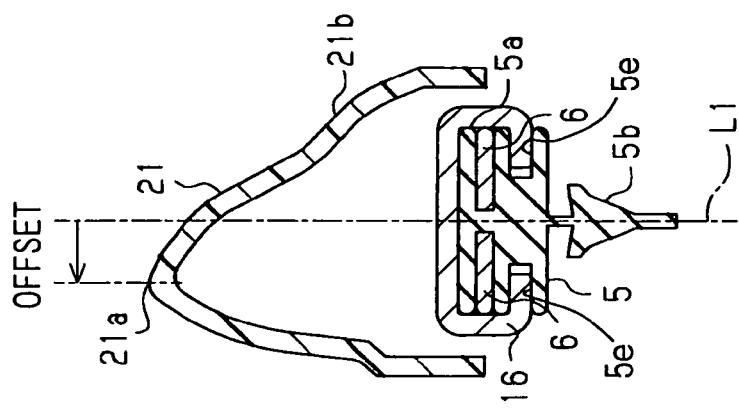
FIG. 5B is a cross sectional view along line VB-VB in FIG. 2A.
Figure 5A:
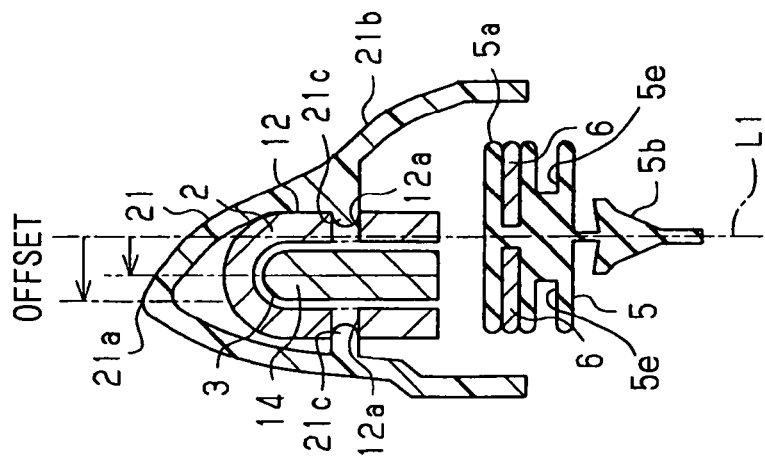
FIG. 5A is a cross sectional view along line VA-VA in FIG. 2A.
Figure 6:
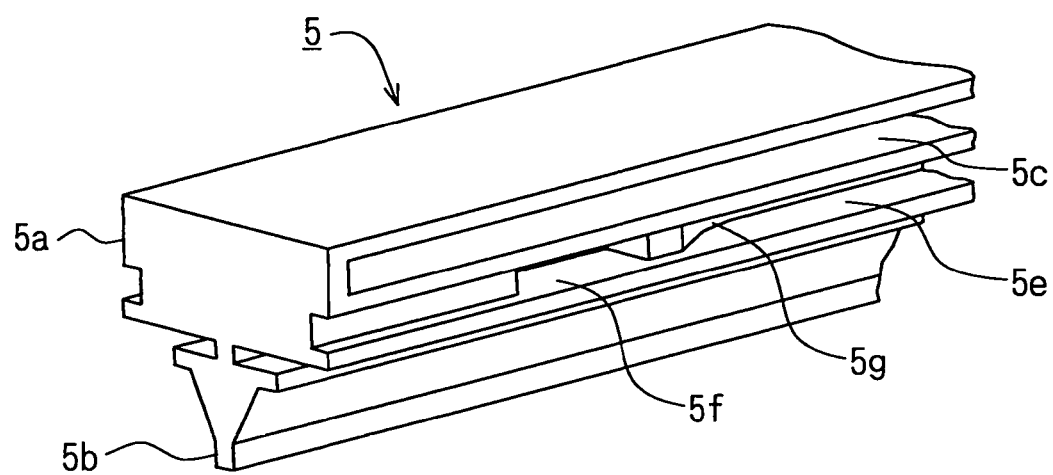
FIG. 6 is an enlarged partial view showing a left end of a wiper strip shown in FIG. 1A.

As shown in FIGS. 4C and 5A, each of the connection 14 and the arms 15 is formed to have the mountain fold in such a manner that two lateral walls thereof are placed next to each other. The connection 14 is received in the connection 12 of the primary lever 2 and is rotatably connected to the connection 12 via the connecting pin 17. A transverse center of each arm 15 is offset from the center line L1 of the wiper blade 1, so that the arm 15 and the adjacent arm 11 of the primary lever 2 extend generally along a straight line.

The holding parts 16 of the arms 15, which are provided to distal ends of the arms 15, i.e., which are provided to the opposed ends of the secondary lever 3, are bent to have a generally C-shaped cross section, which is opened on a lower side thereof (the wiper strip 5 side), as shown in FIG. 5B. A transverse center of each holding part 16 coincides with the center line L1 of the wiper blade 1. A base 5a of the wiper strip 5, to which the backing plates 6 are mounted, is inserted into the respective holding parts 16 in the longitudinal direction, so that the holding parts 16 hold the wiper strip 5 in a manner that enables flexing, i.e., flexible bending of the wiper strip 5 in conformity with the curvature of the glass surface 30a.

The wiper strip 5 is elongated and is made of a resilient material, such as a rubber material or a resilient synthetic material. As shown in FIGS. 4A to 5C, the wiper strip 5 includes the base 5a and a wiping lip 5b. The base 5a is held by the holding parts 16 of the lever assembly 4. The wiping lip 5b extends from the base 5a, and a distal end of the wiping lip 5b directly wipes, for example, rain droplets on the glass surface 30a. The base 5a and the wiping lip 5b extend continuously in the longitudinal direction of the wiper strip 5. Two parallel backing plate receiving grooves 5c extend in the base 5a in the longitudinal direction. The backing plates 6, each of which is formed into an elongated plate from a metal material having a spring characteristic, are received in the backing plate receiving grooves 5c, respectively. In a natural state (in an unloaded state), slightly arcuately curved segments are continuously provided one after another in the longitudinal direction in each backing plate 6, so that a longitudinal center of the backing plate 6 is convexly curved in a direction away from the glass surface 30a. In this state, a curvature of the backing plate 6 is larger than that of the glass surface 30a, i.e., a radius of curvature of the backing plate is smaller than that of the glass surface 30a. With the above structure, the wiper strip 5 is curved in conformity with the shape of the backing plates 6. At the time of wiping the glass surface 30a, when the urging force is applied from the wiper arm 8, the urging force is spread over the wiper strip 5 through the lever assembly 4, so that the wiper strip 5 is flexibly and resiliently deformed in conformity with the curvature of the glass surface 30a. The urging force, which is applied from the wiper arm 8 toward the glass surface 30a and is distributed by the lever assembly 4, is spread by the backing plates 6 over the wiper strip 5 in the longitudinal direction.

As shown in FIG. 3, the cover member 7 includes a center cover portion (a stationary cover portion) 20 and two side cover portions (movable cover portions) 21. The side cover portions 21 are located at opposed ends, respectively, of the center cover portion 20. Each of the center cover portion 20 and the side cover portions 21 is made of a synthetic resin material and has a predetermined rigidity. The center cover portion 20 and the side cover portions 21 receive and cover the lever assembly 4. Furthermore, the center cover portion 20 and the side cover portions 21 extend to the ends of the wiper strip 5. That is, a longitudinal length of the cover member 7 is longer than a longitudinal length of the lever assembly 4, so that the cover member 7 extends from the one end to the other end of the wiper strip 5 to provide an integral appearance together with the wiper strip 5. These cover portions 20, 21 constitute finned portions of the present invention, and top ridges 20d, 21a of these cover portions 20, 21 constitute a top ridge of the cover member (the fin member) 7.

The center cover portion 20 includes a connecting arrangement cover segment 20a and two arm cover segments 20b. The connecting arrangement cover segment 20a is provided generally in a center of the center cover portion 20 and covers the connecting arrangement 10 of the primary lever 2. The arm cover segments 20b are arranged at opposed ends, respectively, of the connecting arrangement cover segment 20a to generally entirely cover the arms 11 of the primary lever 2.

As shown in FIG. 4A, the connecting arrangement cover segment 20a is formed to have parallel lateral walls, and a transverse center of the connecting arrangement cover segment 20a coincides with the center line L1 of the wiper blade 1. A rectangular opening 20c is formed in a top of the connecting arrangement cover segment 20a to expose the connecting arrangement 10 therefrom.

As shown in FIGS. 4B and 4C, each arm cover segment 20b is formed to have a generally V-shaped cross section, which is opened on a lower side thereof (the wiper strip 5 side). Each arm cover segment 20b extends such that a distal end of the arm cover segment 20b does not reach the connecting hole 12a of the corresponding connection 12 of the primary cover 2.

Each arm cover segment 20b is offset from the corresponding arm 11 of the primary lever 2 in such a manner that the top ridge 20d of the arm cover segment 20b is offset a predetermined distance from the center line L1 of the wiper blade 1 on the one transverse side of the center line L1. That is, at a stop position of the wiper arm 8 (i.e., a lower end operational position of the wiper arm 8 at the time of turning off of an operational switch of the wiper system), the top ridge 20d is offset the predetermined distance from the center line L1 on the head wind downstream side (on a vehicle rear side) of the center line L1. A fin section 20e is integrally formed in the arm cover segment 20b to extend from the top ridge 20d into the other transverse side (on a second side) of the center line L1. The fin section 20e is formed into a slant surface, which generates an urging force for urging the wiper blade 1 (more specifically, the wiper strip 5) against the glass surface 30a upon receiving the head wind applied to the traveling vehicle. The fin section 20e is formed to extend from the top ridge 20d, which is offset from the center line L in the manner described above, so that a transverse size of the fin section 20e is increased while limiting an increase in a transverse size of the arm cover segment 20b in comparison to a case where the top ridge of the arm cover segment is located in the center line L of the wiper blade 1, and the fin section extends from that top ridge.

As shown in FIGS. 3 and 4A, four engaging protrusions 20f are formed in an inner surface of the connecting arrangement cover segment 20a to engage with lower surfaces of the connecting arrangement 10 of the primary lever 2 at predetermined four locations. As shown in FIGS. 3 and 4C, two engaging protrusions 20g are formed in an inner surface of a distal end of each arm cover segment 20b to engage with lower surfaces of the corresponding connection 12 of the primary lever 2 at predetermined two locations. When the center cover portion 20 is installed to the lever assembly 4, each engaging protrusion 20f, 20g engages the lower surface of the corresponding one of the connecting arrangement 10 and the connections 12 to limit movement of the center cover portion 20 in a direction opposite from an installation direction of the center cover portion 20 relative to the lever assembly 4. The center cover portion 20 is configured in such a manner that lower side (the wiper strip 5 side) opening edges 20z (FIG. 1B) of the center cover portion 20 slightly concavely recessed in the direction away from the glass surface 30a along the length of the center cover portion 20. The recessed opening edges 20z provide a small air flow space between the center cover portion 20 and the wiper strip 5 in the vertical direction in the drawing to allow flow of a portion of the head wind applied to the traveling vehicle from the upstream side to the downstream side of the wiper blade 1. This alleviates development of a negative pressure on the downstream side of the wiper blade 1 to limit or reduce dragging (i.e., entraining) of wiped water on the glass surface 30a by the wiper blade 1, which is normally caused by development of the negative pressure on the downstream side of the wiper blade 1.

The two side cover portions 21 are symmetrically configured, as shown in FIG. 3. The side cover portion 21 is formed to have a generally V-shaped cross section, which is opened on a lower side thereof (the wiper strip 5 side). The side cover portion 21 extends from a point, at which the connecting hole 12a of the corresponding connection 12 of the primary lever 2 is provided, to the corresponding end of the wiper strip 5. Furthermore, a height of the top ridge 21a of the side cover portion 21 is progressively decreased from a predetermined longitudinal point toward the distal end (the end of the wiper strip 5). A window 21e is provided in the distal end of each side cover portion 21 in a form of a recess, which is recessed from the lower edge of the distal end of the side cover portion 21. The wiper strip 5, to which the backing plates 6 are installed, can be inserted through the window 21e in the longitudinal direction. That is, even in the state where the side cover portions 21 are installed to the primary lever 2, the wiper strip 5 can be installed to the lever assembly 4 through the window 21e in the longitudinal direction.

As shown in FIGS. 5A to 5C, the top ridge 21a is offset the predetermined distance from the center line L1 of the wiper blade 1 on the one transverse side of the center line L1 and continuously extend from top ridge 20d of the adjacent arm cover segment 20b of the center cover portion 20. That is, at the stop position of the wiper arm 8, the top ridge 21a is offset the predetermined distance from the center line L1 on the head wind downstream side (on a vehicle rear side) of the center line L1. Similar to the arm cover segment 20b, a fin section 21b is integrally formed in the side cover portion 21 to extend from the top ridge 21a into the other transverse side of the center line L1. The fin section 21b is formed into a slant surface, which generates an urging force for urging the wiper blade 1 against the glass surface 30a upon receiving the head wind applied to the traveling vehicle. The fin section 21b is formed to extend from the top ridge 21a, which is offset from the center line L in the manner described above, so that a transverse size of the fin section 21b is increased while limiting an increase in a transverse size of the side cover portion 21. The fin section 20e of each arm cover segment 20b of the center cover portion 20 and the fin section 21b of each side cover portion 21 constitute a fin arrangement of the cover member (the fin member) 7 of the present invention.

Furthermore, as shown in FIG. 5A, the two connecting projections 21c are formed in the inner surface at the base end of the side cover portion 21. The connecting projections 21c are received in the connecting holes 12a of the corresponding connection 12 of the primary lever 2, so that the connecting projections 21c are rotatably connected to the connection 12. Furthermore, as shown in FIG. 5C, holding parts 21d are formed in the inner surface of the distal end of each side cover portion 21 to receive the base 5a of the wiper strip 5 in the longitudinal direction. The holding parts 21d hold the base 5a of the wiper strip 5 on the distal end side of the closest outermost holding part 16 of the lever assembly 4, which is closest to the corresponding distal end of the wiper strip 5, so that the wiper strip 5 can be flexibly bent in conformity with the curvature of the glass surface 30a. That is, each side cover portion 21 directly holds the wiper strip 5 through the holding parts 21d.

More specifically, as shown in FIGS. 4A to 6, two parallel holding grooves 5e extend in the base 5a of the wiper strip 5 in the longitudinal direction. The holding parts 21d are received in the holding grooves 5e and hold the base 5a of the wiper strip 5. An engaging part 5f (FIG. 6) is formed in a portion of each holding groove 5e, which is located at one end (the left end in FIG. 1A) of the wiper strip 5. The holding parts 21d of the left side cover portion 21 of FIG. 1A are engaged with the respective engaging parts 5f, so that removal of the wiper strip 5 from the side cover portion 21 is limited. At the time of assembly, when the wiper strip 5, to which the backing plates 6 are assembled, is inserted through the window 21e (FIGS. 2A-3) of the left side cover portion 21 toward the right side in FIG. 1A, each of the holding parts 21d of the left side cover portion 21 slides along the corresponding holding groove 5e of the inserted wiper strip 5 and reaches a slop 5g, which is provided on the right side of the engaging part 5f shown in FIG. 6. At this time, when the wiper strip 5 is further inserted through the window 21e of the side cover portion 21, the slope 5g of the wiper strip 5 is pushed by the corresponding holding part 21d of the left side cover portion 21 and is thus resiliently deformed. Thereby, the holding part 21d is moved beyond the slope 5g and is finally received in the engaging part 5f. Movement of the holding part 21d, which is received in the engaging part 5f, is limited by a wall of the slope 5g located on the right side of the engaging part 5f of FIG. 6 and a wall of the engaging part 5f located on the left side of the engaging part 5f of FIG. 6. In this way, axial removal of the wiper strip 5 is advantageously limited by the left side cover portion 21. Axial removal of the wiper strip 5 from the cover member 7 and the lever assembly 4 is limited only at the holding parts 21d of the left side cover portion 21, so that the wiper strip 5 is axially slidable relative to the holding parts 21d of the right side cover portion 21 of FIG. 1A and all of the holding parts 16 of the lever assembly 4 at the time of wiping the glass surface 30a. With this arrangement, the wiper strip 5 can flexibly follow the change in the curvature of the glass surface 30a. In the present case, the wiper strip 5 is non-slidably secured to the holding parts 21d of the left side cover portion 21 by engaging the holding parts 21d of the left side cover portion 21 of FIG. 1A to the engaging parts 5f of the holding grooves 5e of the wiper strip 5. However, the present invention is not limited to this. For example, in place of each engaging part 5f shown in FIG. 6, an engaging part, which is similar to the engaging part 5f, may be provided in the right side end of each holding groove 5e, which corresponds to the holding part 21d of the right side cover portion 21 of FIG. 1A, to engage with the holding part 21d of the right side cover portion 21. In this way, the wiper strip 5 can be non-slidably secured to the holding parts 21d of the right side cover portion 21. Furthermore, in another example, an engaging part, which is similar to the engaging part 5f, may be provided to the respective holding groove 5e at a position, which corresponds to one (preferably the right end one or the left end one in FIG. 1A) of the holding parts 16 of the lever assembly 4 to engage with the one of the holding parts 16. In this way, the wiper strip 5 is non-slidably secured only to the one of the holding parts 16 of the lever assembly 4. It should be noted that the engaging part 5f can be provided to only one of the holding grooves 5e of the wiper strip 5 instead of providing the engaging part 5f to each of the holding grooves 5e of the wiper strip 5 at the end of the wiper strip 5. Furthermore, more than one holding part 5f may be provided in each holding groove 5e, if desired. For example, two engaging parts 5f may be provided in each of the holding grooves 5e to respectively engage with the corresponding holding part 21d of the left side cover portion 21 and its adjacent holding part 16 of the lever assembly 4.

A wiper strip urging projection (a wiper strip urging part) 21f projects downward from an inner surface of the distal end of each of the left and right side cover portions 21. Each wiper strip urging projection 21f urges the base 5a of the wiper strip 5 at a corresponding position, which is distally of the closest outermost holding part 16, so that the wiper strip 5 can be flexed to follow the curvature of the glass surface 30a. Each section of the wiper strip 5, which is located between the corresponding end of the wiper strip 5 and the closest outermost holding part 16 of the lever assembly 4, is referred to as a follower end section.

An upper part of the base end of each side cover portion 21 is curved into an arcuate shape where a center of the arc of the arcuate shape coincides with the rotational center (the connecting projections 21c) of the side cover portion 21 when the base end of the side cover portion 21 is viewed from a lateral side of the side cover portion 21, i.e., is viewed in the transverse direction. Each end of the center cover portion 20 (the end of each of the arm covert segments 20b), which is opposed to the base end of the corresponding side cover portion 21, is concavely curved when the end of the center cover portion 20 is viewed from the lateral side of the center cover portion 20. Thus, when the side cover portion 21 is pivoted, i.e., is rotated relative to the center cover portion 20, a change in a size of a space between the side cover portion 21 and the center cover portion 20 is minimized. When viewed from the lateral side, an opposite side can be seen through a top side of the space between the side cover portion 21 and the center cover portion 20, at which the lever assembly 4 is not disposed. In order to limit this, a rib 20h, which extends linearly downward, is provided to each end of the center cover portion 20. Furthermore, the rib 20h advantageously limits formation of a sharp part at the top of the corresponding end of the center cover portion 20.

The center cover portion 20 of the cover member 7 is installed, i.e., is snap fitted to the primary lever 2 in such a manner that the center cover portion 20 receives the primary lever 2 of the lever assembly 4 through its bottom opening. At this time, the center cover portion 20 is resiliently outwardly deformed in the transverse direction by the amount that corresponds to the protruding lengths of the engaging protrusions 20f, 20g. When each engaging protrusion 20f, 20g reaches the lower surface of the corresponding one of the connecting arrangement 10 and the connections 12, the engaging protrusion 20f, 20g resiliently returns to its normal state. When each engaging protrusion 20f, 20g is engaged with the lower surface of the corresponding one of the connecting arrangement 10 and the connections 12, the center cover portion 20 is securely installed to the lever assembly 4 in a manner that limits removal of the center cover portion 20 from the lever assembly 4. The center cover portion 20 covers generally the entire primary lever 2 from the portion of one of the connections 12, at which the corresponding connecting pin 17 is provided, to the portion of the other one of the connections 12, at which the other connecting pin 17 is provided.

Furthermore, each side cover portion 21 receives the outer arm 15 of the corresponding secondary lever 3 of the lever assembly 4 through the bottom opening of the side cover portion 21. Also, the side cover portion 21 is installed to the corresponding connection 12 of the primary lever 2 and the end of the wiper strip 5 while the side cover portion 21 extends distally from the outer arm 15 over the top of the wiper strip 5. Specifically, the connecting projections 21c of each side cover portion 21 are fitted into the connecting holes 12a of the corresponding connection 12 of the primary lever 2. Thereafter, the base 5a of the wiper strip 5 is inserted to the holding parts 21d of the side cover portions 21 and the holding parts 16 of the lever assembly 4 through the window 21e of the corresponding side cover portion 21 in the longitudinal direction. In this way, each side cover portion 21 is installed to the lever assembly 4 and the wiper strip 5 in such a manner that removal of the side cover portions 21 from the lever assembly 4 and the wiper strip 5 is limited. Each side cover portion 21 extends continuously from the center cover portion 20 (the arm cover segment 20b), more specifically, from the corresponding point of the connection 12 of the primary lever portion 2, at which the connecting holes 12a are provided, until the end of the wiper strip 5 to cover the outer arm 15 of the corresponding secondary lever 3. When the side cover portions 21 and the center cover portion 20 are installed to the lever assembly 4, the lever assembly 4 is covered with the side cover portions 21 and the center cover portion 20, so that the wiper blade 1 of the present embodiment is formed to have the integral appearance, in which the wiper strip 5 appears to be integral with the side cover portions 21 and the center cover portion 20.

Next, characteristic advantages of the wiper blade 1 of the present embodiment will be described.

(1) The cover member 7, which receives and covers the lever assembly 4, includes the center cover portion 20 and the two side cover portions 21 arranged on the opposite sides of the center cover portion 20. The connecting projections 21c of each side cover portion 21 are fitted into the connecting holes 12a of the corresponding connection 12 of the primary lever 2, so that the base of the side cover portion 21 is pivotably connected to the lever assembly 4. As a result, each side cover portion 21 can pivot in conformity with flexing of the wiper strip 5. Furthermore, the holding parts 21d of the side cover portion 21 hold the wiper strip 5 at the point, which is distally of the closest outermost holding part 16 of the lever assembly 4, i.e., which is located between the corresponding end of the wiper strip 5 and the closest holding part 16 of the lever assembly 4. Thus, each end of the wiper strip 5 can show the relatively large flexing in conformity with the curvature of the wiping glass surface 30a. Particularly, in the front glass 30, the curvature is increased toward each lateral side of the front glass 30, so that each end of the wiper strip 5, which wipers the glass surface 30a of the front glass 30, shows the relatively large flexing. However, the provision of the side cover portions 21 of the above described type in the cover member 7 allows the rotation of the distal end side of each side cover portion 21 to follow the flexing of the corresponding end of the wiper strip 5. That is, formation of a substantial space between each end of the wiper strip 5 and the cover member 7 (the corresponding side cover portion 21) is limited to improve the appearance.

(2) The base end of each side cover portion 21 is connected to the corresponding connection 12 of the primary lever 2 through the connecting projections 21c, and the distal end of each side cover portion 21 is installed to the corresponding end of the wiper strip 5 through the holding parts 21d. The backing plates 6, each of which has the relatively high rigidity, are installed to the wiper strip 5, so that the ends of each side cover portion 21 are both supported by the components (the backing plates 6), which have the relatively high rigidity, and thereby each side cover portion 21 is not supported only at the one end. As a result, even when a relatively large external force is applied from, for example, a car wash machine to the side cover portions 21, removal of the side cover portions 21 from the wiper blade 1 or damage of the side cover portions 21 can be advantageously limited.

(3) Each side cover portion 21, which is connected to the corresponding connection 12 of the primary lever 2, has the rotational axis that extends in the transverse direction of the wiper blade 1. Thus, each side cover portion 21 is limited from moving in the transverse direction of the wiper blade 1, i.e., in the wiping direction of the wiper blade 1. Therefore, the ends of the wiper strip 5, which are held by the holding parts 21d of the side cover portions 21, have the improved rigidity in the wiping direction. As a result, at the time of wiping the glass surface 30a, chattering of the wiper strip 5 (leaping of the wiper strip 5 from the glass surface 30a) is advantageously limited.

(4) The side cover portions 21 are paired and are symmetrically provided at the ends of the wiper blade 1, respectively. Therefore, the appearance of the cover member 7 and thereby of the entire wiper blade 1 is advantageously improved.

(5) The side cover portions 21 are rotatably connected to the primary lever 2. Therefore, since the side cover portions 21 are rotatably connected to the metal primary lever 2, which has the relatively high strength and rigidity, the side cover portions 21 can be more effectively connected to the primary lever 2 in comparison to, for example, a case where the side cover portions 21 are connected to the resin center cover portion 20.

(6) The connecting projections 21c are formed in the inner surface of the base end of each side cover portion 21, and the connecting holes 12a are formed in each connection 12 of the primary lever 2. Since the primary lever 2 is made of the metal, it is relatively easy to form the connecting holes 12a in the primary lever 2 in comparison to a case where the connecting projections are formed in the primary lever.

(7) The cover member 7 integrally includes the fin sections 20e, 21b, which generate the urging force for urging the wiper blade 1 against the glass surface 30a upon receiving the head wind at the time of traveling of the vehicle. Therefore, at the time of traveling of the vehicle, particularly at the time of high speed traveling of the vehicle, the fin sections 20e, 21b advantageously limit lifting of the wiper blade 1 from the glass surface 30a to improve the wiping performance of the wiper blade 1. Furthermore, the fin sections 20e, 21b are formed integrally in the cover member 7, so that an increase in the number of components of the wiper blade 1 is advantageously limited.

(8) The fin sections 21b are provided in the side cover portions 21, so that the urging force is advantageously applied to the ends of the wiper strip 5 from the fin sections 21b through the holding parts 21d and the wiper strip urging projections 21f of the side cover portions 21 without passing through the lever assembly 4. As a result, the lifting of the ends of the wiper strip 5 from the glass surface 30a can be advantageously limited.

SECOND EMBODIMENT

A second embodiment of the present invention will be described with reference to the accompanying drawings.

The wiper blade 1 of the present embodiment differs from the wiper blade 1 of the first embodiment mainly in the structure of the cover member 7. Thus, in the following description, the cover member 7 will be mainly described, and the components similar to those of the first embodiment will be indicated by the same numerals and will not be described further.

As shown in FIGS. 7A to 9, the cover member 7 includes the center cover portion 20 and the two side cover portions 21. The side cover portions 21 are located at opposed ends, respectively, of the center cover portion 20. Each of the center cover portion 20 and the side cover portions 21 is made of the synthetic resin material and has a predetermined rigidity. The center cover portion 20 and the side cover portions 21 receive and cover the lever assembly 4 in such a manner that the center cover portion 20 and the side cover portions 21 cooperate together to extend from the one end to the other end of the wiper strip 5. Thus, the center cover portion 20 and the side cover portions 21 provide the integral appearance in corporation with the wiper strip 5.

The center cover portion 20 is formed to cover the connecting arrangement 10 and the base ends of the arms 11 of the primary lever 2. The center cover portion 20 has the two lateral walls, which are parallel to each other. Furthermore, the transverse center of the center cover portion 20 is located on the center line L1 of the wiper blade 1. A rectangular opening 20c is formed in a top center of the center cover portion 20 to expose the connecting arrangement 10 therefrom.

Furthermore, four engaging protrusions 20f are formed in the inner surface of the center cover portion 20 to engage with the lower surfaces of the connecting arrangement 10 of the primary lever 2 at predetermined four locations. When the center cover portion 20 is installed to the primary lever 2, each engaging protrusion 20f engages the lower surface of the connecting arrangement 10 to limit movement of the center cover portion 20 in the direction opposite from the installation direction of the center cover portion 20 and thereby to limit removal of the center cover portion 20 from the primary lever 2.

The two side cover portions 21 are symmetrically configured. Each side cover portion 21 is formed to have a generally V-shaped cross section, which is opened on a lower side thereof (the wiper strip 5 side). Each side cover portion 21 extends from the base end of the corresponding arm 11 of the primary lever 2 to the corresponding end of the wiper strip 5. Furthermore, a height of the top ridge 21a of each side cover portion 21 is progressively decreased from a predetermined longitudinal point toward the distal end (the end of the wiper strip 5). A window 21e is provided in the distal end of each side cover portion 21 in a form of a recess, which is recessed from the lower edge of the distal end of the side cover portion 21. The wiper strip 5, to which the backing plates 6 are installed, can be inserted through the window 21e in the longitudinal direction.

Furthermore, each side cover portion 21 has the fin section 21b that is formed integrally in the side cover portion 21. More specifically, in each side cover portion 21, the fin section 21b extends from the top ridge 21a, which is offset from the center line L1 of the wiper blade 1 on the one transverse side of the center line L1 of the wiper blade 1, into the other transverse side of the center line L1 of the wiper blade 1. The fin section 21b is formed into a slant surface, which generates an urging force for urging the wiper blade 1 against the glass surface 30a upon receiving the head wind applied to the traveling vehicle.

Furthermore, two connecting projections 21c are formed in the inner surface of the base end of each side cover portion 21. Two connecting holes 11a are provided in the base end of each arm 11 of the primary lever 2. In the present embodiment, the connecting holes 12a of the connections 12 of the first embodiment are eliminated, and the length of each connection 12 is shortened in comparison to that of the first embodiment. The side cover portions 21 are rotatably connected to the primary lever 2 (the arms 11) in such a manner that the connecting projections 21c, which are provided in the base ends of the side cover portions 21, are fitted into the connecting holes 11a of the arms 11. In this case, the rotational axis of each side cover portion 21 extends in the transverse direction of the wiper blade 1, like in the first embodiment. The base end of each side cover portion 21 of the present embodiment is configured to be received in the center cover portion 20.

Furthermore, the holding parts 21d are formed in the inner surface of the distal end of each side cover portion 21 to receive the base 5a of the wiper strip 5 in the longitudinal direction. The holding parts 21d hold the base 5a of the wiper strip 5 on the distal end side of the closest outermost holding part 16 of the lever assembly 4, which is closest to the corresponding distal end of the wiper strip 5, so that the wiper strip 5 can be flexibly bent in conformity with the curvature of the glass surface 30a. The wiper strip urging projection 21f projects downward from the inner surface of the distal end of each side cover portion 21, so that each wiper strip urging projection 21f urges the base 5a of the wiper strip 5 at the corresponding position, which is distally of the corresponding outermost holding part 16, so that the wiper strip 5 can be flexed to follow the curvature of the glass surface 30a.

In the cover member 7 constructed in the above described manner, each side cover portion 21 is installed such that the connecting projections 21c of the side cover portion 21 are fitted into the connecting holes 11a of the corresponding arm 11 of the primary lever 2. Therefore, each side cover portion 21 receives the corresponding arm 11 of the primary lever 2 and the outer arm 15 of the corresponding secondary lever 3. Next, the center cover portion 20 is installed to the connecting arrangement 10 of the primary lever 2, i.e., the engaging protrusions 20f of the center cover portion 20 are engaged with the lower surfaces of the connecting arrangement 10 in such a manner that the center cover portion 20 receives the base end of each side cover portion 21. Thereafter, the base 5a of the wiper strip 5 is inserted to the holding parts 21d of the side cover portions 21 and the holding parts 16 of the lever assembly 4 through the window 21e of the corresponding side cover portion 21 in the longitudinal direction. In this way, each side cover portion 21 is installed to the lever assembly 4 and the wiper strip 5 in such a manner that removal of the side cover portion 21 from the lever assembly 4 and the wiper strip 5 is limited. Even in this embodiment, in which the cover member 7 having the side cover portions 21 and the center cover portion 20 is installed to the lever assembly 4, the cover member 7 covers the lever assembly 4 to provide the integral appearance of the wiper blade 1 in corporation with the wiper strip 5.

The wiper blade 1 of the present embodiment provides the advantages described in the above sections (1)-(8) although there are small modifications in comparison to the wiper blade 1 of the first embodiment. In addition, in the present embodiment, the base end of each side cover portion 21 is received in the center cover portion 20. In this way, when the wiper blade 1 is viewed from its lateral side, formation of a substantial space in the connection between each side cover portion 21 and the center cover portion 20 is limited. This contributes to improvement of the appearance of the wiper blade 1.

THIRD EMBODIMENT

A third embodiment of the present invention will be described with reference to the accompanying drawings.

The wiper blade 1 of the present embodiment differs from the wiper blade 2 of the second embodiment mainly in the structure of the cover member 7. Thus, in the following description, the cover member 7 will be mainly described, and the components similar to those of the first and second embodiments will be indicated by the same numerals and will not be described further.

As shown in FIGS. 10A to 12, the cover member 7 includes the center cover portion 20, the side cover portion 21 and a side cover portion 22, which are made of the synthetic resin and have the predetermined rigidity. The side cover portion 21 is located on the one side of the center cover portion 20, and the side cover portion 22 is located on the other side of the center cover portion 20. That is, the wiper blade 1 of the present embodiment has the side cover portion 21 of the second embodiment only on the one side of the center cover portion 20.

The side cover portion 22 is formed to have a generally V-shaped cross section, which is opened on a lower side thereof (the wiper strip 5 side). The side cover portion 22 extends from the base end of the corresponding arm 11 of the primary lever 2 to the outermost holding part 16 of the corresponding secondary lever 3. Furthermore, the side cover portion 22 has a fin section 22b that is formed integrally in the side cover portion 22. More specifically, in the side cover portion 22, the fin section 22b extends from a top ridge 22a, which is offset from the center line L1 of the wiper blade 1 on the one transverse side of the center line L1 of the wiper blade 1, into the other transverse side of the center line L1 of the wiper blade 1. The fin section 22b is formed into a slant surface, which generates an urging force for urging the wiper blade 1 against the glass surface 30a upon receiving the head wind applied to the traveling vehicle.

Furthermore, two connecting projections 22c are formed in the inner surface of the base end of the side cover 22 and are fitted into the two connecting holes 1a of the base end of the corresponding arm 11 of the primary lever 2. The side cover portion 22 is rotatably connected to the primary lever 2 (the arm 11) in such a manner that the connecting projections 22c, which are provided in the base end of the side cover portion 22, are fitted into the connecting holes 11a of the corresponding arm 11 of the primary lever 2. In this case, the rotational axis of the side cover portion 22 extends in the transverse direction of the wiper blade 1, like that of the side cover portion 21 in the second embodiment. The base end of the side cover portion 22 of the present embodiment is configured to be received in the center cover portion 20.

Furthermore, holding parts 22d are formed in the inner surface of the distal end of the side cover portion 22 to hold the base 5a of the wiper strip 5. The holding parts 22d are configured in such a manner that the holding parts 22d are installable to the base 5a of the wiper strip 5 from the top side of the base 5a.

Furthermore, in a section between the end (the left end in FIG. 10A or 10B) of the wiper strip 5 and the closest outermost holding part 16 of the secondary lever 3 located adjacent to the end of the side cover portion 22, a fin section 5d project upwardly from the top surface of the wiper strip 5 in conformity with the outer shape of the side cover 22 in such a manner that the fin section 5d extends continuously from the side cover portion 22.

Even in this embodiment, in which the cover member 7 having the side cover portions 21, 22 and the center cover portion 20 is installed to the lever assembly 4, the cover member 7 covers the lever assembly 4 to provide the integral appearance of the wiper blade 1 in corporation with the wiper strip 5. The wiper blade 1 of the present embodiment provides advantages similar to those of the wiper blade 1 of the second embodiment with respect to the side cover portion 21.

FOURTH EMBODIMENT

A fourth embodiment of the present invention will be described with reference to the accompanying drawings.

Figure 13A:
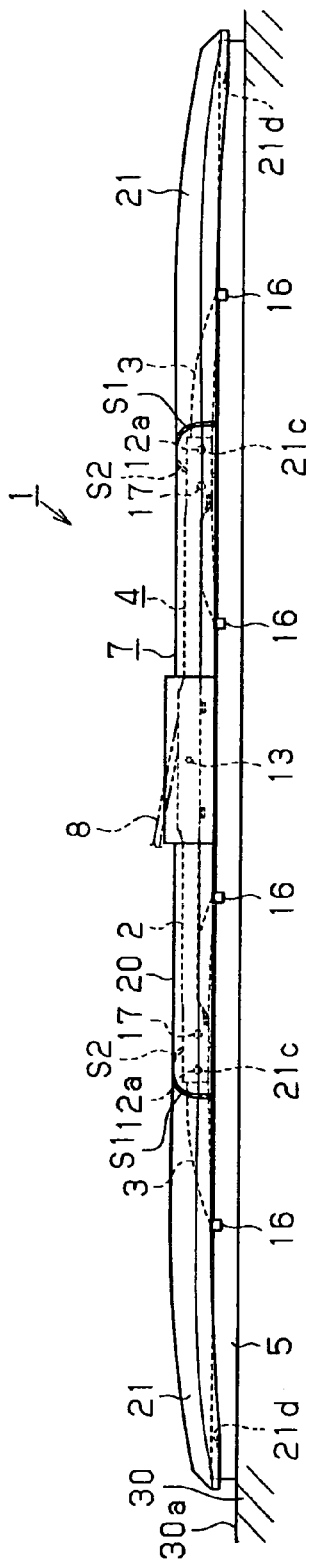
FIG. 13A is a side view of a wiper blade, to which a cover member of a fourth embodiment of the present invention is installed.
Figure 13B:
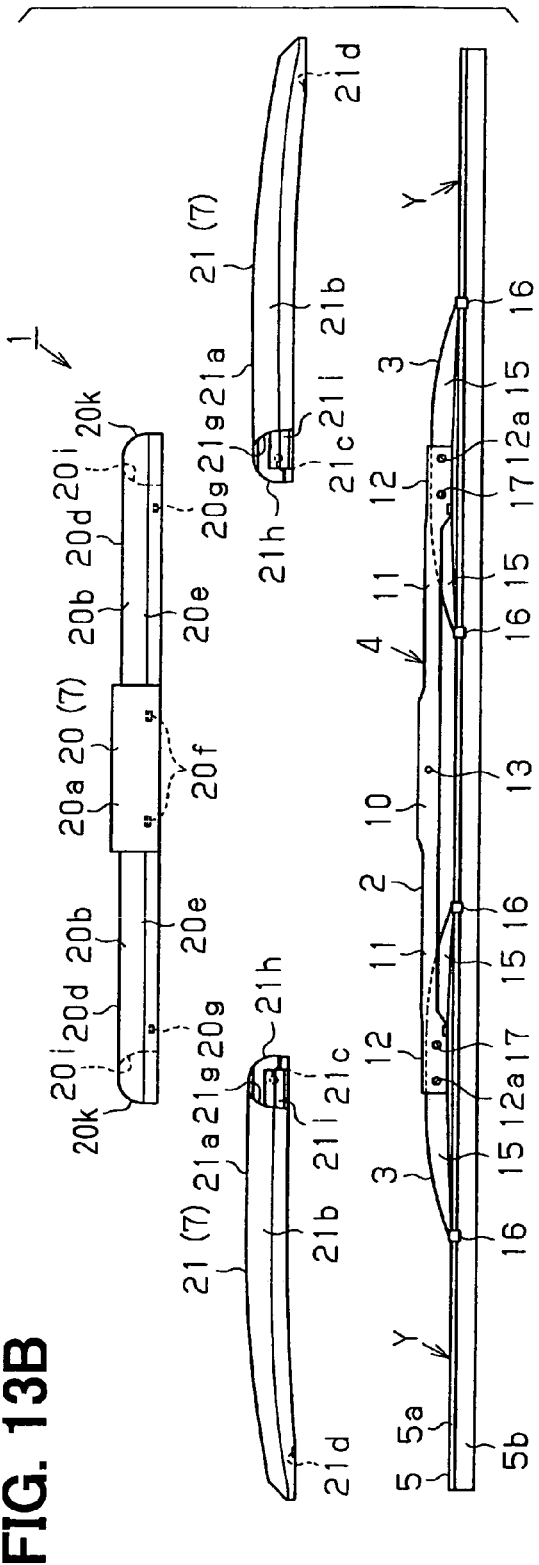
FIG. 13B is a side view of the wiper blade before the installation of the cover member of the fourth embodiment.
Figure 14A:
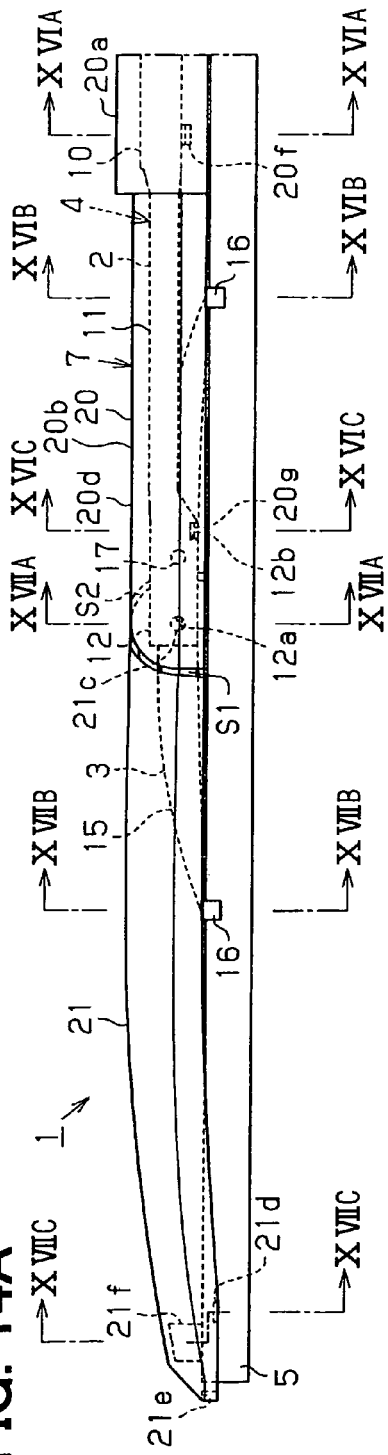
FIG. 14A is an enlarged partial view of FIG. 13A.
Figure 14B:
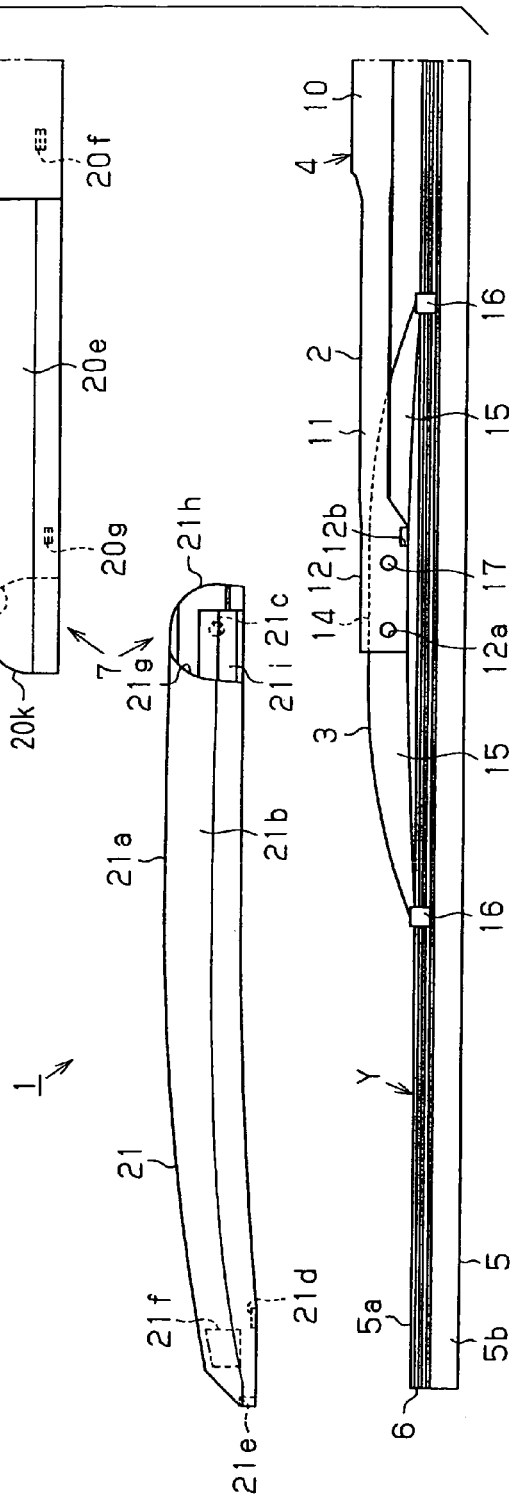
FIG. 14B is an enlarged partial view of FIG. 13B.

FIG. 13A shows the wiper blade 1 of the present embodiment. As shown in FIGS. 13A to 15, the wiper blade 1 includes a lever assembly 4, a wiper strip 5, two backing plates 6 and a cover member 7. The lever assembly 4 includes a primary lever 2 and two secondary levers 3, which are connected in tournament style.

In the lever assembly 4, the primary lever 2 is formed through a press working process of a metal plate material such that the primary lever 2 has a mountain fold, which including a lower side (wiper strip 5 side) opening that extends along the entire length of the primary lever 2 in the longitudinal direction. The primary lever 2 includes a connecting arrangement 10, two arms 11 and two connections 12. The connecting arrangement 10 is provided in a longitudinal center of the primary lever 2. The arms 11 longitudinally extend from opposed ends of the connecting arrangement 10. The connections 12 are provided to distal ends of the arms 11, respectively, i.e., are provided to opposed ends, respectively, of the primary lever 2.

Figure 15:
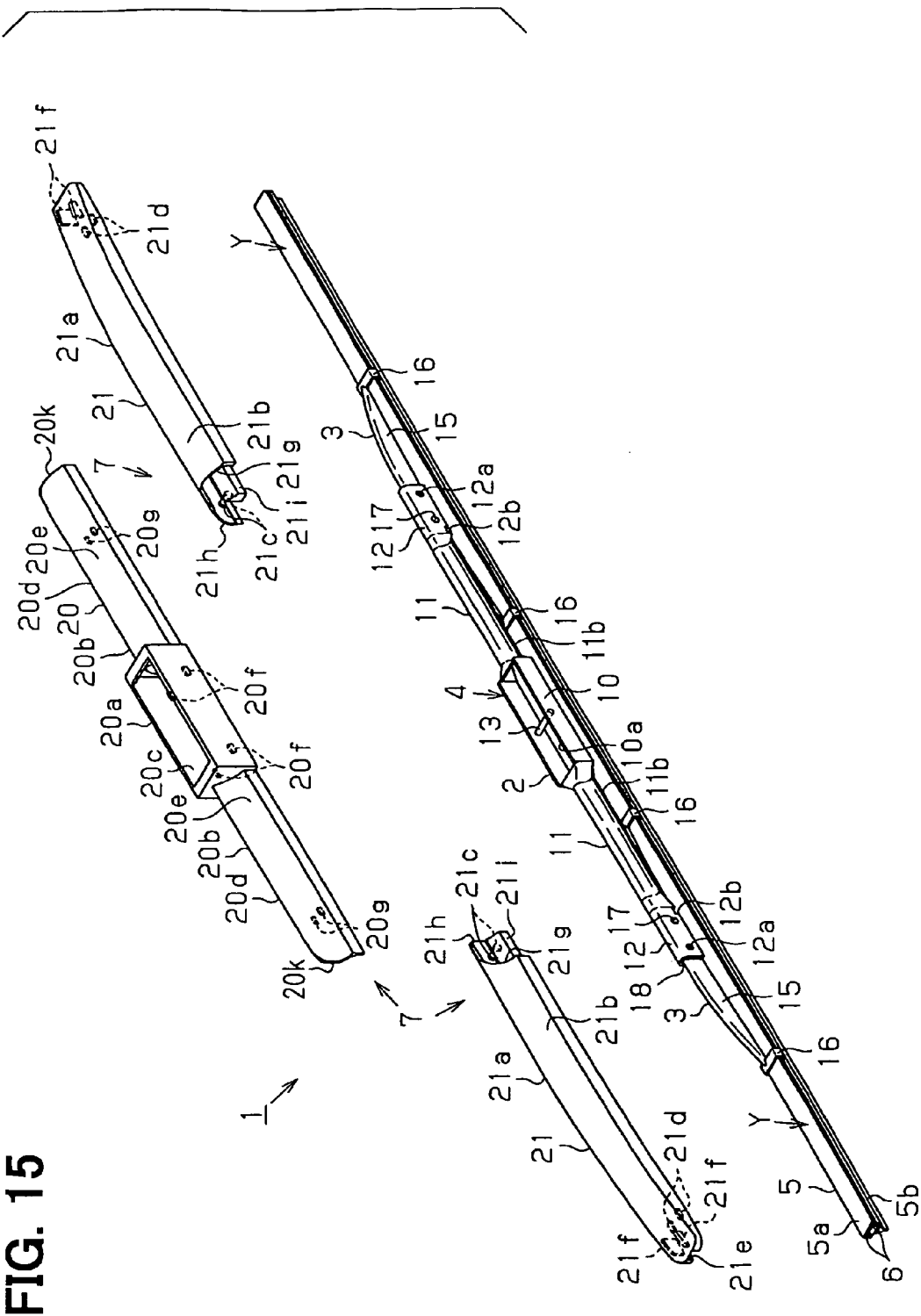
FIG. 15 is a perspective view of the wiper blade before the installation of the cover member of the fourth embodiment.
Figure 16A:
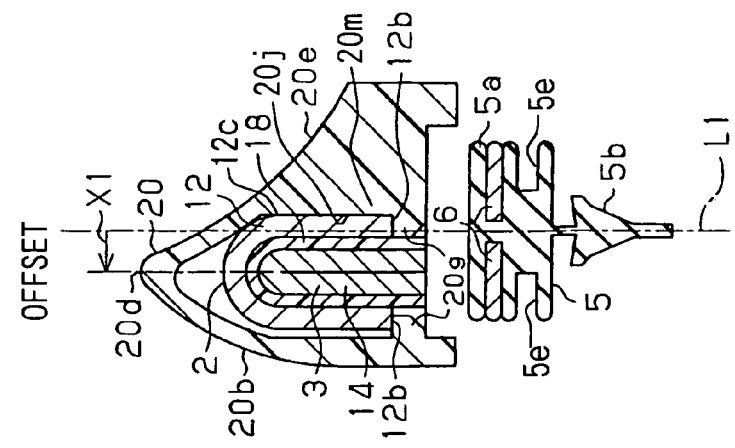
FIG. 16A is a cross sectional view along line XVIA-XVIA in FIG. 14A.

As shown in FIGS. 15 and 16A, the connecting arrangement 10 has a rectangular opening 10a for receiving the distal end of the wiper arm 8, and two lateral walls of the connecting arrangement 10 are bent to extend parallel to each other. A transverse center of the connecting arrangement 10 coincides with a center line L1 of the wiper blade 1 (the wiper strip 5). A connecting pin 13 is provided to the connecting arrangement 10 to rotatably connect with the distal end of the wiper arm 8 through a connecting clip (not shown).

Figure 16B:
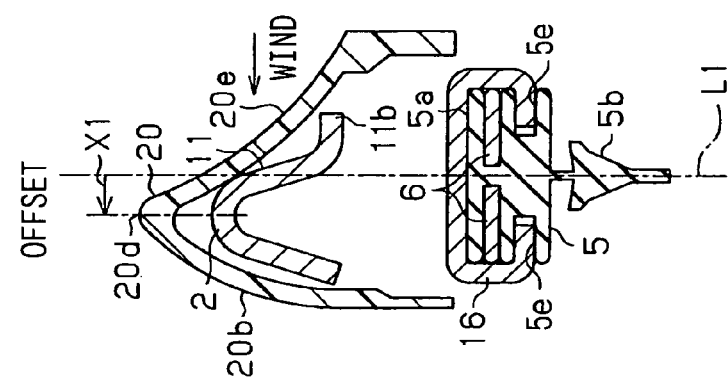
FIG. 16B is a cross sectional view along line XVIB-XVIB in FIG. 14A.

As shown in FIG. 16B, each arm 11 is formed to have a generally U-shaped cross section, which has an opening on the lower side thereof (the wiper strip 5 side) and diverges toward the opening. A transverse center of the arm 11 is offset a predetermined distance from the center line L1 of the wiper blade 1 on one transverse side of the center line L1 of the wiper blade 1. The offset amount (i.e., the amount of offset) of the transverse center of the arm 11 of the present embodiment is set to be substantially the same as the offset amount X1 of each of fin sections 20e, 21b of the cover member 7 described below. The other transverse side of the arm 11 is bent outwardly in the transverse direction to form a bent part 11b, which improves the rigidity of the arm 11.

Figure 16C:
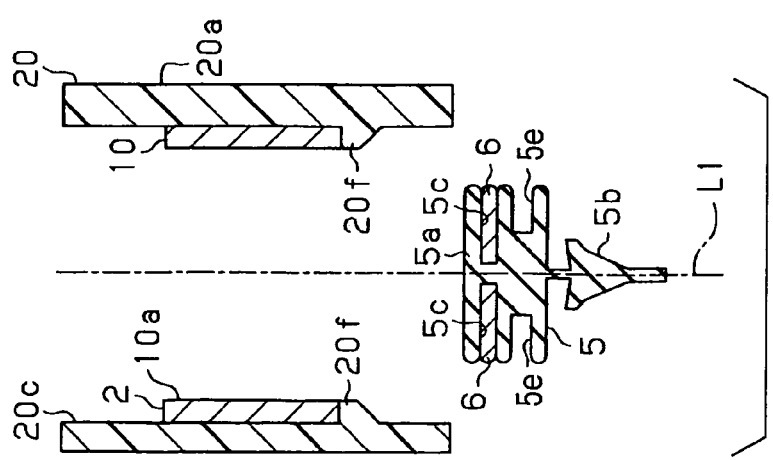
FIG. 16C is a cross sectional view along line XVIC-XVIC in FIG. 14A.

As shown in FIG. 16C, the connection 12 is bent to have a generally U-shaped cross section, which has an opening on the lower side thereof (the wiper strip 5 side). A center of the corresponding secondary lever 3 is rotatably connected to the connection 12 through a connecting pin 17.

Two connecting holes 12a penetrate through distal end side lateral walls, respectively, of the connection 12, which are located distally of the connecting pin 17. Each connecting hole 12a extends along a straight line, which is parallel to an axis of the connecting pin 17. The connecting holes 12a receive and connect with connecting projections 21c, respectively, which are provided in the cover member 7.

Each secondary lever 3 is formed to have a mountain fold, which extends in the longitudinal direction, through a press working process of a metal plate material. The secondary lever 3 includes a connection 14, two arms 15 and two holding parts 16. The connection 14 is provided in a longitudinal center of the secondary lever 3. The arms 15 longitudinally extend from opposed ends of the connection 14. The holding parts 16 are provided to distal ends of the arms 11, respectively, i.e., are provided to opposed ends, respectively, of the secondary lever 3.

Figure 17C:
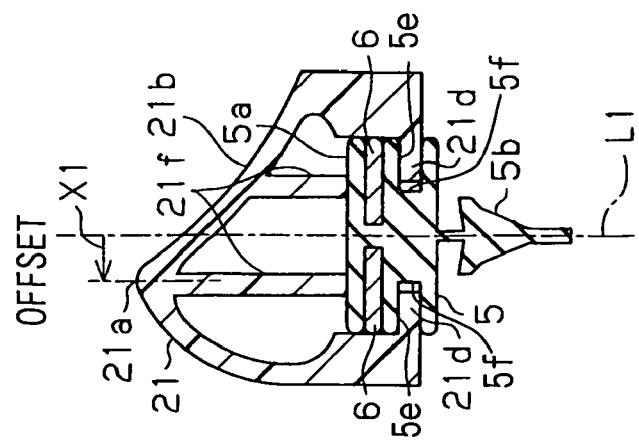
FIG. 17C is a cross sectional view along line XVIIC-XVIIC in FIG. 14A.
Figure 17B:
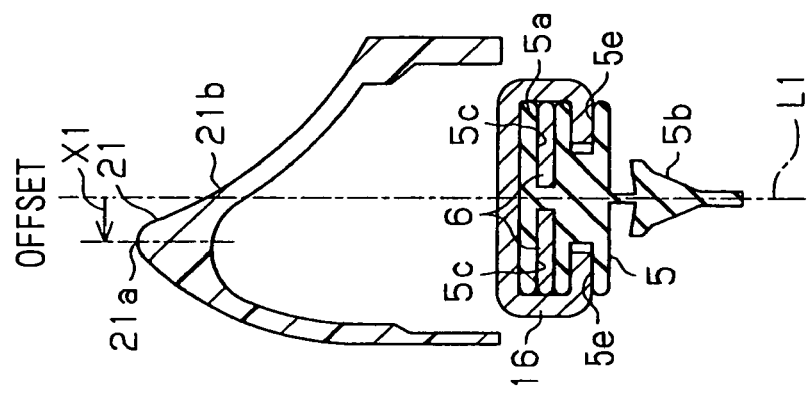
FIG. 17B is a cross sectional view along line XVIIB-XVIIB in FIG. 14A.
Figure 17A:
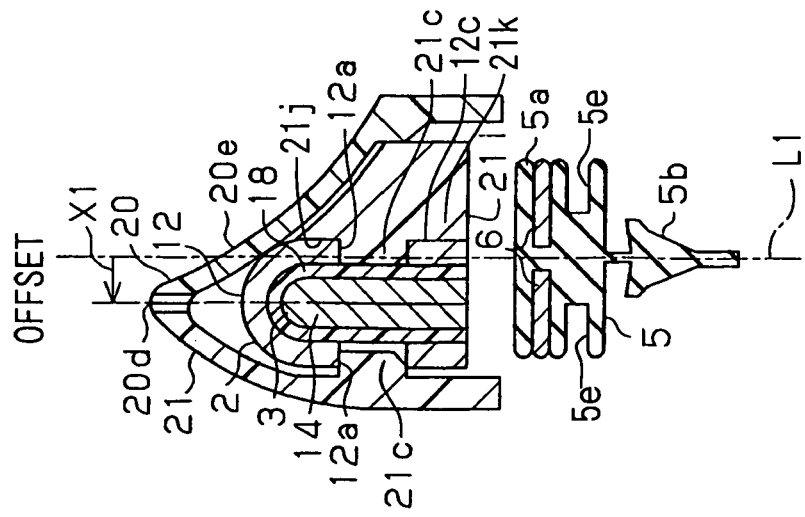
FIG. 17A is a cross sectional view along line XVIIA-XVIIA in FIG. 14A.

As shown in FIGS. 16C and 17A, each of the connection 14 and the arms 15 is formed to have the mountain fold in such a manner that two lateral walls thereof are placed next to each other. The connection 14 of the secondary lever 3 is rotatably connected to the corresponding connection 12 of the primary lever 2 through the connecting pin 17 in such a manner that the connection 14 and one of the arms 15 of the secondary lever 3 are received in the connection 12 of the primary lever 2. A damper 18 is interposed between the connection 14 of each secondary lever 3 and the corresponding connection 12 of the primary lever 2. The damper 18 is made of a synthetic resin material and is configured to have a generally U-shaped cross section, which has an opening on the lower side thereof (the wiper strip 5 side). The damper 18 is arranged between the connection 12 of the primary lever 2 and the connection 14 of the secondary lever 3 in such a manner that the connecting pin 17, which connects the secondary lever 3 to the primary lever 2, extends through the damper 18. The damper 18 is provided to achieve smooth rotational movement of the secondary lever 3 relative to the primary lever 2 while limiting chattering movement between the secondary lever 3 and the primary lever 2.

A transverse center of each arm 15 is offset a predetermined offset amount equal to the offset amount of the arm 11 of the primary lever 2 from the center line L1 of the wiper blade 1, so that the arm 15 and the adjacent arm 11 of the primary lever 2 extend generally along a straight line.

The holding parts 16 of the arms 15, which are provided to distal ends of the arms 15, i.e., which are provided to the opposed ends of the secondary lever 3, are bent to have a generally C-shaped cross section, which is opened on a lower side thereof (the wiper strip 5 side), as shown in FIG. 17B. A transverse center of each holding part 16 coincides with the center line L1 of the wiper blade 1. The base 5a of the wiper strip 5, to which the backing plates 6 are mounted, is inserted into the respective holding parts 16 in the longitudinal direction, so that distal ends of each of the holding parts 16 are received in the holding grooves 5e of the base 5a of the wiper strip 5, which extend continuously in the base 5a of the wiper strip 5. The holding parts 16 hold the wiper strip 5 in a manner that allows flexing of the wiper strip 5 in conformity with the curvature of the glass surface 30a of the wiper strip 5.

The wiper strip 5 is elongated and is made of a resilient material, such as a rubber material or a resilient synthetic material. As shown in FIGS. 16A to 17C, the wiper strip 5 includes the base 5a and a wiping lip 5b. The base 5a is held by the holding parts 16 of the lever assembly 4. The wiping lip 5b extends from the base 5a, and a distal end of the wiping lip 5b directly wipes, for example, rain droplets on the glass surface 30a. The base 5a and the wiping lip 5b extend continuously in the longitudinal direction of the wiper strip 5. In the following respective drawings, some lines on a lateral side surface of the wiper strip 5 are eliminated for the sake of clarity.

Two parallel backing plate receiving grooves 5c extend longitudinally in the base 5a of the wiper strip 5 above the holding grooves 5e (on the side opposite from the wiping lip 5b). The backing plates 6, each of which is formed into an elongated plate from a metal material having a spring characteristic, are received in the backing plate receiving grooves 5c, respectively. In each corresponding drawing, the backing plates 6 are drawn to extend along the straight line for the sake of clarity of the drawing. However, in reality, in a natural state (in an unloaded state), slightly arcuately curved segments are continuously provided one after another in the longitudinal direction in each backing plate 6, so that a longitudinal center of the backing plate 6 is convexly curved in a direction away from the glass surface 30a. In this state, a curvature of the backing plate 6 is larger than that of the glass surface 30a, i.e., a radius of curvature of the backing plate is smaller than that of the glass surface 30a. With the above structure, the wiper strip 5 is curved in conformity with the shape of the backing plates 6. At the time of wiping the glass surface 30a, when the urging force is applied from the wiper arm 8, the urging force is spread over the wiper strip 5 through the lever assembly 4, so that the wiper strip 5 is flexibly and resiliently deformed in conformity with the curvature of the glass surface 30a. The urging force, which is applied from the wiper arm 8 toward the glass surface 30a and is distributed by the lever assembly 4, is spread by the backing plates 6 over the wiper strip 5 in the longitudinal direction.

In the present embodiment, each of the wiper strip 5 and the backing plates 6 are formed to protrude outwardly a predetermined length from the corresponding outermost holding part 16 (e.g., the left end holding part 16 in FIG. 14A or 14B) of the lever assembly 4 in the longitudinal direction to allow appropriate flexing of the wiper strip 5 in conformity with the curvature of the glass surface 30a. Each section of the wiper strip 5 (including the backing plates 6), which is located between the corresponding end of the wiper strip 5 and the closest outermost holding part 16 of the lever assembly 4, is referred to as a follower end section Y As shown in FIG. 15, the cover member 7 includes the center cover portion 20 and the two side cover portions 21. The side cover portions 21 are located at opposed ends, respectively, of the center cover portion 20. Each of the center cover portion 20 and the side cover portions 21 is made of the synthetic resin material and has a predetermined rigidity. The center cover portion 20 and the side cover portions 21 receive and cover the lever assembly 4. Furthermore, the center cover portion 20 and the side cover portions 21 extend to the ends of the wiper strip 5. That is, a longitudinal length of the cover member 7 is longer than a longitudinal length of the lever assembly 4, so that the cover member 7 extends from the one end to the other end of the wiper strip 5 to provide an integral appearance together with the wiper strip 5. The cover member 7 is molded from the resin material, which is previously colored by adding corresponding color pigment(s) to the resin material. In this case, the color of the cover member 7 can be set to any desired color, such as black color or blue color. However, it is desirable to coincide the color of the cover member 7 with the color of the vehicle body or the color of a cowl top panel, which is located adjacent to the wiper blade 1.

The center cover portion 20 includes a connecting arrangement cover segment 20*a* and two arm cover segments 20*b*. The connecting arrangement cover segment 20*a* is provided generally in a center of the center cover portion 20 and covers the connecting arrangement 10 of the primary lever 2. The arm cover segments 20*b* are arranged at opposed ends, respectively, of the connecting arrangement cover segment 20*a* to generally entirely cover the arms 11 of the primary lever 2.

As shown in FIG. 16A, the connecting arrangement cover segment 20*a* is formed to have parallel lateral walls, and a transverse center of the connecting arrangement cover segment 20*a* coincides with the center line L1 of the wiper blade 1. A rectangular opening 20*c* is formed in a top of the connecting arrangement cover segment 20*a* to expose the connecting arrangement 10 therefrom.

As shown in FIGS. 16B and 16C, each arm cover segment 20*b* is formed to have a generally V-shaped cross section, which is opened on a lower side thereof (the wiper strip 5 side). Similar to the arms 11 of the primary lever 2, the top ridge 20*d* of each arm cover segment 20*b* is offset the offset amount X1 from the center line L1 of the wiper blade 1 on the one transverse side of the center line L1. That is, at a stop position of the wiper arm 8, the top ridge 20*d* is offset the offset amount X1 from the center line L1 on the head wind downstream side (on a vehicle rear side) of the center line L1. A fin section 20*e* is integrally formed in the arm cover segment 20*b* to extend from the top ridge 20*d* into the other transverse side of the center line L1 of the wiper blade 1. The fin section 20*e* is formed into a slant surface, which generates an urging force for urging the wiper blade 1 against the glass surface 30*a* upon receiving the head wind applied to the traveling vehicle. The fin section 20*e* is formed to extend from the top ridge 20*d*, which is offset from the center line L in the manner described above, so that a transverse size of the fin section 20*e* is increased while limiting an increase in a transverse size of the arm cover segment 20*b*.

As shown in FIGS. 13A to 15, a distal end of each arm cover segment 20*b* is constructed in such a manner that a distal end front side opposing part (or simply referred to as a front side opposing part) 20*k*, which is opposed to the corresponding side cover portion 21 on a fin section 20*e* side (vehicle front side), is shaped differently from a distal end rear side opposing part (or simply referred to as a rear side opposing part) 20*i*, which is opposed to the corresponding side cover portion 21 on a counter fin section 20*e* side (vehicle rear side). That is, when viewed from the fin section 20*e* side (vehicle front side), a projecting length of the distal end front side opposing part 20*k* in the longitudinal direction is increased in a direction away from the top ridge 20*d* toward a lower end thereof, and the majority of the distal end front side opposing part 20*k* at a top edge thereof forms an arc. The arc of the edge of the distal end front side opposing part 20*k* is centered in a center of the connecting holes 12*a* of the primary lever 2, i.e., in the rotational axis of the corresponding side cover portion 21 after installation of the center cover portion 20 to the primary lever 2. The distal end front side opposing part 20*k* covers the primary lever 2 up to the distal end of the corresponding connection 12 of the primary lever 2. In contrast, when viewed from the fin section 20*e* side (vehicle front side), the distal end rear side opposing part 20*i* is recessed from the top ridge 20*d* toward the lower end in the longitudinal direction, and the majority of the distal end rear side opposing part 20*i* at a top edge thereof forms an arc. The arc of the edge of the distal end rear side opposing part 20*i* is also centered in the center of the connecting holes 12*a* of the primary lever 2, i.e., in the rotational axis of the corresponding side cover portion 21 upon installation of the center cover portion 20 to the primary lever 2. The distal end rear side opposing part 20*i* covers the primary lever 2 up to a point, which is spaced from the connecting holes 12*a* of the corresponding connection 12 of the primary lever 2 on the primary lever 2 center side of the connecting holes 12*a*.

As shown in FIG. 16A, four engaging protrusions 20*f* are formed in an inner surface of the connecting arrangement cover segment 20*a* to engage with the lower surfaces of the connecting arrangement 10 of the primary lever 2 at predetermined four locations. Also, as shown in FIG. 16C, two engaging protrusions 20*g* project from the inner surface of the distal end of each arm cover segment 20*b* in the transverse direction to engage with two engaging grooves 12*b*, which are provided in the lower surfaces of the corresponding connection 12 of the primary lever 2. When the center cover portion 20 is installed to the lever assembly 4, each engaging protrusion 20*f*, 20*g* engages the lower surface of the corresponding one of the connecting arrangement 10 and the connections 12 to limit movement of the center cover portion 20 in the direction opposite from the installation direction of the center cover portion 20.

Figure 19A:
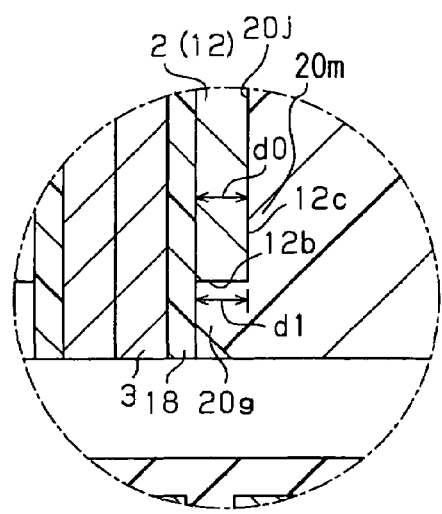
FIG. 19A is an enlarged partial view of FIG. 16C.
Figure 19B:
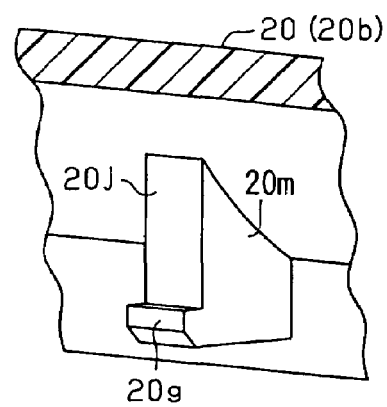
FIG. 19B is a perspective view showing a projection shown in FIG. 19A.

Furthermore, as shown in FIGS. 16C, 19A and 19B, a limiting wall 20*m* in a form of a rib is provided adjacent to the engaging protrusion 20*g*, which is provided to the inner surface of the distal end of the each arm cover segment 20*b* on the fin section 20*e* side thereof (vehicle front side), in such a manner that the limiting wall 20*m* extends continuously from the engaging protrusion 20*g*. An inner surface of the limiting wall 20*m* forms a limiting surface (limiting part) 20*j*. At the time of installing the center cover portion 20, the limiting surface 20*j* contacts one side surface 12*c* of the corresponding connection 12 of the primary lever 2. That is, the limiting surface 20*j* defines the position of the center cover portion 20 relative to the primary lever 2 in the transverse direction when the limiting surface 20*j* contacts the side surface 12*c* of the corresponding connection 12 of the primary lever 2. Furthermore, the projecting length d1 of the engaging protrusion 20*g*, which is measured from the limiting surface 20*j*, is set to be generally the same as the wall thickness d0 of the primary lever 2. That is, when the limiting surface 20*j* engages the side surface 12*c* of the connection 12, inward projection of the engaging protrusion 20*g* from the primary lever 2 is limited. In this way, the distal end of the engaging protrusion 20*g* does not substantially contact or interfere with the damper 18, which is interposed between the primary lever 2 and the secondary lever 3. Therefore, smooth rotation of the secondary lever 3 relative to the primary lever 2 is not interfered.

The two side cover portions 21 are symmetrically configured, as shown in FIG. 15. Each side cover portion 21 is formed to have a generally V-shaped cross section, which is opened on a lower side thereof (the wiper strip 5 side). The side cover portion 21 extends from a point, at which the connecting hole 12a of the corresponding connection 12 of the primary lever 2 is provided, to the corresponding end of the wiper strip 5. Furthermore, a height of the top ridge 21a of the side cover portion 21 is progressively decreased from a predetermined longitudinal point toward the distal end (the end of the wiper strip 5). A window 21e is provided in the distal end of each side cover portion 21 in a form of a recess, which is recessed from the lower edge of the distal end of the side cover portion 21. The wiper strip 5, to which the backing plates 6 are mounted, can be inserted through the window 21e in the longitudinal direction. That is, even in the state where the side cover portions 21 are installed to the primary lever 2, the wiper strip 5 can be installed to the lever assembly 4 through the window 21e in the longitudinal direction.

As shown in FIGS. 17A to 17C, the top ridge 21a is offset a predetermined amount X1, which is the same as that of the arm cover segment 20b of the center cover portion 20, from the center line L1 of the wiper blade 1 (i.e., the center line of the wiper strip 5) on the one transverse side of the center line L1 to continuously extend from the adjacent arm cover segment 20b of the center cover portion 20. That is, at a stop position of the wiper arm 8, the top ridge 21a is offset the offset amount X1 from the center line L1 on the head wind downstream side (on a vehicle rear side) of the center line L1. Similar to the arm cover segment 20b, a fin section 21b is integrally formed in the side cover portion 21 to extend from the top ridge 21a into the other transverse side of the center line L1 of the wiper blade 1. The fin section 21b is formed into a slant surface, which generates an urging force for urging the wiper blade 1 against the glass surface 30a upon receiving the head wind applied to the traveling vehicle. The fin section 21b is formed to extend from the top ridge 21a, which is offset from the center line L in the manner described above, so that a transverse size of the fin section 21b is increased while limiting an increase in a transverse size of the side cover portion 21.

As shown in FIGS. 13A to 15, in the base end of each side cover portion 21, the distal end front side opposing part (front side opposing part) 21g, which is opposed to the corresponding opposing part 20k of the center cover portion 20 on the fin section 21b side (vehicle front side) of the top ridge 21a, has a shape that is different from that of a base end rear side opposing part (rear side opposing part) 21h, which is opposed to the corresponding opposing part 20i of the center cover portion 20 on the counter fin section 21b side (vehicle rear side) of the top ridge 21a. That is, when viewed from the fin section 21b side (vehicle front side), the base end front side opposing part 21g is recessed from the top ridge 21a toward the lower end, and the majority of the base end front side opposing part 21g at a top edge thereof forms an arc. The arc of the edge of the base end front side opposing part 21g is centered in a center of the connecting projections 21c inserted into the connecting holes 12a of the primary lever 2, i.e., in the rotational axis of the side cover portion 21. In contrast, when viewed from the fin section 20e side (vehicle front side), a projecting length of the base end rear side opposing part 21h in the longitudinal direction is increased in a direction away from the top ridge 21a toward a lower end thereof, and the majority of the base end rear side opposing part 21h at a top edge thereof forms an arc. The arc of the edge of the base end rear side opposing part 21h is centered in the center of the connecting projections 21c inserted into the connecting holes 12a of the primary lever 2, i.e., in the rotational axis of the side cover portion 21.

That is, each of the arc of the front side opposing part 20k and the arc of the rear side opposing part 20i of the center cover portion 20 and the arc of the front side opposing part 21g and the arc of the rear side opposing part 21h of the side cover portion 21 is formed as a corresponding arcuate section of a common circle, which is centered in the rotational axis of the side cover portion 21. A space (forming a boundary) S1, S2 of a predetermined width, which is determined upon consideration of rotational movement of the side cover portion 21 and the appearance, is provided between the front side opposing part 20k and the front side opposing part 21g and is also provided between the rear side opposing part 20i and the rear side opposing part 21h. Since the front side opposing parts 20k, 21g and the rear side opposing parts 20i, 21h are arcuately shaped about the rotational axis of the side cover portion 21, a change in the size of the space S1 between the front side opposing part 20k and the front side opposing part 21g and a change in the size of the space S2 between the rear side opposing part 20i and the rear side opposing part 21h are minimized.

Furthermore, as discussed above, the longitudinal recess and longitudinal projection of the front side opposing parts 20k, 21g are different from those of the rear side opposing parts 20i, 21h in the side cover portion 21 and the center cover portion 20. Thus, the space S1 between the front side opposing part 20k and the front side opposing part 21g do not overlap with the space S2 between the rear side opposing part 20i and the rear side opposing part 21h when the spaces S1, S2 are viewed in the transverse direction, i.e., the direction perpendicular to the plane of FIG. 13A. More specifically, when the cover member 7 is viewed in the transverse direction from the front side space S1 side (vehicle front side), the other side (vehicle rear side) of the cover member 7 cannot be viewed through the rear side space S2 and vice versa, so that the continuity of the shape of the cover member 7 in the longitudinal direction is achieved to improve the appearance of the cover member 7.

Figure 18A:
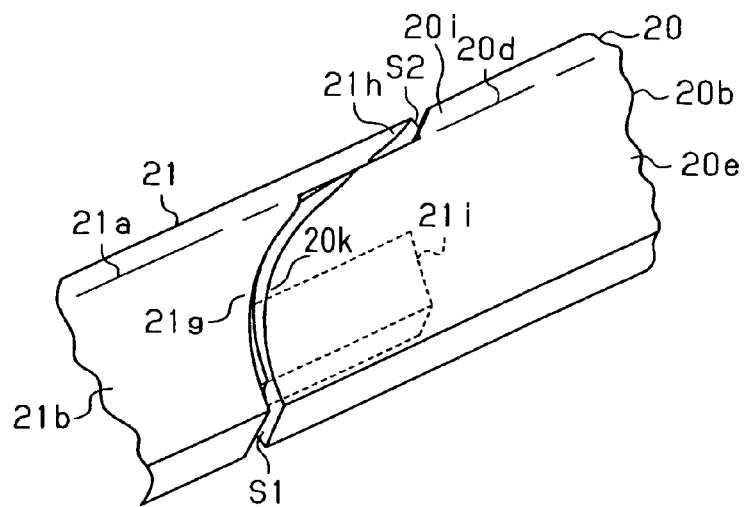
FIG. 18A is a schematic partial view showing a state where a center cover portion of the fourth embodiment is installed.
Figure 18B:
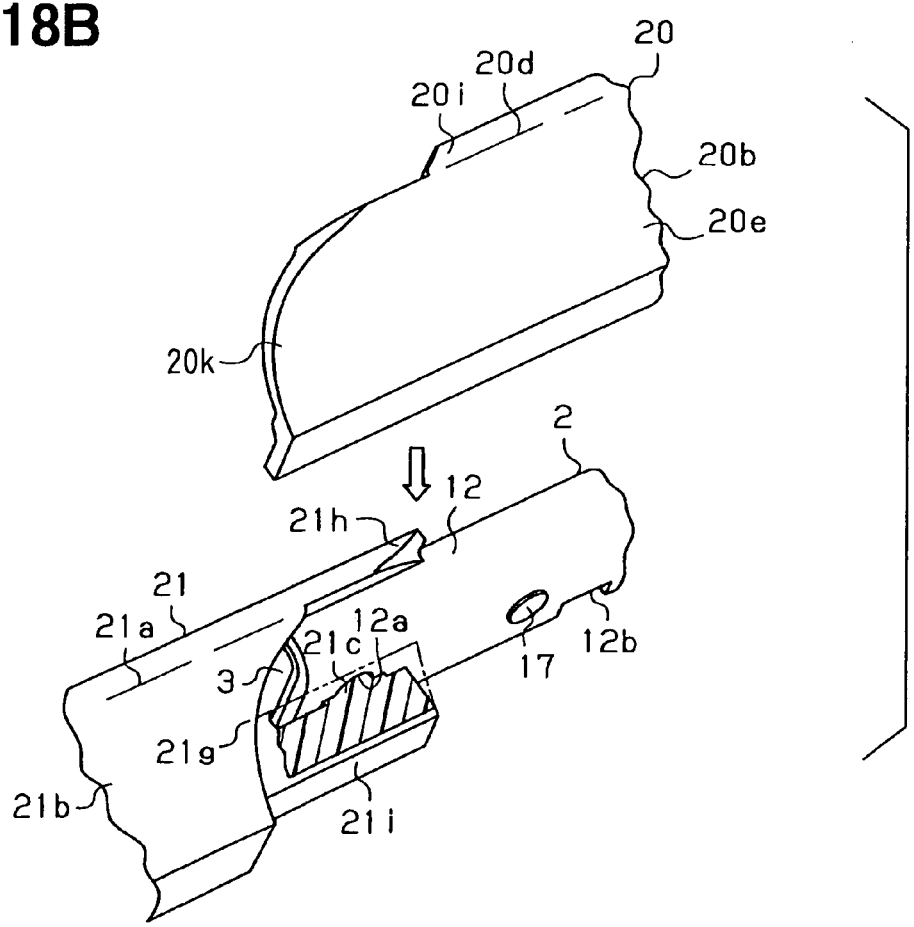
FIG. 18B is a schematic partial view showing a state before the installation of the center cover portion of the fourth embodiment.

As shown in FIGS. 15 and 17A, at the base end of each side cover portion 21, the two opposed cylindrical connecting projections 21c project respectively from an inner surface of the base end rear side opposing part 21h and an opposed end side inner surface of a protruding part 21i, which extends from the base end front side opposing part 21g in the longitudinal direction. The connecting projections 21c are rotatably fitted into the connecting holes 12a of the connection 12 of the primary lever 2 and form the rotational axis of the side cover portion 21 for rotating the side cover portion 21 relative to the connection 12. As shown in FIGS. 18A and 18B, the protruding part 21i is received in the arm cover segment 20b of the center cover portion 20, so that movement of the protruding part 21i is limited by the distal end front side opposing part 20k of the arm cover segment 20b to limit removal of the connecting projection 21c of the protruding part 21i from the corresponding connecting hole 12a (FIGS. 17A, 18B).

Figure 20A:
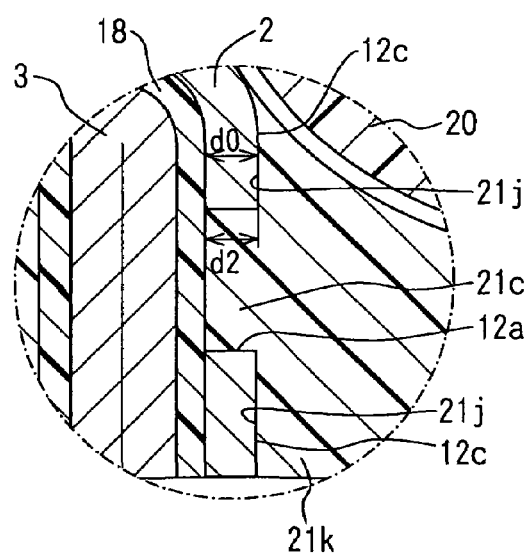
FIG. 20A is an enlarged partial view of FIG. 17A.
Figure 20B:
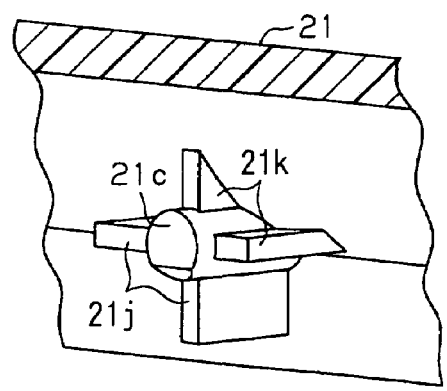
FIG. 20B is a perspective view showing a projection shown in FIG. 20A.

As shown in FIGS. 17A, 20A and 20B, rib like limiting walls 21k are provided adjacent to the connecting projection 21c, which is formed in the inner surface of the side cover portion 21 on the side where the fin section 21b is formed. The limiting walls 21k extend continuously from the connecting projection 21c. Similar to the limiting wall 20m of the center cover portion 20, an inner end surface of each of the limiting walls 21k forms a limiting surface (limiting part) 21j. At the time of installing the side cover portion 21 to the primary lever 2, the limiting surface 21j of each of the limiting walls 21k contacts the side surface 12c of the connection 12 of the primary lever 2. That is, each limiting surface 21j defines the position of the side cover portion 21 relative to the primary lever 2 in the transverse direction when the limiting surface 21j contacts the side surface 12c of the corresponding connection 12 of the primary lever 2. Furthermore, the projecting length d2 of the connecting projection 21c, which is measured from the limiting surface 21j, is set to be generally the same as the wall thickness d0 of the primary lever 2. That is, when the limiting surface 21j engages the side surface 12c of the connection 12, inward projection of the connecting projection 21c from the primary lever 2 is limited. In this way, the distal end of the connecting projection 21c does not substantially contact or interfere with the damper 18, which is interposed between the primary lever 2 and the secondary lever 3. Therefore, smooth rotation of the secondary lever 3 relative to the primary lever 2 is not interfered.

Furthermore, as shown in FIG. 17C, holding parts 21d are formed in the inner surface of the distal end of each side cover portion 21 to receive the base 5a of the wiper strip 5 in the longitudinal direction. The holding portions 21d are received in the holding grooves 5e of the base 5a of the wiper strip 5 to hold the base 5a of the wiper strip 5 on the distal end side of the outermost holding part 16 of the lever assembly 4 to allow flexing of the wiper strip 5 in conformity with the curvature of the glass surface 30a. Two wiper strip urging projections 21f project downwardly from the inner surface of the side cover portion 21 at a location distally of the outermost holding part 16. In each side cover portion 21, the wiper strip urging projections 21f are arranged on the opposed transverse sides of the center line L1 of the wiper blade 1. Furthermore, each wiper strip urging projection 21f engages an intermediate transverse part of the top surface of the wiper strip 5 between the center line L1 of the wiper blade 1 and a corresponding transverse edge of the top surface of the wiper strip 5 to urge the corresponding end of the wiper strip 5 against the glass surface 30a and thereby to flex the end of the wiper strip 5 in conformity with the curvature of the glass surface 30a.

The cover member 7 is installed to the lever assembly 4 in the following manner. That is, each side cover portion 21 is rotatably installed to the lever assembly 4. More specifically, the connecting projections 21c of the base end of each side cover portion 21 are fitted into the connecting holes 12a of the corresponding connection 12 of the primary lever 2. Next, the center cover portion 20 is installed to the primary lever 2 of the lever assembly 4 in such a manner that the center cover portion 20 receives the primary lever 2 through its lower end opening. At this time, the center cover portion 20 is resiliently outwardly deformed in the transverse direction by the amount that corresponds to the protruding lengths of the engaging protrusions 20f, 20g. When each engaging protrusion 20f, 20g reaches the lower surface of the corresponding one of the connecting arrangement 10 and the connections 12, the engaging protrusion 20f, 20g resiliently returns to its normal state. Then, each engaging protrusion 20f engages the lower end surface of the connecting arrangement 10, and each engaging protrusion 20g engages the engaging groove 12b of the lower end surface of the connection 12. Thus, the center cover portion 20 is installed to the lever assembly 4 in a manner that limits removal of the center cover portion 20 from the lever assembly 4.

At the time of installing the center cover portion 20, the protruding part 21i of each side cover portion 21 is received in the center cover portion 20. In this way, the movement of the protruding part 21i is limited by the distal end front side opposing part 20k of the center cover portion 20 (the arm cover segment 20b) to limit removal of the connecting projection 21c of the protruding part 21i from the corresponding connecting hole 12a. That is, in the above described manner, unintentional removal of each side cover portion 21 from the primary lever 2 is limited. The base Sa of the wiper strip 5 is inserted to the holding parts 21d of the side cover portions 21 and the holding parts 16 of the lever assembly 4 through the window 21e of the side cover portion 21 in the longitudinal direction, so that the base 5a of the wiper strip 5 is held by the holding parts 21d, 16, and the assembly of the wiper blade 1 is completed.

The cover member 7 may be alternatively assembled in the following manner. That is, the base 5a of the wiper strip 5 is first inserted into the holding parts 16 of the lever assembly 4. Then, the holding parts 21d of each side cover portion 21 is installed to the base 5a of the wiper strip 5, and the connecting projections 21c of the base end of the side cover portion 21 are fitted into the connecting holes 12a of the connection 12 of the primary lever 2. Thereafter, the center cover portion 20 is installed to the primary lever 2 in such a manner that the center cover portion 20 receives the protruding part 21i of each side cover portion 21, and the assembly of the wiper blade 1 is completed.

In the wiper blade 1, which has the cover member 7, the holding parts 21d, which are provided in the distal end of each side cover portion 21, engage the corresponding end of the base 5a of the wiper strip 5 in the vertical direction. Thus, for example, when the wiper strip 5 is flexed in conformity with the curvature of the glass surface 30a, which is wiped by the wiper strip 5, each side cover portion 21 pivots, i.e., rotates about the connecting projections 21c of the side cover portion 21 to follow the flexing of the wiper strip 5.

Next, characteristic advantages of the wiper blade 1 of the fourth embodiment will be described.

(1) The cover member 7, which receives and covers the lever assembly 4, includes the center cover portion 20 and the two side cover portions 21, and the side cover portions 21 are provided on the opposite sides of the center cover portion 20. The base ends of the side cover portions 21 are rotatably connected to the primary lever 2 to enable rotation of the side cover portions 21 in conformity with the flexing of the wiper strip 5. The shapes of the opposing parts 20k, 20i of the center cover portion 20 and the shapes of the opposing parts 21g, 21h of each side cover portion 21 are set such that the front side space S1, which is formed at the connection between the opposing part 20k of the center cover portion 20 and the opposing part 21g of the adjacent side cover portion 21 on the front side of the top ridges 20d, 21a, does not overlap with the rear side space S2, which is formed at the connection between the opposing part 20i of the center cover portion 20 and the opposing part 21h of the adjacent side cover portion 21 on the rear side of the top ridges 20d, 21a when the cover member 7 is seen in the transverse direction. Thus, when the cover member 7 is viewed in the transverse direction from the front side space S1 side, the other side of the cover member 7 cannot be viewed through the rear side space S2 and vice versa. That is, the cover member 7 has the longitudinally continuous shape to improve the appearance of the cover member 7 and thereby of the wiper blade 1.

(2) The holding parts 21d, which are provided in the distal end of each side cover portion 21, hold the wiper strip 5 at the point, which is distally of the closest outermost holding part 16 of the lever assembly 4. Thus, when the end of the wiper strip 5 is flexed in conformity with the curvature of the glass surface 30a, which is wiped by the wiper strip 5, the distal end side of the side cover portion 21 is rotated to follow the flexing of the distal end of the wiper strip 5. That is, substantial formation of the space between the end of the wiper strip 5 and each side cover portion 21 is limited to improve the appearance of the wiper blade 1. Furthermore, each follower end section Y of the wiper strip 5, which extends distally from the corresponding outermost holding part 16 of the lever assembly 4, is held by the corresponding side cover portion 21, which is rotatable in a direction of curvature of the glass surface relative to the center cover portion 20. Thus, occurrence of extreme twisting of each follower end section Y of the wiper strip 5 and occurrence of vibration (chattering vibration) of each follower end section Y of the wiper strip 5 in the wiping direction are both limited.

(3) In each side cover portion 21, the base end rear side opposing part 21h is formed to arcuately protrude about the rotational axis (the connecting projections 21c) of the side cover portion 21, and the base end front side opposing part 21g is formed to arcuately recess about the rotational axis (the connecting projections 21c) of the side cover portion 21. The shapes of the opposing parts 21g, 21h of each side cover portion 21 provide the integral design while the front side space S1 and the rear side space S2 of the cover member 7 do not overlap with each other when the cover member 7 is viewed in the transverse direction. Thus, the appearance of the cover member 7 and thereby the appearance of the wiper blade 1 can be improved.

(4) The side cover portions 21 are rotatably connected to the primary lever 2. Therefore, since the side cover portions 21 are rotatably connected to the metal primary lever 2, which has the relatively high strength and rigidity, the side cover portions 21 can be more effectively connected to the primary lever 2 in comparison to, for example, a case where the side cover portions 21 are connected to the resin center cover portion 20.

(5) The cover member 7 integrally includes the fin sections 20e, 21b, which generate the urging force for urging the wiper blade 1 against the glass surface 30a upon receiving the head wind at the time of traveling of the vehicle. Therefore, at the time of traveling of the vehicle, particularly at the time of high speed traveling of the vehicle, the fin sections 20e, 21b advantageously limit lifting of the wiper blade 1 from the glass surface 30a to improve the wiping performance of the wiper blade 1. Furthermore, the fin sections 20e, 21b are formed integrally in the cover member 7, so that an increase in the number of components of the wiper blade 1 is advantageously limited. Furthermore, the urging force, which is generated by the head wind at the fin section 21b of each side cover portion 21 that is rotatable in the direction of the curvature of the glass surface relative to the center cover portion 20, can be directly applied to the corresponding follower end section Y of the wiper strip 5 without passing through the lever assembly 4.

(6) The protruding part 21i of each side cover portion 21 is received in the center cover portion 20. Furthermore, the movement of the protruding part 21i is limited by the distal end front side opposing part 20k of the center cover portion 20 (the arm cover segment 20b) to limit removal of the connecting projection 21c of the protruding part 21i from the corresponding connecting hole 12a. Thus, it is possible to limit unintentional removal of the side cover portions 21 from the primary lever 2.

The first to fourth embodiments can be modified as follows.

In the first to fourth embodiments, the side cover portions 21, 22 are rotatably connected to the lever assembly 4. Alternatively, the side cover portions 21, 22 can be rotatably connected to the center cover portion 20.

In the first fourth embodiments, the connecting projections 21c, 22c are provided in the side cover portions 21, 22, and the connecting holes 12a, 11a are provided in the lever assembly 4. With this arrangement, the side cover portions 21, 22 are rotatably connected to the lever assembly 4. Alternatively, the connecting holes, which are similar to the connecting holes 12a, 11a, may be provided in the side cover portions 21, 22, and the connecting projections, which are similar to the connecting projections 21c, 22c, may be provided in the lever assembly. Also, any other connecting means other than the projections and the holes can be used. For example, each connecting pin 17 can be slightly projected outwardly on both transverse sides to rotatably connect the corresponding side cover portion 21 to the projected parts of the connecting pin 17. Furthermore, the positions of the connecting parts, such as the connecting projections 21c, 22c and the connecting holes 12a, 11a, can be changed to any other appropriate positions.

In the first to fourth embodiments, the cover member 7 integrally includes the fin sections 20e, 21b, 22b. Alternatively, the fin sections can be eliminated from the cover member 7. In such a case, the side cover portions 21 can be formed into the identical shape.

In the first to fourth embodiments, the cover member 7 includes the single center cover portion 20 and the two side cover portions 21, 22. However, the number of the cover portions in the cover member 7 is not limited to this and can be increased or decreased to any suitable number. For example, the cover member may include only the side cover portions, and the outer shape of the primary lever 2 may be changed to that of the center cover portion.

Figure 21A:
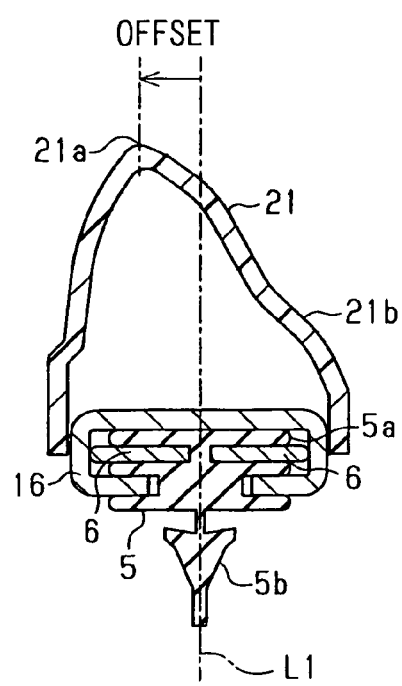
FIG. 21A is a cross sectional view showing a modification of the structure of the first embodiment shown in FIG. 5B.
Figure 21B:
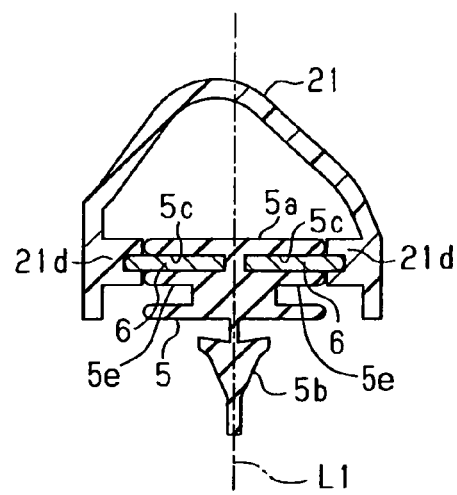
FIG. 21B is a cross sectional view showing a modification of the structure of the first embodiment shown in FIG. 5C.
Figure 22:
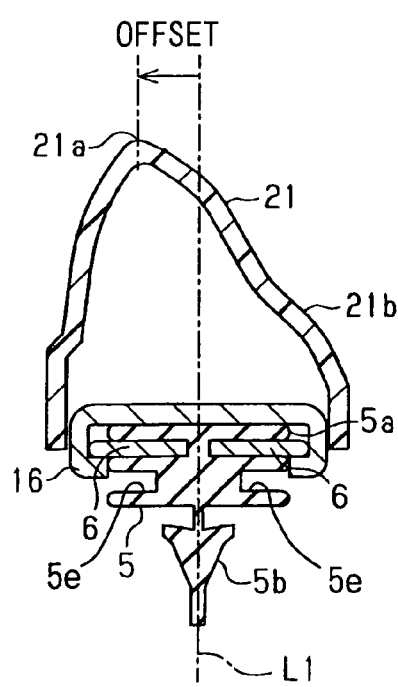
FIG. 22 is a cross sectional view showing a further modification of the structure of the first embodiment shown in FIG. 5B.

In the first to fourth embodiments, each side cover portion (the movable cover portion) directly holds the wiper strip 5 at the corresponding point, which is distally of the closest outermost holding part 16 of the lever assembly 4. Alternatively, the wiper strip 5 can be indirectly held by the side cover portions (the movable cover portions). For example, in the first embodiment, as shown in FIGS. 21A and 21B, each backing plate 6 may be modified to have a transverse width, which causes transverse protrusion of a portion of the backing plate 6 from the corresponding backing plate receiving groove 5c. Furthermore, as shown in FIG. 21B, each holding part 21d of each side cover portion 21 may hold the corresponding protruded transverse portion of the backing plate 6 to indirectly hold the wiper strip 5. At this time, the holding parts 16, which are provided to the ends of each secondary lever 3, may hold the base Sa of the wiper strip 5 to hold the wiper strip 5, as shown in FIG. 21A. Alternatively, these holding parts 16 may hold the wiper strip 5 while the holding parts 16 engage and hold the protruded transverse parts of the backing plates 6, which protrude transversely from the corresponding plate receiving grooves 5c, as shown in FIG. 22. Similarly, in the second to fourth embodiments, each backing plate 6 may be modified to have a transverse width, which causes transverse protrusion of a portion of the backing plate 6 from the corresponding backing plate receiving groove 5c. In such a case, the holding parts 21d, 22d of the side cover portions 21, 22 may hold the protruded transverse parts of the backing plates 6, which protrude transversely from the corresponding backing plate receiving grooves 5c.

The distal end of each side cover portion (the movable cover portion) may indirectly hold the wiper strip 5. In such a case, each end of the wiper strip 5 may be indirectly held by the side cover portion (the movable cover portion) through, for example, a cap, which is installed to the end of the wiper strip 5 or to the corresponding ends of the backing plates 6. For example, the holding parts 21d, 22d of each side cover portion 21, 22 may hold, for example, the cap, which is installed to the end (or an intermediate point in the case of the holding parts 22d) of the wiper strip 5 or to the corresponding ends (or corresponding intermediate points in the case of the holding parts 22d) of the backing plates 6.

In the first to fourth embodiments, the lever assembly 4 has the single primary lever 2 and the two secondary lever 3. However, the number of the levers in the lever assembly 4 is not limited to this. For example, depending on the length of the wiper blade, third levers may be connected to the ends of the secondary levers.

Figure 7A:
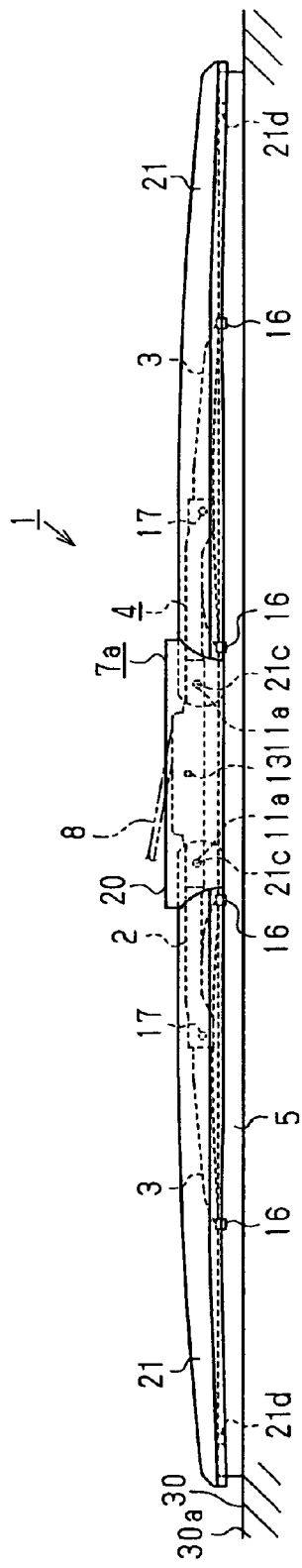
FIG. 7A is a side view of a wiper blade, to which a cover member of a second embodiment of the present invention is installed.
Figure 7B:
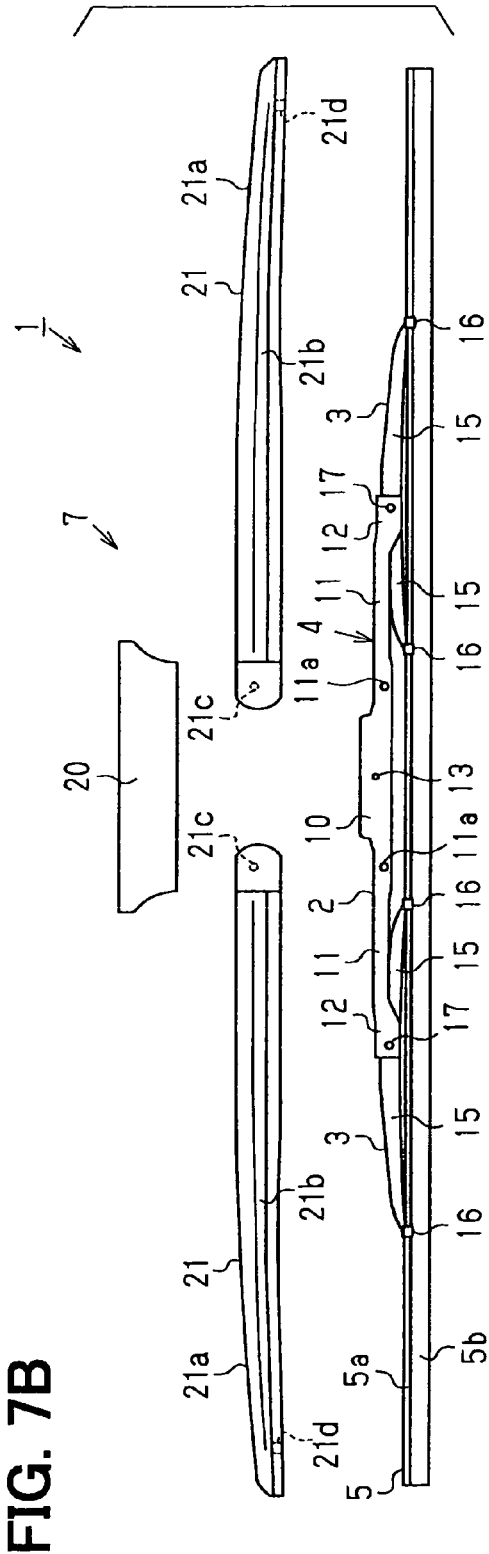
FIG. 7B is a side view of the wiper blade before the installation of the cover member of the second embodiment.
Figure 9:
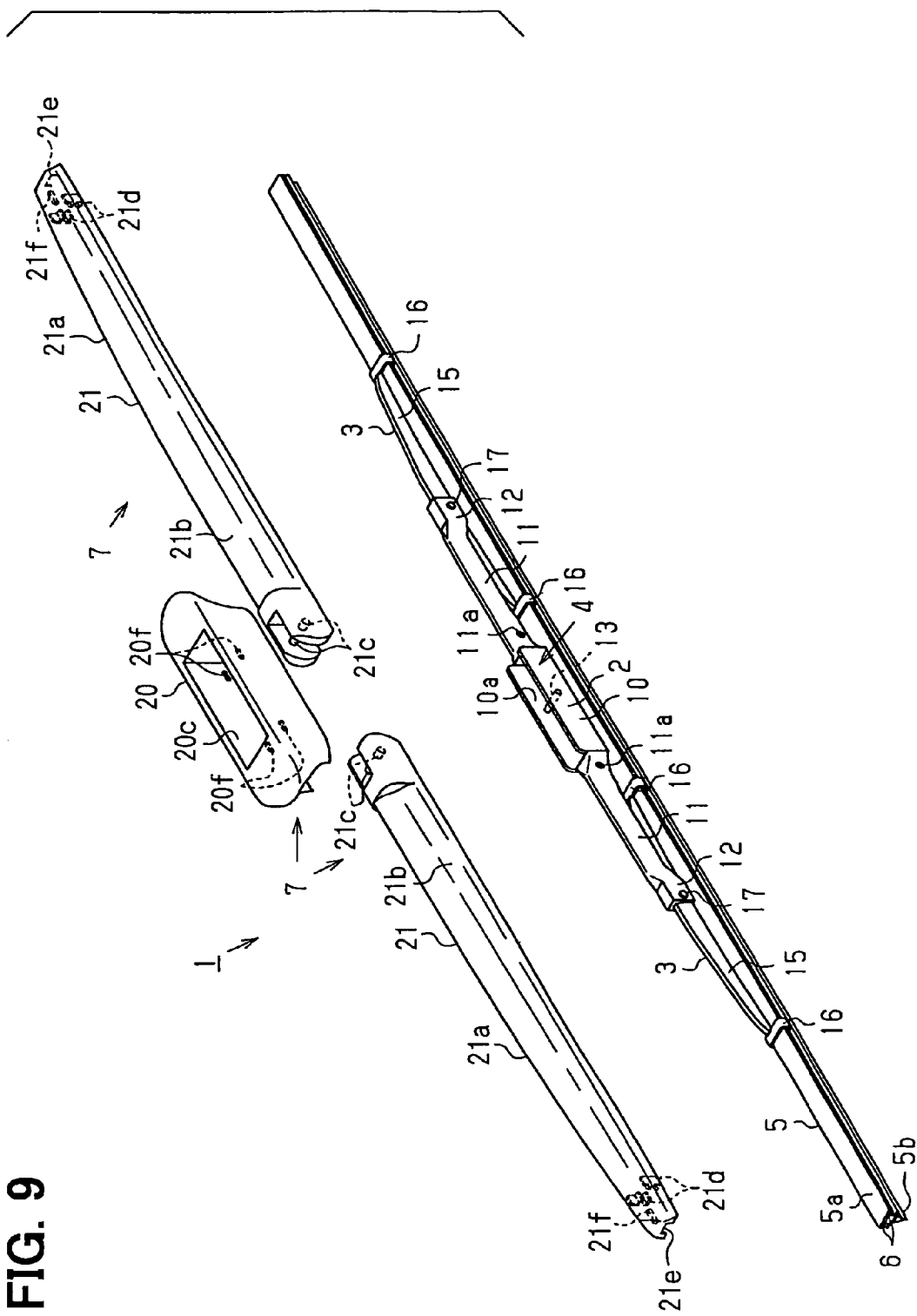
FIG. 9 is a perspective view of the wiper blade before the installation of the cover member of the second embodiment.
Figure 10A:
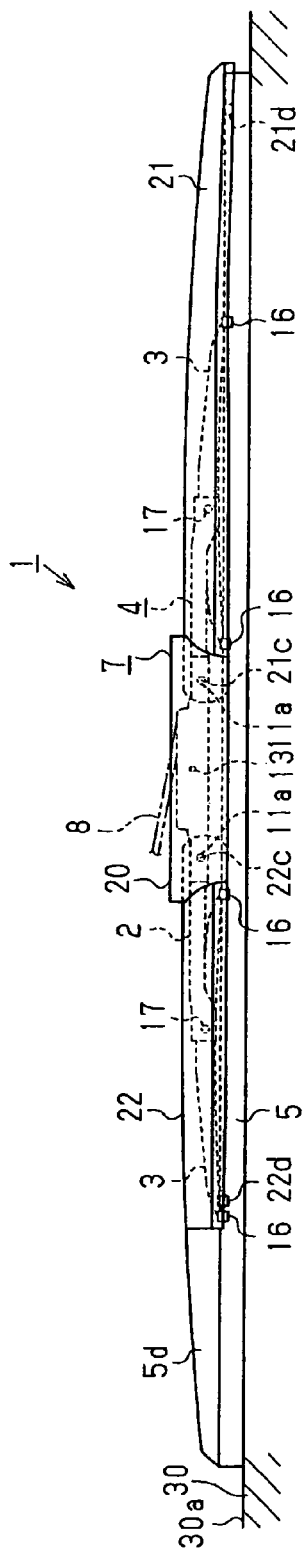
FIG. 10A is a side view of a wiper blade, to which a cover member of a third embodiment of the present invention is installed.
Figure 10B:
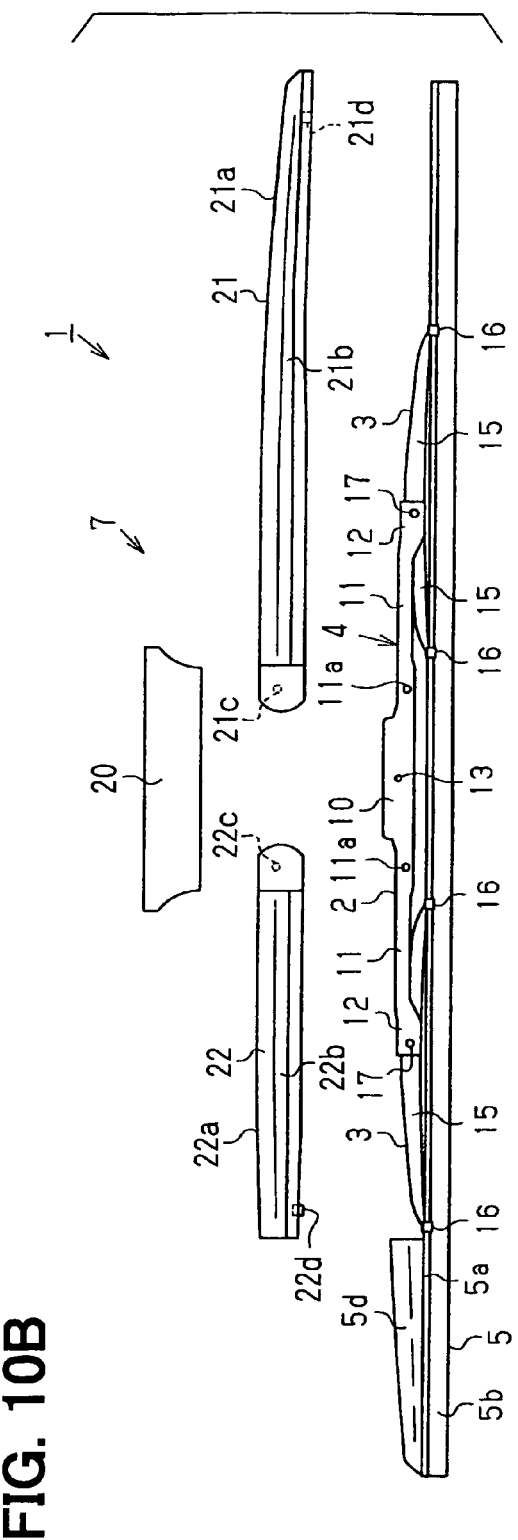
FIG. 10B is a side view of the wiper blade before the installation of the cover member of the third embodiment.
Figure 11A:
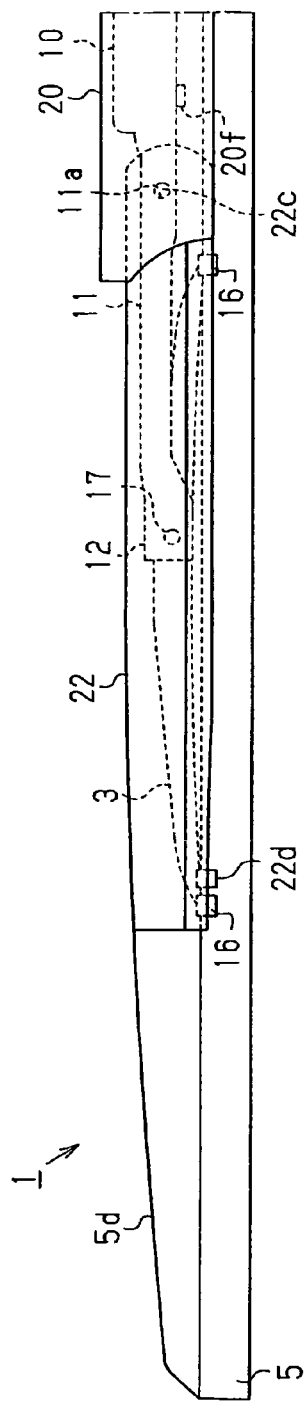
FIG. 11A is an enlarged partial view of FIG. 10A.
Figure 11B:
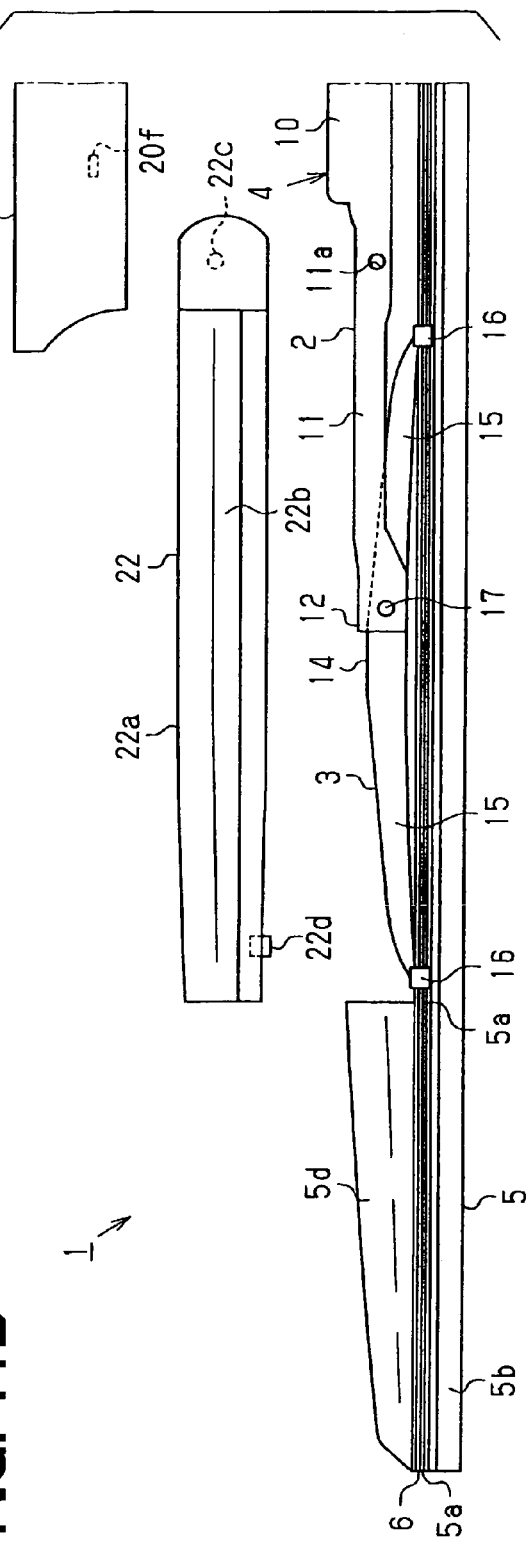
FIG. 11B is an enlarged partial view of FIG. 10B.
Figure 12:
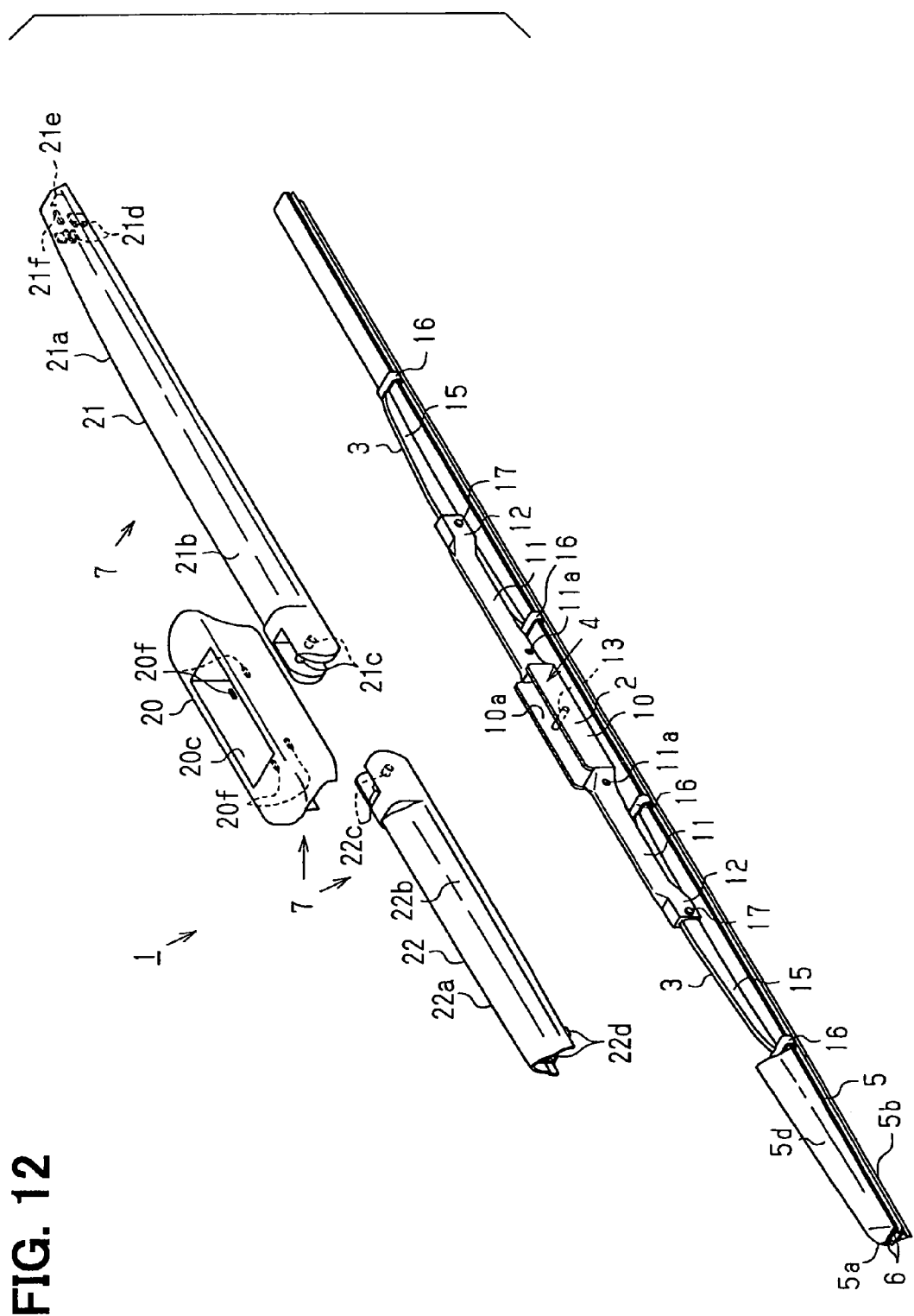
FIG. 12 is a perspective view of the wiper blade before the installation of the cover member of the third embodiment.
Figure 23:
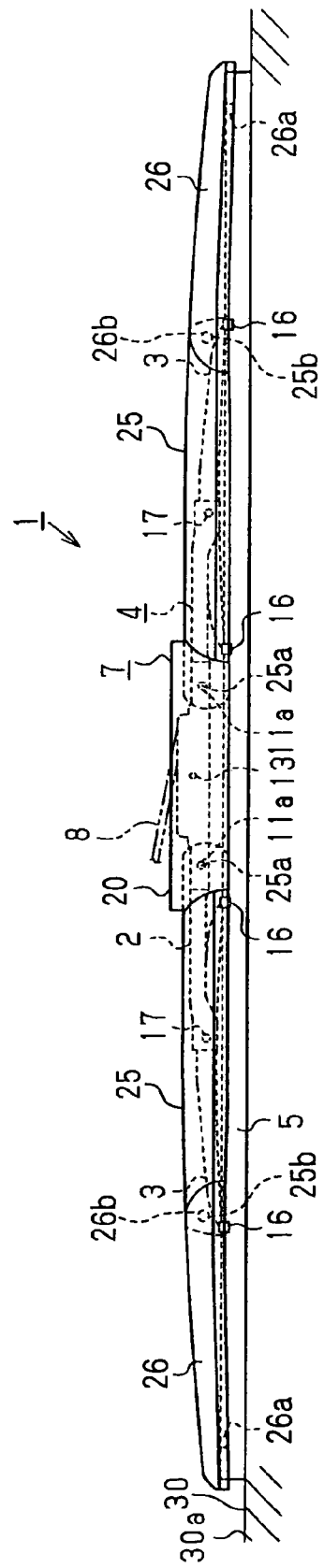
FIG. 23 is a side view showing a modification of the structure of the second embodiment shown in FIG. 7A.

Furthermore, as shown in FIG. 23, each side cover portion 21 of the second embodiment shown in FIG. 7A may be divided into two parts, which form side cover portions 25, 26, respectively. In this case, two connecting projections 25a are formed in an inner surface of a base end of each side cover portion 25, and these connecting projections 25a are fitted into the two connecting holes 11a of the corresponding arm 11 of the primary lever 2, so that the side cover portion 25 is rotatably connected to the primary lever 2 (the arm 11). Two connecting holes 25b are formed in a distal end of each side cover portion 25, and two connecting projections 26b are formed in an inner surface of a base end of each side cover portion 26. The two connecting projections 26b of each side cover portion 26 are fitted into the connecting holes 25b of the corresponding side cover portion 25. Thus, relative rotation between the side cover portion 25 and the side cover portion 26 is made possible. Furthermore, the holding parts 26a are formed in an inner surface of a distal end of each side cover portion 26 to receive the base 5a of the wiper strip 5 in the longitudinal direction.

Figure 24A:
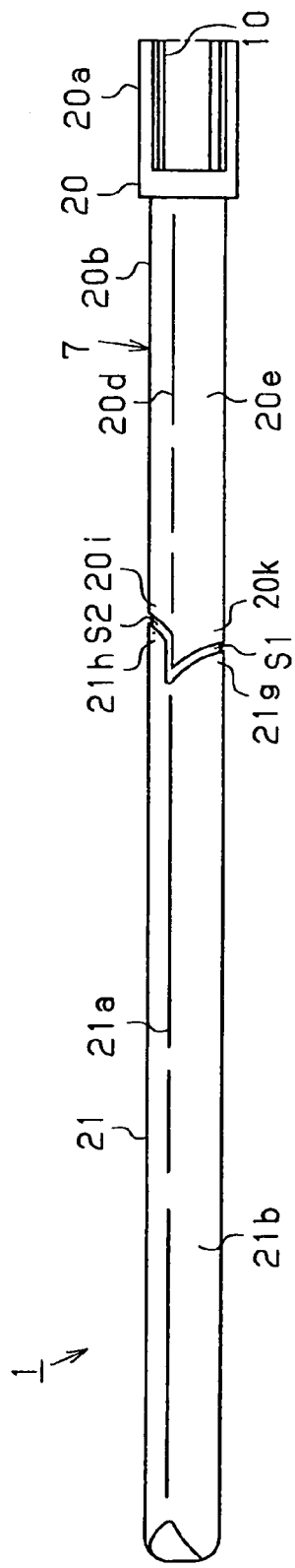
FIG. 24A is a partial plan view showing a modification of the fourth embodiment.
Figure 24B:
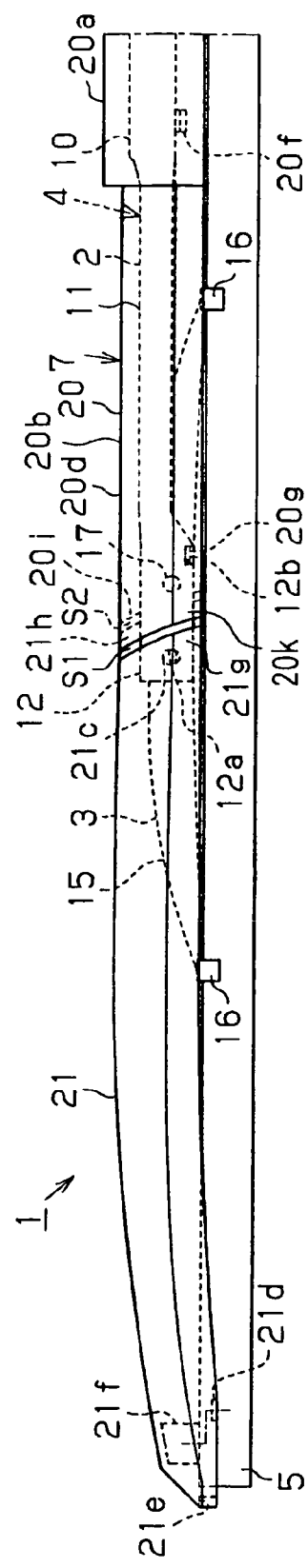
FIG. 24B is a side view of FIG. 24A.
Figure 26A:
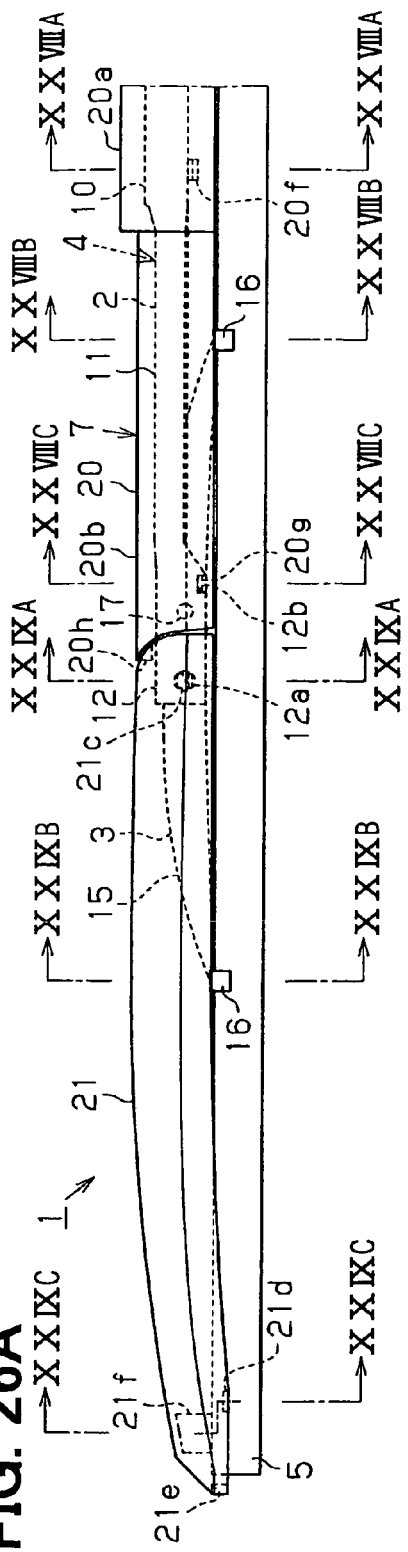
FIG. 26A is an enlarged partial view of FIG. 25A.
Figure 26B:
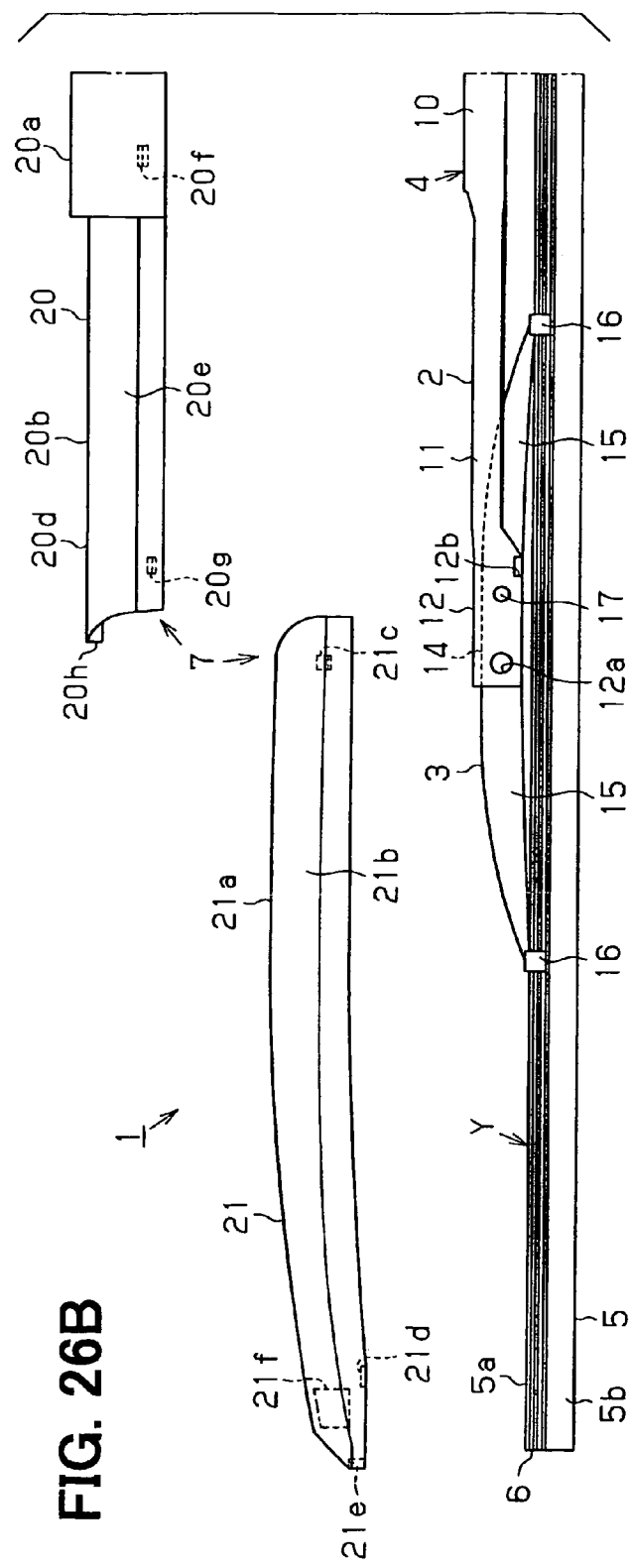
FIG. 26B is an enlarged partial view of FIG. 25B.

In the cover member 7 of the fourth embodiment, the base end rear side opposing part 21h of each side cover portion 21 is formed to arcuately protrude about the rotational axis (the connecting projections 21c) of the side cover portion 21, and the base end front side opposing part 21g is formed to arcuately recess about the rotational axis (the connecting projections 21c) of the side cover portion 21. However, the shapes of the opposing parts 21h, 21g of each side cover portion 21 are not limited to the above ones. For example, in the cover member 7 of the wiper blade 1 shown in FIGS. 24A and 24B, each of the base end front side opposing part 21g and the base end rear side opposing part 21h of each side cover portion 21 is formed to arcuately protrude about the rotational axis (the connecting projections 21c), and the base end front side opposing part 21g and the base end rear side opposing part 21h are offset from each other in the longitudinal direction. Each distal end front side opposing part 20k and each distal end rear side opposing part 20i are formed to arcuately recess about the rotational axis (the connecting projections 21c) of the corresponding side cover portion 21. Even with such a modification, the front side space S1 and the rear side space S2 do not overlap with each other when the cover member 7 is viewed in the transverse direction. Furthermore, the shape of each opposing part is not limited to the arcuate shape and can be modified to any other appropriate shape.

In the first to fourth embodiments, the levers of the lever assembly 4 are made of the metal. Alternatively, the levers may be made of resin. Further alternatively, some of the levers may be made of the metal, and the rest of the levers may be made of the resin. However, the metal levers are preferred over the resin levers since the metal levers can easily achieve the required strength and rigidity.

FIFTH EMBODIMENT

A fifth embodiment of the present invention will be described with reference to the accompanying drawings.

FIG. 25A shows the wiper blade 1 of the present embodiment. As shown in FIGS. 25A to 27, the wiper blade 1 includes a lever assembly 4, a wiper strip 5, two backing plates 6 and a cover member 7. The lever assembly 4 includes a primary lever 2 and two secondary levers 3, which are connected in tournament style.

In the lever assembly 4, the primary lever 2 is formed through a press working process of a metal plate material such that the primary lever 2 has a mountain fold, which including a lower side (wiper strip 5 side) opening that extends along the entire length of the primary lever 2 in the longitudinal direction. The primary lever 2 includes a connecting arrangement 10, two arms 11 and two connections 12. The connecting arrangement 10 is provided in a longitudinal center of the primary lever 2. The arms 11 longitudinally extend from opposed ends of the connecting arrangement 10. The connections 12 are provided to distal ends of the arms 11, respectively, i.e., are provided to opposed ends, respectively, of the primary lever 2.

Figure 27:
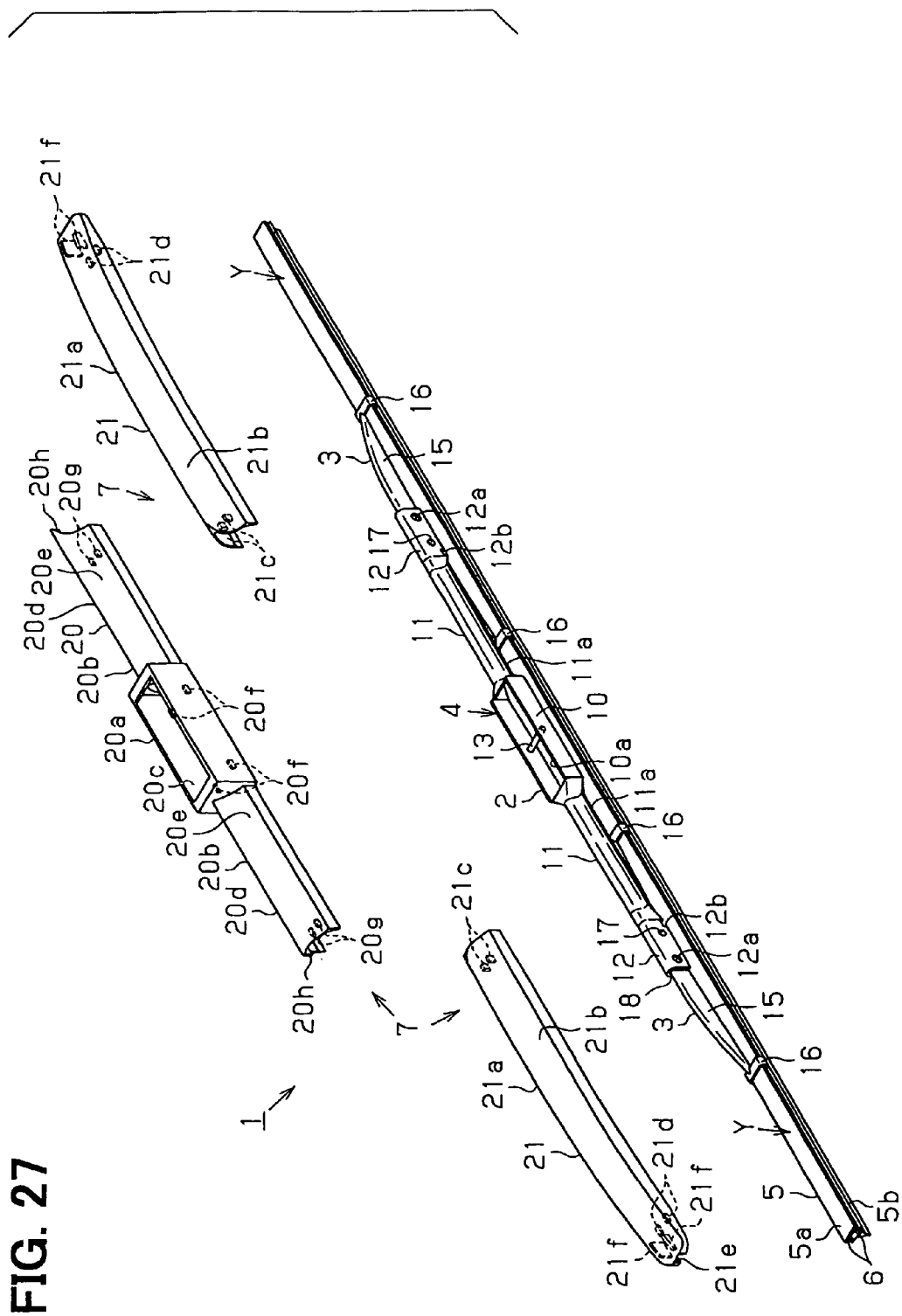
FIG. 27 is an exploded perspective view of a wiper blade of the fifth embodiment.

As shown in FIGS. 27 and 28A, the connecting arrangement 10 has a rectangular opening 10a for receiving the distal end of the wiper arm 8, and two lateral walls of the connecting arrangement 10 are bent to extend parallel to each other. A transverse center of the connecting arrangement 10 coincides with a center line L1 of the wiper blade 1 (the wiper strip 5). A connecting pin 13 is provided to the connecting arrangement 10 to rotatably connect with the distal end of the wiper arm 8 through a connecting clip (not shown).

As shown in FIG. 28B, each arm 11 is formed to have a generally V-shaped cross section, which has an opening on the lower side thereof (the wiper strip 5 side) and diverges toward the opening. A transverse center of the arm 11 is offset a predetermined distance from the center line L1 of the wiper blade 1 on one transverse side of the center line L1. The offset amount of the transverse center of the arm 11 of the present embodiment is set to be substantially the same as the offset amount X1 of each of fin sections 20e, 21b of the cover member 7 described below. The other transverse side of the arm 11 is bent outwardly in the transverse direction to form a bent part 11b, which improves the rigidity of the arm 11.

As shown in FIG. 28C, the connection 12 is bent to have a generally U-shaped cross section, which has an opening on the lower side thereof (the wiper strip 5 side). A center of the corresponding secondary lever 3 is rotatably connected to the connection 12 through a connecting pin 17.

Two connecting holes 12a penetrate through distal end side lateral walls, respectively, of the connection 12, which are located distally of the connecting pin 17. Each connecting hole 12a extends along a straight line, which is parallel to an axis of the connecting pin 17. The connecting holes 12a receive connecting projections 21c, respectively, which are provided in the cover member 7.

Each secondary lever 3 is formed to have a mountain fold, which extends in the longitudinal direction, through a press working process of a metal plate material. The secondary lever 3 includes a connection 14, two arms 15 and two holding parts 16. The connection 14 is provided in a longitudinal center of the secondary lever 3. The arms 15 longitudinally extend from opposed ends of the connection 14. The holding parts 16 are provided to distal ends of the arms 11, respectively, i.e., are provided to opposed ends, respectively, of the secondary lever 3.

As shown in FIGS. 28C and 29A, each of the connection 14 and the arms 15 is formed to have the mountain fold in such a manner that two lateral walls thereof are placed next to each other. The connection 14 is received in the connection 12 of the primary lever 2 and is rotatably connected to the connection 12 via the connecting pin 17. A damper 18 is interposed between the connection 14 of each secondary lever 3 and the corresponding connection 12 of the primary lever 2. The damper 18 is made of a synthetic resin material and is configured to have a generally U-shaped cross section, which has an opening on the lower side thereof (the wiper strip 5 side).

The damper 18 is arranged between the connection 12 of the primary lever 2 and the connection 14 of the secondary lever 3 in such a manner that the connecting pin 17, which connects the secondary lever 3 to the primary lever 2, extends through the damper 18. The damper 18 is provided to achieve smooth rotational movement of the secondary lever 3 relative to the primary lever 2 while limiting chattering movement between the secondary lever 3 and the primary lever 2.

A transverse center of a base end of each arm 15 is offset a predetermined offset amount equal to the offset amount of the arm 11 of the primary lever 2 from the center line L1 of the wiper blade 1, so that the arm 15 and the adjacent arm 11 of the primary lever 2 extend generally along a straight line.

The holding parts 16 of the arms 15, which are provided to distal ends of the arms 15, i.e., which are provided to the opposed ends of the secondary lever 3, are bent to have a generally C-shaped cross section, which is opened on a lower side thereof (the wiper strip 5 side), as shown in FIG. 29B. A transverse center of each holding part 16 coincides with the center line L1 of the wiper blade 1. The base 5a of the wiper strip 5, to which the backing plates 6 are mounted, is inserted into the respective holding parts 16 in the longitudinal direction, so that distal ends of each of the holding parts 16 are received in the holding grooves 5e of the base 5a of the wiper strip 5, which extend continuously in the base 5a of the wiper strip 5. The holding parts 16 hold the wiper strip 5 in a manner that allows flexing of the wiper strip 5 in conformity with the curvature of the glass surface 30a of the wiper strip 5.

The wiper strip 5 is elongated and is made of a resilient material, such as a rubber material or a resilient synthetic material. As shown in FIGS. 28A to 29C, the wiper strip 5 includes the base 5a and a wiping lip 5b. The base 5a is held by the holding parts 16 of the lever assembly 4; The wiping lip 5b extends from the base 5a at the center line L1 of the wiper blade 1, and a distal end of the wiping lip 5b directly wipes, for example, rain droplets on the glass surface 30a. The base 5a and the wiping lip 5b extend continuously in the longitudinal direction of the wiper strip 5. In the following respective drawings, some lines on a lateral side surface of the wiper strip 5 are eliminated for the sake of clarity.

Two backing plate receiving grooves 5c extend longitudinally in the base 5a of the wiper strip 5 above the holding grooves 5e (on the side opposite from the wiping lip 5b). The backing plates 6, each of which is formed into an elongated plate from a metal material having a spring characteristic, are received in the backing plate receiving grooves 5c, respectively. In each corresponding drawing, the backing plates 6 are drawn to extend along the straight line for the sake of clarity of the drawing. However, in reality, in a natural state (in an unloaded state), slightly arcuately curved segments are continuously provided one after another in the longitudinal direction in each backing plate 6, so that a longitudinal center of the backing plate 6 is convexly curved in a direction away from the glass surface 30a. In this state, a curvature of the backing plate 6 is larger than that of the glass surface 30a, i.e., a radius of curvature of the backing plate is smaller than that of the glass surface 30a. With the above structure, the wiper strip 5 is curved in conformity with the shape of the backing plates 6. At the time of wiping the glass surface 30a, when the urging force is applied from the wiper arm 8, the urging force is spread over the wiper strip 5 through the lever assembly 4, so that the wiper strip 5 is flexibly and resiliently deformed in conformity with the curvature of the glass surface 30a. The urging force, which is applied from the wiper arm 8 toward the glass surface 30a and is distributed by the lever assembly 4, is spread by the backing plates 6 over the wiper strip 5 in the longitudinal direction.

In the present embodiment, each of the wiper strip 5 and the backing plates 6 are formed to protrude outwardly a predetermined length from the corresponding outermost holding part 16 (e.g., the left end holding part 16 in FIG. 14A or 14B) of the lever assembly 4 in the longitudinal direction to allow appropriate flexing of the wiper strip 5 in conformity with the curvature of the glass surface 30a. Each section of the wiper strip 5 (including the backing plates 6), which is located between the corresponding end of the wiper strip 5 and the closest outermost holding part 16 of the lever assembly 4, is referred to as a follower end section Y As shown in FIG. 27, the cover member 7, which forms a fin member, includes the center cover portion 20 and the two side cover portions 21. The side cover portions 21 are located at opposed ends, respectively, of the center cover portion 20. Each of the center cover portion 20 and the side cover portions 21 is made of the synthetic resin material and has a predetermined rigidity. The cover member 7, i.e., the fin member is installed to the lever assembly 4 along the length of the lever assembly 4. The center cover portion 20 and the side cover portions 21 receive and cover the lever assembly 4. Furthermore, the center cover portion 20 and the side cover portions 21 extend to the ends of the wiper strip 5. That is, a longitudinal length of the cover member 7 is longer than a longitudinal length of the lever assembly 4, so that the cover member 7 extends from the one end to the other end of the wiper strip 5 to provide an integral appearance together with the wiper strip 5.

The center cover portion 20 includes a connecting arrangement cover segment 20a and two arm cover segments 20b. The connecting arrangement cover segment 20a is provided generally in a center of the center cover portion 20 and covers the connecting arrangement 10 of the primary lever 2. The arm cover segments 20b are arranged at opposed ends, respectively, of the connecting arrangement cover segment 20a to generally entirely cover the arms 11 of the primary lever 2.

As shown in FIG. 28A, the connecting arrangement cover segment 20a is formed to have parallel lateral walls, and a transverse center of the connecting arrangement cover segment 20a coincides with the center line L1 of the wiper blade 1. A rectangular opening 20c is formed in a top of the connecting arrangement cover segment 20a to expose the connecting arrangement 10 therefrom.

As shown in FIG. 28B, each arm cover segment 20b is formed to have a generally V-shaped cross section, which is opened on a lower side thereof (the wiper strip 5 side). Each arm cover segment 20b extends such that a distal end of the arm cover segment 20b does not reach the connecting hole 12a of the corresponding connection 12 of the primary cover 2.

Similar to the arms 11 of the primary lever 2, the top ridge 20d of each arm cover segment 20b is offset the offset amount X1 from the center line L1 of the wiper blade 1 on the one transverse side of the center line L1. That is, at a stop position of the wiper arm 8, the top ridge 20d is offset the offset amount X1 from the center line L1 on the head wind downstream side (on a vehicle rear side) of the center line L1. As shown in FIGS. 28B and 28C, the offset amount X1 of the top ridge 20d is set to increase toward the longitudinal distal end side of the arm cover segment 20b (toward the longitudinal end side of the wiper blade 1).

The fin section 20e is integrally formed in the arm cover segment 20b to extend from the top ridge 20d into the other transverse side of the center line L1 of the wiper blade 1. The fin section 20e is formed into a slant surface, which generates an urging force for urging the wiper blade 1 against the glass surface 30a upon receiving the head wind applied to the traveling vehicle. The fin section 20e is formed to extend from the top ridge 20d, which is offset from the center line L in the manner described above, so that a transverse size of the fin section 20e is increased while limiting an increase in a transverse size of the arm cover segment 20b. Since the offset amount X1 is set to increase toward the longitudinal distal end of the arm cover segment 20b, a transverse size of the fin section 20e also increases progressively toward the distal end of the arm cover segment 20b.

As shown in FIGS. 27 and 28A, four engaging protrusions 20f are formed in an inner surface of the connecting arrangement cover segment 20a to engage with lower surfaces of the connecting arrangement 10 of the primary lever 2 at predetermined four locations. As shown in FIGS. 27 and 28C, two engaging protrusions 20g are formed in an inner surface of a distal end of each arm cover segment 20b to engage with lower surfaces of the corresponding connection 12 of the primary lever 2 at predetermined two locations. When the center cover portion 20 is installed to the lever assembly 4, each engaging protrusion 20f, 20g engages the lower surface of the corresponding one of the connecting arrangement 10 and the connections 12 to limit movement of the center cover portion 20 in the direction opposite from the installation direction of the center cover portion 20.

The two side cover portions 21 are symmetrically configured, as shown in FIG. 27. The side cover portion 21 is formed to have a generally V-shaped cross section, which is opened on a lower side thereof (the wiper strip 5 side). Each side cover portion 21 extends from a point, at which the connecting hole 12a of the corresponding connection 12 of the primary lever 2 is provided, to the corresponding end of the wiper strip 5. Furthermore, a height of the top ridge 21a of the side cover portion 21 is progressively decreased from a predetermined longitudinal point toward the distal end (the end of the wiper strip 5). A window 21e is provided in the distal end of each side cover portion 21 in a form of a recess, which is recessed from the lower edge of the distal end of the side cover portion 21. The wiper strip 5, to which the backing plates 6 are mounted, can be inserted through the window 21e in the longitudinal direction. That is, even in the state where the side cover portions 21 are installed to the primary lever 2, the wiper strip 5 can be installed to the lever assembly 4 through the window 21e in the longitudinal direction.

The top ridge 21a of the base end of the side cover portion 21 is offset a predetermined amount X1, which is the same as that of the arm cover segment 20b of the center cover portion 20, from the center line L1 of the wiper blade 1 on the one transverse side of the center line L1 to continuously extend from the top ridge 20d of the adjacent arm cover segment 20b of the center cover portion 20. That is, at a stop position of the wiper arm 8, the top ridge 21a is offset the offset amount X1 from the center line L1 on the head wind downstream side (on a vehicle rear side) of the center line L1. As shown in FIGS. 29A to 29C, each side cover portion 21 is set such that the offset amount X1 of the top ridge 21a increases toward the longitudinal distal end side of the side cover portion 21 (the longitudinal end side of the wiper blade 1). Similar to the arm cover segment 20b, a fin section 21b is integrally formed in the side cover portion 21 to extend from the top ridge 21a into the other transverse side of the center line L1 of the wiper blade 1. The fin section 21b is formed into a slant surface, which generates an urging force for urging the wiper blade 1 against the glass surface 30a upon receiving the head wind applied to the traveling vehicle. The fin section 21b is formed to extend from the top ridge 21a, which is offset from the center line L in the manner described above, so that a transverse size of the fin section 21b is increased while limiting an increase in a transverse size of the side cover portion 21. Since the offset amount X1 is set to increase toward the longitudinal distal end of the side cover portion 21, a transverse size of the fin section 21b also increases progressively toward the distal end of the side cover portion 21.

That is, in the present embodiment, the generally entire longitudinal region of each fin section 20e, 21b has an enlarging fin section, in which the top ridge 20d, 21a is offset from the center line L1 of the wiper blade 1 on the one transverse side of the center line L1 of the wiper blade 1, and the offset amount X1 of the top ridge 20d, 21a increases progressively toward the longitudinal distal end of the lever assembly 4. In this case, it is preferred that each top ridge 20d of the center cover portion 20 and the top ridge 21a of the adjacent side cover portion 21 are continuously formed to provide a good appearance.

Furthermore, as shown in FIG. 29A, the two connecting projections 21c are formed in the inner surface at the base end of each side cover portion 21. The connecting projections 21c are received in the connecting holes 12a of the corresponding connection 12 of the primary lever 2, so that the connecting projections 21c are rotatably connected to the corresponding connection 12. Furthermore, as shown in FIG. 29C, holding parts 21d are formed in the inner surface of the distal end of each side cover portion 21 to receive the base 5a of the wiper strip 5 in the longitudinal direction. The holding portions 21d are received in the holding grooves 5e of the base 5a of the wiper strip 5 to hold the base 5a of the wiper strip 5 on the distal end side of the outermost holding part 16 of the lever assembly 4 to allow flexing of the wiper strip 5 in conformity with the curvature of the glass surface 30a. That is, each side cover portion 21 directly holds the wiper strip 5 through the holding parts 21d. Two wiper strip urging projections 21f project downwardly from the inner surface of the side cover portion 21 at a location distally of the outermost holding part 16. In each side cover portion 21, the wiper strip urging projections 21f are arranged on the opposed transverse sides of the center line L1 of the wiper blade 1. Furthermore, each wiper strip urging projection 21f engages an intermediate transverse part of the top surface of the wiper strip 5 between the center line L1 of the wiper blade 1 and a corresponding transverse edge of the top surface of the wiper strip 5 to urge the corresponding end of the wiper strip 5 against the glass surface 30a and thereby to flex the end of the wiper strip 5 in conformity with the curvature of the glass surface 30a.

An upper part of the base end of each side cover portion 21 is curved into an arcuate shape where a center of the arc of the arcuate shape coincides with the rotational center (the connecting projections 21c) of the side cover portion 21 when the base end of the side cover portion 21 is viewed from a lateral side of the side cover portion 21. Each end of the center cover portion 20 (the end of each of the arm covert segments 20b), which is opposed to the base end of the corresponding side cover portion 21, is concavely curved when the end of the center cover portion 20 is viewed from the lateral side of the center cover portion 20. Thus, when the side cover portion 21 is pivoted, i.e., is rotated relative to the center cover portion 20, a change in a size of a space between the side cover portion 21 and the center cover portion 20 is minimized. When viewed from the lateral side, an opposite side can be seen through a top side of the space between the side cover portion 21 and the center cover portion 20, at which the lever assembly 4 is not disposed. In order to limit this, a rib 20h, which extends linearly downward, is provided to each end of the center cover portion 20. Furthermore, the rib 20h advantageously limits formation of a sharp part at the top of the corresponding end of the center cover portion 20.

The center cover portion 20 of the cover member 7 is installed, i.e., is snap fitted to the primary lever 2 in such a manner that the center cover portion 20 receives the primary lever 2 of the lever assembly 4 through its bottom opening. At this time, the center cover portion 20 is resiliently outwardly deformed in the transverse direction by the amount that corresponds to the protruding lengths of the engaging protrusions 20f, 20g. When each engaging protrusion 20f, 20g reaches the lower surface of the corresponding one of the connecting arrangement 10 and the connections 12, the engaging protrusion 20f, 20g resiliently returns to its normal state. Then, each engaging protrusion 20f engages the lower end surface of the connecting arrangement 10, and each engaging protrusion 20g engages the engaging groove 12b of the lower end surface of the connection 12. Thus, the center cover portion 20 is installed to the lever assembly 4 in a manner that limits removal of the center cover portion 20 from the lever assembly 4. The center cover portion 20 covers generally the entire primary lever 2 from the portion of one of the connections 12, at which the corresponding connecting pin 17 is provided, to the portion of the other one of the connections 12, at which the other connecting pin 17 is provided.

Furthermore, each side cover portion 21 receives the outer arm 15 of the corresponding secondary lever 3 of the lever assembly 4 through the bottom opening of the side cover portion 21. Also, the side cover portion 21 is installed to the corresponding connection 12 of the primary lever 2 and the end of the wiper strip 5 while the side cover portion 21 extends distally from the outer arm 15 over the top of the follower end section Y of the wiper strip 5. Specifically, the connecting projections 21c of each side cover portion 21 are fitted into the connecting holes 12a of the corresponding connection 12 of the primary lever 2. Thereafter, the base 5a of the wiper strip 5 is inserted to the holding parts 21d of the side cover portions 21 and the holding parts 16 of the lever assembly 4 through the distal window 21e of the corresponding side cover portion 21 in the longitudinal direction. In this way, each side cover portion 21 is installed to the lever assembly 4 and the wiper strip 5 in such a manner that removal of the side cover portions 21 from the lever assembly 4 and the wiper strip 5 is limited. Each side cover portion 21 extends continuously from the secondary cover portion 20 (the arm cover segment 20b), more specifically, from the corresponding point of the connection 12 of the primary lever portion 2, at which the connecting holes 12a are provided, until the end of the wiper strip 5 to cover the outer arm 15 of the corresponding secondary lever 3. When the side cover portions 21 and the center cover portion 20 are installed to the lever assembly 4, the lever assembly 4 is covered with the side cover portions 21 and the center cover portion 20, so that the wiper blade 1 of the present embodiment is formed to have the integral appearance, in which the wiper strip 5 appears to be integral with the side cover portions 21 and the center cover portion 20.

In the wiper blade 1, which has the cover member 7, the holding parts 21d, which are provided in the distal end of each side cover portion 21, engage the corresponding end of the base 5a of the wiper strip 5 in the vertical direction. Thus, when the wiper strip 5 is flexed in conformity with the curvature of the glass surface 30a, which is wiped by the wiper strip 5, each side cover portion 21 pivots, i.e., rotates about the connecting projections 21c of the side cover portion 21 to follow the flexing of the wiper strip 5. That is, even when the wiper strip 5 is flexed, a substantial space is not formed between each side cover portion 21 and the corresponding end of the wiper strip 5, so that the good appearance is achieved.

Furthermore, in each side cover portion 21, the holding parts 21d, which are provided to the distal end of the side cover portion 21, engage the corresponding end of the base 5a of the wiper strip 5. Also, the wiper strip urging projections 21f, which are provided to the distal end of the side cover portion 21, contact the top surface of the wiper strip 5 to urge the wiper strip 5 against the glass surface 30a side. Thus, the urging force, which is generated toward the glass surface 30a at the fin section 21b of the side cover portion 21 at the time of traveling of the vehicle, is directly transmitted to the corresponding follower end section Y of the wiper strip 5 from the holding parts 21d and the wiper strip urging projections 21f without passing through the lever assembly 4. Therefore, at the time of traveling of the vehicle, each end of the wiper strip 5 receives the urging force, which is generated by the corresponding fin section 21b, so that the end of the wiper strip 5 is urged against the glass surface 30a. Therefore, lifting of each end of the wiper strip 5 from the glass surface 30a is reliably limited to improve the wiping performance of the wiper strip 5. Furthermore, in the wiper strip 5, each follower end section Y, which protrudes distally from the closest outermost holding part 16 of the lever assembly 4, has a length, which is equal to or greater than a longitudinal space between the adjacent two holding parts 16 of the lever assembly 4. Thus, the wiper blade 1 of the present embodiment has a particularly effective structure.

Next, characteristic advantages of the wiper blade 1 of the fifth embodiment will be described.

(1) The cover member 7 also serves as the fin member, which has the fin sections 20e, 21b, and the side cover portions 21 of the cover member 7 serve as the movable fin portions. The connecting projections 21c of each side cover portion 21, which serves as the movable fin portion, are fitted into the connecting holes 12a of the corresponding connection 12 of the primary lever 2, so that the base of the side cover portion 21 is pivotably connected to the lever assembly 4. As a result, each side cover portion 21 can pivot in conformity with flexing of the wiper strip 5. Furthermore, the holding parts 21d of the side cover portion 21 hold the wiper strip 5 at the point, which is distally of the closest outermost holding part 16 of the lever assembly 4, i.e., which is located between the corresponding end of the wiper strip 5 and the closest holding part 16 of the lever assembly 4. Thus, the holding parts 21d of the distal end of each side cover portion 21 hold the wiper strip 5 at the position distally of the outermost holding part 16 of the lever assembly 4, i.e., at the follower end section Y Thus, the urging force, which is generated toward the glass surface 30a at the side cover portion 21 at the time of the traveling of the vehicle, is directly transmitted to the end of the wiper strip 5 from the holding parts 21d of the side cover portion 21. Therefore, at the time of traveling of the vehicle, each end of the wiper strip 5 receives the urging force, which is generated by the corresponding side cover portion 21, so that the end of the wiper strip 5 is urged against the glass surface 30a. Therefore, lifting of each end of the wiper strip 5 from the glass surface 30a is reliably limited to improve the wiping performance of the wiper strip 5.

(2) The distal end of each side cover portion 21 has the wiper strip urging projections 21f, which contact the top surface of the wiper strip 5. Thus, the wiper strip urging projections 21f of each side cover portion 21 receive the urging force, which is generated toward the glass surface 30a at the side cover portion 21 at the time of the traveling of the vehicle, so that the wiper strip urging projections 21f urge the top surface of the wiper strip 5 against the glass surface 30a. Therefore, the wiper strip 5 is reliably urged against the glass surface 30a. As a result, with the above structure, the lifting of each end of the wiper strip 5 from the glass surface 30a is also reliably limited to improve the wiping performance of the wiper strip 5.

(3) The cover member 7, which also serves as the fin member, has the top ridge 20d, 21a, which extends in the longitudinal direction on the side opposite from the glass surface 30a and which is offset from the center line L1 of the wiper blade 1 on the one transverse side of the center line L1 of the wiper blade 1. The fin section 20e, 21b extends from the top ridge 20d, 21a into the other transverse side of the center line L1 of the wiper blade 1. Thus, the fin section 20e, 21b is formed to extend from the top ridge 20d, 21a, which is offset from the center line L1 of the wiper blade 1, so that a transverse size of the fin section 20e, 21b is increased while limiting an increase in a transverse size of the cover member 7.

(4) Each fin section 20e, 21b has the enlarging fin section, in which the top ridge 20d, 21a is offset from the center line L1 of the wiper blade 1 on the one transverse side of the center line L1 of the wiper blade 1, and the offset amount X1 of the top ridge 20d, 21a increases progressively toward the longitudinal distal end of the lever assembly 4. Thus, while limiting an increase in the transverse size of the cover member 7 (the fin member), the transverse size of the fin section can be increased to improve the fin function (the function for limiting the lifting of the wiper strip from the glass surface through use of the head wind, i.e., the supplementing function for supplementing the blade urging force). Also, the transverse size of the fin section of the fin member can be set to progressively increase toward the longitudinal distal end of the fin member. Thus, the lifting of the end of the wiper strip 5 from the glass surface 30a is more reliably limited to improve the wiping performance of the wiper strip 5.

(5) The cover member 7, which also serves as the fin member, is formed into the recessed form that has its opening on the wiper strip 5 side thereof. The lever assembly 4 is received in the cover member 7 through the opening, which is formed on the wiper strip 5 side of the cover member 7. Thus, the lever assembly 4 is received and is coved by the cover member 7, and thereby the good appearance of the wiper blade 1 is achieved. Furthermore, the cover member 7 also serves as the fin member, so that an increase in the number of the components of the wiper blade 1 can be limited.

(6) The side cover portions 21 are paired and are symmetrically provided on the longitudinal sides, respectively, of the connecting arrangement 10, to which the wiper arm 8 is connected. Thus, the longitudinal sides of the wiper blade 1 are appropriately balanced, and the appearance of the wiper blade 1 is improved.

(7) The side cover portions 21 are rotatably connected to the primary lever 2. Therefore, since the side cover portions 21 are rotatably connected to the metal primary lever 2, which has the relatively high strength and rigidity, the side cover portions 21 can be more effectively connected to the primary lever 2 in comparison to, for example, a case where the side cover portions 21 are connected to the resin center cover portion 20.

(8) The connecting projections 21c are formed in the inner surface of the base end of each side cover portion 21, and the connecting holes 12a are formed in each connection 12 of the primary lever 2. Since the primary lever 2 is made of the metal, it is relatively easy to form the connecting holes 12a in the primary lever 2 in comparison to a case where the connecting projections are formed in the primary lever.

(9) The base end of each side cover portion 21 is connected to the corresponding connection 12 of the primary lever 2 through the connecting projections 21c, and the distal end of each side cover portion 21 is installed to the corresponding end of the wiper strip 5 through the holding parts 21d. The backing plates 6, each of which has the relatively high rigidity, are installed to the wiper strip 5, so that the ends of each side cover portion 21 are both supported by the components (the backing plates 6), which have the relatively high rigidity, and thereby each side cover portion 21 is not supported only at the one end. As a result, even when a relatively large external force is applied from, for example, a car wash machine to the side cover portions 21, removal of the side cover portions 21 from the wiper blade 1 or damage of the side covers can be advantageously limited.

(10) Each side cover portion 21, which is connected to the corresponding connection 12 of the primary lever 2, has the rotational axis that extends in the transverse direction of the wiper blade 1. Thus, each side cover portion 21 is limited from moving in the transverse direction of the wiper blade 1, i.e., in the wiping direction of the wiper blade 1. Therefore, the ends of the wiper strip 5, which are held by the holding parts 21d of the side cover portions 21, have the improved rigidity in the wiping direction. As a result, at the time of wiping the glass surface 30a, chattering of the wiper strip 5 (leaping of the wiper strip 5 from the glass surface 30a) is advantageously limited.

The fifth embodiment can be modified as follows.

In the above embodiment, the side cover portions 21 are rotatably connected to the lever assembly 4. Alternatively, the side cover portions 21 can be rotatably connected to the center cover portion 20.

In the above embodiment, the connecting projections 21c are provided in the side cover portions 21, and the connecting holes 12a are provided in the lever assembly 4. With this arrangement, the side cover portions 21 are rotatably connected to the lever assembly 4. Alternatively, the connecting holes may be provided in the side cover portions 21, and the connecting projections may be provided in the lever assembly 4. Also, any other connecting means other than the projections and the holes can be used. For example, each connecting pin 17 can be slightly projected outwardly on both transverse sides to rotatably connect the corresponding side cover portion 21 to the projected parts of the connecting pin 17. Alternatively, holes can be provided to the ends of each connecting pin 17 to rotatably connect the corresponding side cover portion 21 to the holes of the connecting pin 17. Furthermore, the positions of the connecting parts, such as the connecting projections 21c and the connecting holes 12a, can be changed to any other appropriate positions.

In the above embodiment, the offset amount X1 of the top ridge 20d, 21a of the cover member 7 (the center cover portion 20 and the side cover portions 21), which also serves as the fin member, is set to increase toward each longitudinal end of the cover member 7 (each longitudinal end of the wiper blade 1) in the entire longitudinal extent thereof. However, the offset amount X1 can be set to increase toward each longitudinal end of the cover member 7 (each longitudinal end of the wiper blade 1) only from a corresponding predetermined longitudinal position. That is, each enlarging fin section can be formed from a predetermined longitudinal intermediate point of the fin member toward the corresponding longitudinal end of the fin member. Here, it is preferred that "the predetermined longitudinal intermediate point" is set to a point, at which the limiting effect for limiting the lifting of the wiper blade from the glass surface becomes insufficient if the offset amount X1 is made constant from that point to the corresponding distal end of the fin member. The predetermined longitudinal intermediate point may vary depending on, for example, the length, the transverse width, the shape and/or the material of the wiper blade. Particularly, in the case of the cover member 7, which also serves as the fin member that receives the lever assembly, the predetermined longitudinal intermediate point may vary depending on the shape of the received lever assembly. Therefore, the appropriate location of the enlarging fin section may vary depending on the type of the wiper blade.

Figure 30:
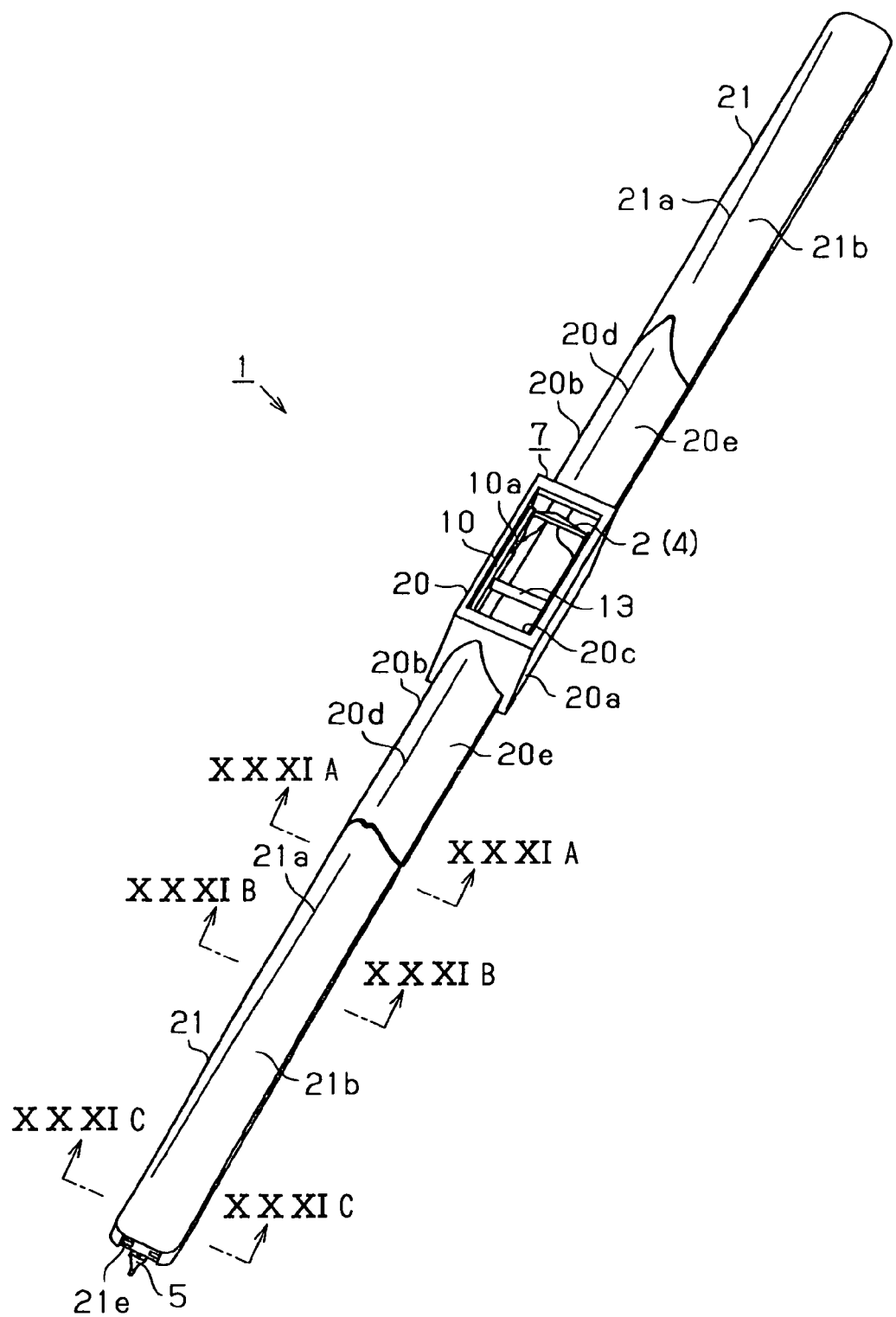
FIG. 30 is a perspective view showing a modification of the fifth embodiment.
Figure 31A:
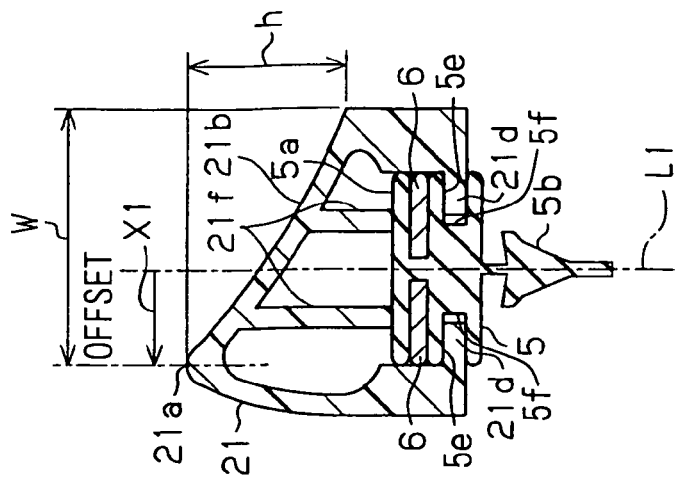
FIG. 31A is a cross sectional view along line XXXIA-XXXIA in FIG. 30.
Figure 31B:
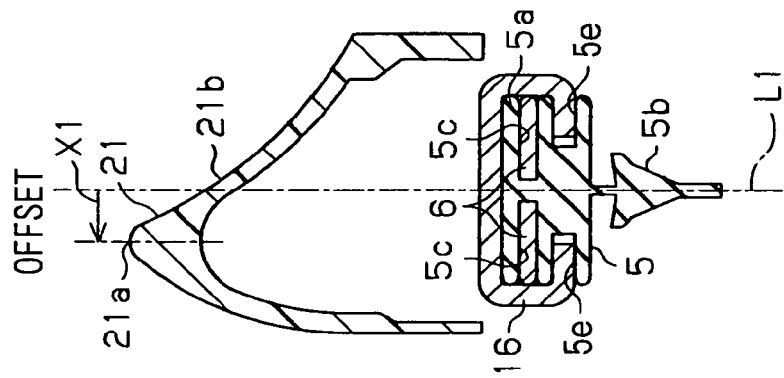
FIG. 31B is a cross sectional view along line XXXIB-XXXIB in FIG. 30.
Figure 31C:
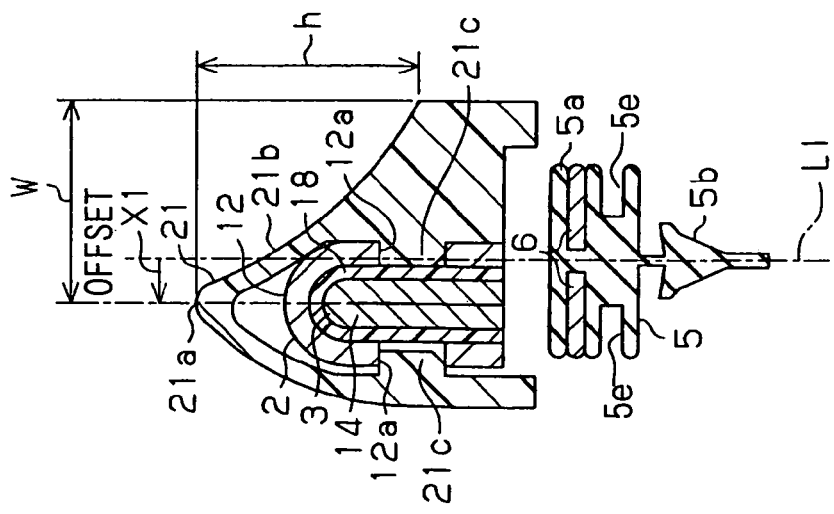
FIG. 31C is a cross sectional view along line XXXIC-XXXIC in FIG. 30.

For example, in the wiper blade 1 shown in FIGS. 30 to 31C, the offset amount X1 of the top ridge 20d of the center cover portion 20 is made constant, and the offset amount X1 of the top ridge 21a of each side cover portion 21 is set to progressively increase toward the corresponding longitudinal end. For example, with reference to FIGS. 31A and 31C, sizes of each side cover portion 21 can be set as follows. That is, when a height of the top ridge 21a, which is measured from a lower edge of the fin section 21b, is set to be "h", and a transverse distance between the top ridge 21a and the lower edge of the fin section 21b is set to be "W", a relationship of W<h is established at the base end of the side cover portion 21, and a relationship of W>h is established at the distal end of the side cover portion 21. With this construction, the transverse size of the fin section 21b of the side cover portion 21 can be gradually increased toward the distal end of the fin section 21b, and thereby the lifting of each end of the wiper blade 1 (the wiper strip 5) from the glass surface 30a at the time of traveling of the vehicle can be more reliably limited. In the above embodiment, the fin section 21b, which is formed in the side cover portion 21, forms the enlarging fin section.

In the above embodiment, the cover member 7 includes the single center cover portion 20 and the two side cover portions 21. However, the number of the cover portions in the cover member 7 is not limited to this and can be increased or decreased to any suitable number. For example, the cover member may include only the side cover portions, and the outer shape of the primary lever 2 may be changed to that of the center cover portion.

In the above embodiment, the lever assembly 4 includes the single primary lever 2 and the two secondary levers 3. However, the number of the levers is not limited to this.

In the above embodiment, the levers of the lever assembly 4 are made of the metal. Alternatively, the levers may be made of resin. Further alternatively, some of the levers may be made of the metal, and the rest of the levers may be made of the resin. However, the metal levers are preferred over the resin levers since the metal levers can easily achieve the required strength and rigidity.

Figure 32:
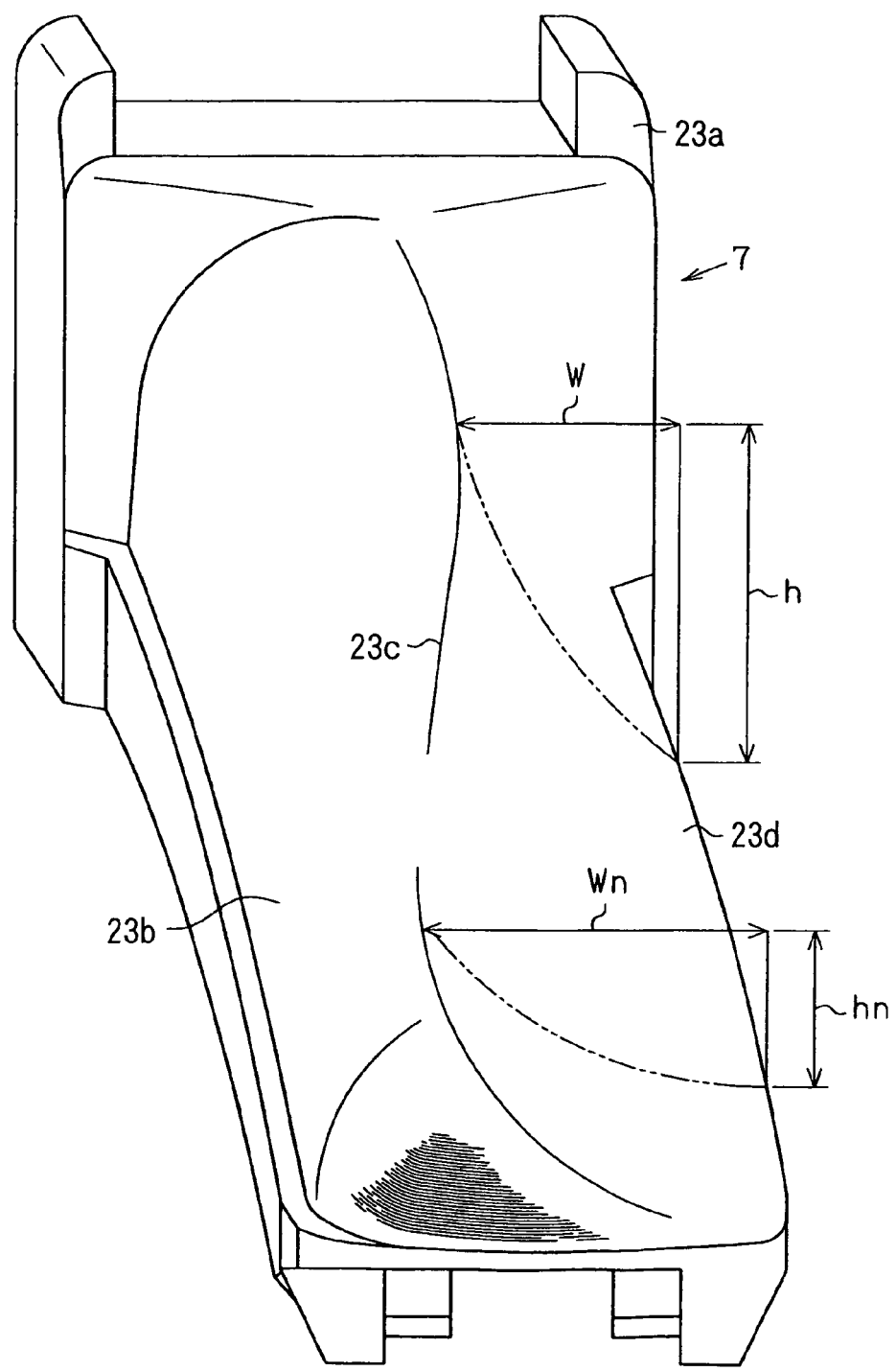
FIG. 32 is a perspective view showing one side of a cover member in a modification of the fifth embodiment.

In the above embodiment, the fin member is divided into the fin portions, which include the movable fin portions. However, the fin member of the present invention is not need to be divided. For example, a single cover member may be used to cover the lever assembly 4 and the wiper strip 5. For example, the center cover portion 20 and the side cover portions 21 may be formed integrally as a fin member. FIG. 32 is a schematic perspective view of one longitudinal side of a cover member 7, which is formed as such a fin member. The cover member 7 includes a connecting arrangement cover segment 23a and two arm cover segments 23b (only one of the arm cover segments 23b is shown in the drawing). The connecting arrangement cover segment 23a is provided generally in a center of the cover member 7 and covers the connecting arrangement 10 of the primary lever 2. The arm cover segments 23b are arranged at opposed ends, respectively, of the connecting arrangement cover segment 23a to cover the arms 11 of the primary lever 2, the secondary levers 3 and the wiper strip 5. Each cover segment 23b is set such that the offset amount X1 of a top ridge 23c thereof progressively increases toward the longitudinal end of the cover segment 23b. A fin section 23d is integrally formed in the cover segment 23b to extend from the top ridge 23c into the other transverse side of the center line L1 of the wiper blade 1. The fin section 23d forms an enlarging fin section. Furthermore, when a height of the top ridge 23c, which is measured from a lower edge of the fin section 23d, is set to be "h (hn)", and a transverse distance between the top ridge 23c and the lower edge of the fin section 23d is set to be "W (Wn)", a relationship of W<h is established at the longitudinal center portion of the fin section 23d, and a relationship of Wn>hn is established at the longitudinal end of the fin section 23d. When the height h (hn) and the transverse distance W (Wn) of the fin section 23d are set as described above, a reduction in the functional surface area of the fin section 23d, which functions as the fin, is limited even when the height of the cover member 7 decreases toward the longitudinal end of the wiper blade. Thus, even when the height of the cover member 7 is small, the sufficient functional surface area, which functions as the fin, can be maintained.

In the above embodiment, the top ridges 20d, 21a, 23c are offset from the center line L1 of the wiper blade 1 in the corresponding direction, which causes the improvement of the fin function of the fin section. However, as shown in FIGS. 33A and 33B, depending on the structure of the lever assembly, a portion of the fin section may be offset from the center line L1 of the wiper blade 1 in the other direction, which causes a decrease in the fin function. Even in such a case, it is sufficient to provide the enlarging fin section 24 from the longitudinal intermediate point to the distal end.

Figure 34A:
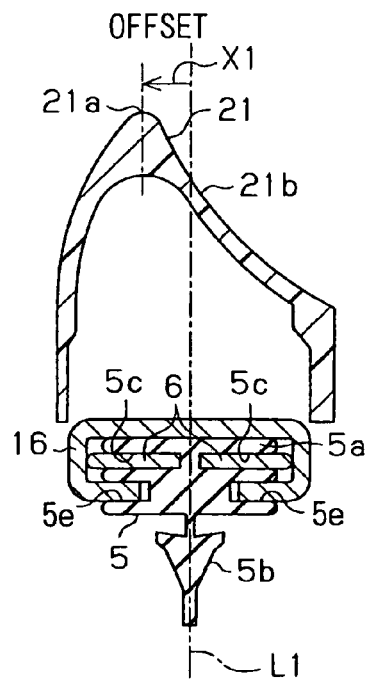
FIG. 34A is a cross sectional view showing a modification of the structure of the fifth embodiment shown in FIG. 29B.
Figure 34B:
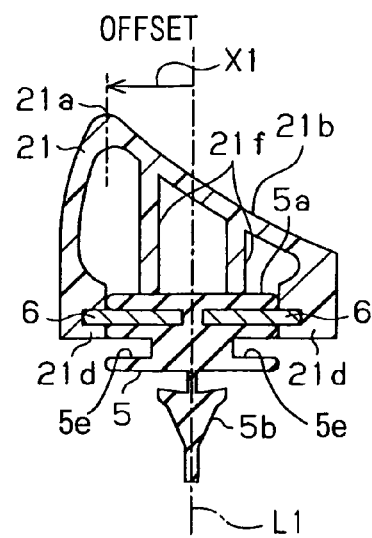
FIG. 34B is a cross sectional view showing a modification of the structure of the fifth embodiment shown in FIG. 29C.
Figure 35:
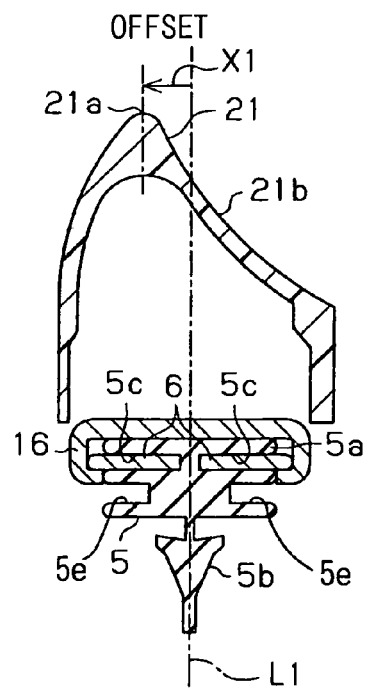
FIG. 35 is a cross sectional view showing a further modification of the structure of the fifth embodiment shown in FIG. 29B.
Figure 36:
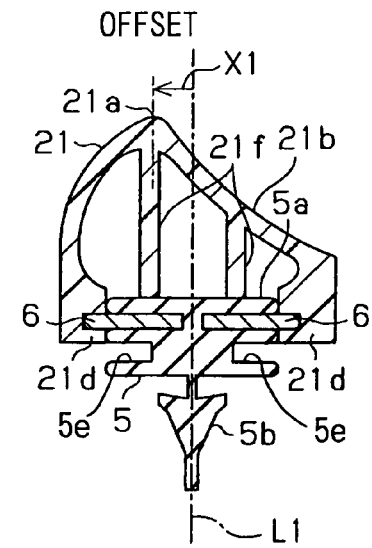
FIG. 36 is a cross sectional view showing a modification of an offset amount of a top ridge of a side cover portion shown in FIG. 34B.

In the above embodiment, each side cover portion (the movable cover portion) directly holds the wiper strip 5 at the corresponding point, which is distally of the closest outermost holding part 16 of the lever assembly 4. Alternatively, the wiper strip 5 can be indirectly held by the side cover portions (the movable cover portions). For example, in the fifth embodiment, as shown in FIGS. 34A and 34B, each backing plate 6 may be modified to have a transverse width, which causes transverse protrusion of a portion of the backing plate 6 from the corresponding backing plate receiving groove 5c. Furthermore, as shown in FIG. 34B, each holding part 21d of each side cover portion 21 may hold the corresponding protruded transverse portion of the backing plate 6 to indirectly hold the wiper strip 5. At this time, the holding parts 16, which are provided to the ends of each secondary lever 3, may hold the base 5a of the wiper strip 5 to hold the wiper strip 5, as shown in FIG. 34A. Alternatively, these holding parts 16 may hold the wiper strip 5 while the holding parts 16 engage and hold the protruded transverse parts of the backing plates 6, which protrude transversely from the corresponding plate receiving grooves 5c, as shown in FIG. 35. Furthermore, the offset amount X1 of the top ridge 20d, 21a of the cover member 7 may be made constant in the longitudinal direction. At this time, the offset amount X1 of the top ridge 21a of the side cover portion 21 of FIG. 34B becomes the same as the offset amount X1 of the top ridge 21a of the side cover portion 21 of FIG. 34A. Furthermore, in the case of FIGS. 25A to 29C, the offset amount X1 of the top ridge 20d, 21a of the cover member 7 can be made constant in the longitudinal direction.

In the above embodiment, the cover member 7, which receives the lever assembly 4, also serves as the fin member. However, the fin member does not need to be formed as the cover, which receives the lever assembly 4.

Additional advantages and modifications will readily occur to those skilled in the art. The invention in its broader terms is therefore not limited to the specific details, representative apparatus, and illustrative examples shown and described. The invention may include any combination of the features or limitations of the above embodiments and modifications.

What is claimed is:

1. A wiper blade comprising:
a wiper strip that directly wipes a wiping surface;
a lever assembly that holds the wiper strip and includes a plurality of levers, which are connected together in tournament style, wherein an axial length of the lever assembly is shorter than an axial length of the wiper strip; and
a cover member that receives the lever assembly, wherein:
opposed ends of the cover member hold the wiper strip;
the cover member includes a plurality of cover portions, which are formed separately from one another;
one of the ends of the cover member slidably holds the wiper strip; and
the other one of the ends of the cover member non-slidably holds the wiper strip.

2. The wiper blade according to claim 1, wherein the plurality of cover portions includes:
a stationary cover portion; and
at least one movable cover portion, which is pivotable relative to the stationary cover portion.

3. The wiper blade according to claim 2, wherein:
the at least one movable cover portion includes two movable cover portions, which are arranged on opposite sides, respectively, of the stationary cover portion; and
the two movable cover portions are formed symmetrically about the stationary cover.

4. The wiper blade according to claim 2, wherein:
the at least one movable cover portion includes two movable cover portions, which are arranged on opposite sides, respectively, of the stationary cover portion; and
the two movable cover portions are formed asymmetrically about the stationary cover portion.

5. The wiper blade according to claim 2, wherein an axial extent of a boundary between a front side opposing part of the stationary cover portion and a front side opposing part of an adjacent one of the at least one movable cover portion, which are opposed to each other in the axial direction of the wiper blade, does not overlap with an axial extent of a boundary between a rear side opposing part of the stationary cover portion and a rear side opposing part of the adjacent one of the at least one movable cover portion, which are opposed to each other in the axial direction of the wiper blade.

6. The wiper blade according to claim 5, wherein:
one of the front side opposing part and the rear side opposing part of the adjacent one of the at least one movable cover portion is convexly curved along an imaginary arc, which is centered at a pivotal axis of the adjacent one of the at least one movable cover portion; and
the other one of the front side opposing part and the rear side opposing part of the adjacent one of the at least one movable cover portion is concavely curved along the imaginary arc, which is centered at the pivotal axis of the adjacent one of the at least one movable cover portion.

7. The wiper blade according to claim 2, wherein at least one of the at least one movable cover portion is pivotably joined to a corresponding one of the plurality of levers.

8. The wiper blade according to claim 2, wherein:
the at least one movable cover portion includes a plurality of movable cover portions; and
at least one of the plurality of movable cover portions is pivotably joined to at least another one of the plurality of movable cover portions.

9. The wiper blade according to claim 2, wherein:
each of the at least one movable cover portion has at least one connecting projection, which forms a pivotal axis of the movable cover portion; and
one of the plurality of levers has at least one connecting hole, each of which receives a corresponding one of the at least one connecting projection of the at least one movable cover portion.

10. The wiper blade according to claim 2, wherein a base end of at least one of the at least one movable cover portion is received in the stationary cover portion.

11. The wiper blade according to claim 1, wherein:
the plurality of levers includes:
a primary lever for connecting with a wiper arm; and
a plurality of secondary levers, which are pivotably joined to the primary lever; and
at least one of the plurality of cover portions includes:
at least one limiting part, which contacts the primary lever in a transverse direction of the wiper blade to set a transverse position of the at least one of the plurality of cover portions with respect to the primary lever; and
at least one projection, each of which projects from a corresponding one of the at least one limiting part toward a transverse center of the wiper blade.

12. The wiper blade according to claim 11, wherein a projecting length of each of the at least one projection of each of the at least one of the plurality of cover portions, which projects from the corresponding one of the at least one limiting part of the at least one of the plurality of cover portions, is equal to or smaller than a wall thickness of the primary lever.

13. The wiper blade according to claim 11, wherein:
the primary lever includes at least one connecting hole; and
each of the at least one projection of the at least one of the plurality of cover portions forms a pivotal axis and is received in a corresponding one of the at least one connecting hole of the primary lever, so that the at least one of the plurality of cover portions is pivotable relative to the primary lever about the at least one projection thereof.

14. The wiper blade according to claim 1, wherein the cover member has a fin arrangement, wherein the fin arrangement exerts an urging force for urging the wiper strip against the wiping surface when the fin arrangement receives a head wind.

15. The wiper blade according to claim 14, wherein:
the cover member has a top ridge, which is offset from a center line of the wiper strip in a transverse direction of the wiper blade on a first side of the center line of the wiper strip; and
the fin arrangement of the cover member extends in the transverse direction of the wiper blade from the top ridge of the cover member into a second side of the center line of the wiper strip, which is opposite from the first side.

16. The wiper blade according to claim 1, wherein:
each of the plurality of levers is made of metal; and
each of the plurality of cover portions is made of resin.

17. A vehicle wiper system comprising the wiper blade of claim 1.

18. A wiper blade comprising:
a wiper strip that directly wipes a wiping surface;
a lever assembly that holds the wiper strip and includes a connecting arrangement, which is adapted to connect with a wiper arm, wherein an axial length of the lever assembly is shorter than an axial length of the wiper strip; and a fin member that is installed to the lever assembly and has a fin arrangement, wherein the fin arrangement exerts an urging force for urging the wiper strip against the wiping surface when the fin arrangement receives a head wind, wherein:

a first axial end part of the fin member directly and non-slidably holds an adjacent part of the wiper strip, which axially projects from an adjacent first axial end of the level assembly;

a second axial end part of the fin member, which is opposite from the first axial end part of the fin member, directly and slidably holds an adjacent part of the wiper strip, which axially projects from an adjacent second axial end of the level assembly that is opposite from the first axial end of the lever assembly;

the fin member includes a movable fin portion, which is installed to the lever assembly and is pivotable relative to the lever assembly; and the movable fin portion axially outwardly extends away from the connecting arrangement beyond one of the first and second axial ends of the lever assembly to form one of the first and second axial end parts of the fin member.

19. The wiper blade according to claim 18, wherein:
the fin member includes a plurality of finned portions, which are formed separately from one another;
each of the plurality of finned portion has a fin section that forms a part of the fin arrangement; and
at least one of the plurality of finned portions includes a wiper strip urging part, which contacts a top surface of the wiper strip.

20. The wiper blade according to claim 18, wherein:
the fin member has a top ridge, which is offset from a center line of the wiper strip in a transverse direction of the wiper blade on a first side of the center line of the wiper strip; and
the fin arrangement of the fin member extends in the transverse direction of the wiper blade from the top ridge of the fin member into a second side of the center line of the wiper strip, which is opposite from the first side.

21. The wiper blade according to claim 20, wherein an amount of offset of the top ridge of the fin member relative to the center line of the wiper strip is increased in an axial direction of the wiper blade toward at least one of the ends of the fin member.

22. The wiper blade according to claim 21, wherein:
a height of the top ridge of the fin member, which is measured from a lower edge of the fin arrangement, is smaller than a transverse width of the fin arrangement, which is measured in the transverse direction of the wiper blade, in the at least one of the ends of the fin member; and
the height of the top ridge of the fin member is greater than the transverse width of the fin arrangement in at least one axial intermediate point of the fin member, which is located between an axial center of the fin member and the at least one of the ends of the fin member.

23. The wiper blade according to claim 20, wherein the fin member receives the lever assembly.

24. A vehicle wiper system comprising the wiper blade of claim 18.

25. The wiper blade according to claim 18, wherein:
the movable fin portion is a first movable fin portion installed to the lever assembly on a first axial side of the connecting arrangement;
the one of the first and second axial ends of the lever assembly is the first axial end of the lever assembly;
the fin member further includes a second movable fin portion, which is formed separately from the first movable fin portion;
the second movable fin portion is installed to the lever assembly on a second axial side of the connecting arrangement opposite from the first axial side of the connecting arrangement and is pivotable relative to the lever assembly;
the second movable fin portion axially outwardly extends away from the connecting arrangement beyond the second axial end of the lever assembly to form the second axial end part of the fin member.

26. The wiper blade according to claim 25, wherein:
the fin member further includes a stationary fin portion, which is fixed to the lever assembly; and
the stationary fin portion is continuously connected to and is placed between the first movable fin portion and the second movable fin portion.

27. The wiper blade according to claim 18, wherein the lever assembly further includes a plurality of levers, which are connected together in a hierarchical manner.

28. A wiper blade comprising:
a wiper strip that directly wipes a wiping surface;
a lever assembly that holds the wiper strip and includes a connecting arrangement, which is adapted to connect with a wiper arm, wherein an axial length of the lever assembly is shorter than an axial length of the wiper strip; and
a fin member that is installed to the lever assembly and has a fin arrangement, wherein the fin arrangement exerts an urging force for urging the wiper strip against the wiping surface when the fin arrangement receives a head wind, wherein:
the fin member includes a stationary fin portion and a movable fin portion, wherein the movable fin portion is pivotable relative to the stationary fin portion and is installed to the lever assembly and is pivotable relative to the lever assembly;
the movable fin portion axially outwardly extends away from the connecting arrangement beyond a corresponding axial end of the lever assembly; and
an axial end part of the movable fin portion, which is located axially outward of the corresponding axial end of the lever assembly, directly holds an adjacent part of the wiper strip, which axially projects from the corresponding axial end of the lever assembly.

* * * * *